(12) United States Patent
Matsui et al.

(10) Patent No.: US 7,576,872 B2
(45) Date of Patent: Aug. 18, 2009

(54) IMAGE FORMING APPARATUS AND IMAGE FORMING SYSTEM

(75) Inventors: Noriaki Matsui, Ibaraki (JP); Kunio Tsuruno, Tokyo (JP); Keizo Isemura, Tokyo (JP); Shinsuke Ubayashi, Chiba (JP); Ichiro Sasaki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 967 days.

(21) Appl. No.: 10/720,014

(22) Filed: Nov. 24, 2003

(65) Prior Publication Data

US 2004/0156055 A1 Aug. 12, 2004

(30) Foreign Application Priority Data

Nov. 25, 2002 (JP) .............................. 2002-341356
Nov. 25, 2002 (JP) .............................. 2002-341357

(51) Int. Cl.
*H04N 1/00* (2006.01)
*H04N 1/23* (2006.01)
*H04N 1/31* (2006.01)
*G06F 3/12* (2006.01)
*G06F 15/04* (2006.01)
*G06F 11/32* (2006.01)
*G06F 11/36* (2006.01)

(52) U.S. Cl. ....................... 358/1.1; 358/401; 358/1.13; 358/296; 358/3.32; 358/1.14; 358/406

(58) Field of Classification Search ..................... None
See application file for complete search history.

(56) References Cited

U.S. PATENT DOCUMENTS

| 6,873,425 | B1 * | 3/2005 | Boyce | 358/1.14 |
| 7,037,008 | B2 * | 5/2006 | Ota | 400/76 |
| 2006/0023245 | A1 * | 2/2006 | Sato et al. | 358/1.13 |

FOREIGN PATENT DOCUMENTS

| JP | 62161646 | 7/1987 |
| JP | 11-119608 A | 4/1999 |
| JP | 11-174910 A | 7/1999 |
| JP | 11-352842 A | 12/1999 |
| JP | 2000-168208 A | 6/2000 |
| JP | 2001-278535 A | 10/2001 |

* cited by examiner

*Primary Examiner*—Twyler L Haskins
*Assistant Examiner*—Myles D Robinson
(74) *Attorney, Agent, or Firm*—Rossi, Kimms & McDowell, LLP

(57) ABSTRACT

There are provided an image forming apparatus which is capable of efficiently performing necessary actions to thereby reduce downtime. At least one job can be registered. Image formation is performed according to the at least one registered job. Action objects are detected on which actions necessary for the image forming apparatus should be taken.

4 Claims, 61 Drawing Sheets

| MODE | ADJUSTMENT |
|---|---|
| DOUBLE-SIDED | LATERAL REGISTRATION ADJUSTMENT |
| SADDLE STITCHING | BINDING WIDTH ADJUSTMENT |
| TRIMMER | CUTTING AMOUNT ADJUSTMENT |
| THICK PAPER | CL ADJUSTMENT, AIR ADJUSTMENT |
| THIN PAPER | CL ADJUSTMENT, AIR ADJUSTMENT |

FIG. 14

ADJUSTMENT TABLE LIST

| MODE | ADJUSTMENT | |
|---|---|---|
| DOUBLE-SIDED: CONVEYANCE SENSOR | ADJUST | NOT ADJUST |
| DOUBLE-SIDED: LATERAL REGISTRATION SENSOR | ADJUST | NOT ADJUST |
| DOUBLE-SIDED: CLUTCH | ADJUST | NOT ADJUST |
| STAPLING: POSITION | ADJUST | NOT ADJUST |
| STAPLING: WIDTH | ADJUST | NOT ADJUST |

The first three rows are grouped as 1401; the last two as 1402.

[PREVIOUS PAGE] PAGE 1/2 [NEXT PAGE] [RETURN] [APPLY]

FIG. 15

ADJUSTMENT TABLE LIST

| MODE | ADJUSTMENT | | PRINTING | |
|---|---|---|---|---|
| DOUBLE-SIDED: CONVEYANCE SENSOR | NOT ADJUST | | PRINT | NOT PRINT |
| DOUBLE-SIDED: LATERAL REGISTRATION SENSOR | ADJUST | | PRINT | NOT PRINT |
| DOUBLE-SIDED: CLUTCH | NOT ADJUST | | PRINT | NOT PRINT |
| STAPLING: POSITION | ADJUST | | PRINT | NOT PRINT |
| STAPLING: WIDTH | ADJUST | | PRINT | NOT PRINT |

[PREVIOUS PAGE] [NEXT PAGE] [ALL PRINTING] [RETURN] [APPLY]

(DATA REGISTRATION MENU)

| | A | B | C | D | E | F |
|---|---|---|---|---|---|---|
| 1 | CD | SHEET D | 30 pages | 10 COPIES | COLOR | HIGH IMAGE QUALITY |
| 2 | NW | SHEET A | 10 pages | 10 COPIES | COLOR | VERY HIGH IMAGE QUALITY |
| 3 | | | | | | |
| 4 | | | | | | |
| 5 | | | | | | |
| 6 | | | | | | |
| 7 | | | | | | |
| 8 | | | | | | |

REGISTRATION   RETURN   NEXT PAGE

SYSTEM STATUS

FIG. 29

(JOB REGISTRATION MENU) 3201

| | A | B | C | D | E | F |
|---|---|---|---|---|---|---|
| 1 | SHEET A | 30 pages | 10 COPIES | COLOR | CLC5000 | HIGH IMAGE QUALITY |
| 2 | SHEET I | 100 pages | 10 COPIES | BW | iR105 | LOW IMAGE QUALITY |
| 3 | SHEET C | 20 pages | 50 COPIES | COLOR | CLC5000 | HIGH IMAGE QUALITY |
| 4 | SHEET A | 20 pages | 50 COPIES | COLOR | CLC5000 | VERY HIGH IMAGE QUALITY |
| 5 | SHEET H | 10 pages | 50 COPIES | BW | iR105 | HIGH IMAGE QUALITY |
| 6 | SHEET J | 30 pages | 10 COPIES | BW | iR105 | HIGH IMAGE QUALITY |
| 7 | SHEET C | 30 pages | 100 COPIES | COLOR | CLC5000 | |
| 8 | SHEET D | 30 pages | 10 COPIES | COLOR | CLC5000 | HIGH IMAGE QUALITY |
| 9 | | | | | | |
| 10 | | | | | | |
| 11 | | | | | | |

REGISTRATION  SWITCHING  CANCEL REGISTRATION  RETURN  NEXT PAGE

SYSTEM STATUS

FIG. 34

(TIME-CHANGE COMPONENT STATUS)
(P3103)

| | A | B | C | D | E | F | G |
|---|---|---|---|---|---|---|---|
| 1 | PRIMARY ELECTROSTATIC CHARGE WIRE | 47000 | | 50000 | | | 2002/03/10 |
| 2 | PRE-TRANSFER ELECTROSTATIC CHARGE WIRE | 47000 | | 100000 | | | 2002/03/10 |
| 3 | DRUM CLEANER | 47000 | | 80000 | | | 2002/03/10 |
| 4 | OZONE FILTER | 47000 | | 100000 | | 1 YEAR | 2002/03/10 |
| 5 | DUSTPROOF FILTER | 47000 | | 100000 | | 1 YEAR | 2002/03/10 |
| 6 | TONER FILTER | 47000 | | 100000 | | 1 YEAR | 2002/03/10 |
| 7 | PRE-FIXING DUCT FILTER | | | | | 1 YEAR | |
| 8 | | | | | | | |
| 9 | | | | | | | |
| 10 | | | | | | | |

3201

OTHER MACHINE    RETURN    NEXT PAGE

SYSTEM STATUS

FIG. 35

(TIME-CHANGE COMPONENT STATUS)
(P3102)

| | A | B | C | D | E | F | G |
|---|---|---|---|---|---|---|---|
| 1 | DEVELOPMENT ELECTROSTATIC CHARGE WIRE | 2100 | | 50000 | | | 2002/05/10 |
| 2 | PRE-TRANSFER ELECTROSTATIC CHARGE WIRE | 2100 | | 50000 | | | 2002/05/10 |
| 3 | PRIMARY GRID WIRE | 2100 | | 50000 | | | 2001/10/06 |
| 4 | THERMISTOR | 2100 | | 50000 | | | 2001/10/06 |
| 5 | THERMO SW UNIT | 2100 | | 100000 | | | 2001/10/06 |
| 6 | OZONE FILTER | 2100 | | 100000 | | | 2001/10/06 |
| 7 | | | | | | | |
| 8 | | | | | | | |
| 9 | | | | | | | |
| 10 | | | | | | | |

[NEXT PAGE] [RETURN]

[OTHER MACHINE] [SYSTEM STATUS]

(CONSUMABLES STATUS)
(P3103)

3201

| | A | B | C | D | E | F | G |
|---|---|---|---|---|---|---|---|
| 1 | FIXING OIL | 47000 | | 40000 | | | 2002/05/10 |
| 2 | START DEVELOPER | 47000 | | 50000 | | | 2002/03/10 |
| 3 | FIXING ROLLER | 47000 | | 50000 | | | 2002/03/10 |
| 4 | TRANSFER BELT CLNWEB | 47000 | | 50000 | | | 2002/03/10 |
| 5 | TRANSFER BELT | 47000 | | 300000 | | | 2002/03/10 |
| 6 | TRANSFER BELT CLNBLD | 47000 | | 100000 | | | 2002/03/10 |
| 7 | FIXING WEB | 47000 | | 100000 | | | 2002/03/10 |
| 8 | OIL APPLYING ROLLER | 47000 | | 100000 | | | 2002/03/10 |
| 9 | OIL REMOVING ROLLER | 47000 | | 150000 | | | 2002/03/10 |
| 10 | BELT GUIDE | 47000 | | 300000 | | | 2002/03/10 |
| 11 | PAPER POWDER REMOVAL MYLAR | 47000 | | 500000 | | | 2002/03/10 |

OTHER MACHINE   RETURN   NEXT PAGE

SYSTEM STATUS

(CONSUMABLES STATUS)
(P3103)

| | A | B | C | D | E | F | G |
|---|---|---|---|---|---|---|---|
| 1 | FIXING HEATER | 47000 | | 200000 | | | 2002/03/10 |
| 2 | OIL REMOVING BLADE | 47000 | | 200000 | | | 2002/03/10 |
| 3 | POLISHING ROLLER | 47000 | | 300000 | | | 2002/03/10 |
| 4 | PRIMARY ELECTROSTATIC CHARGER | 47000 | 50000 | 250000 | | | 2002/03/10 |
| 5 | DEVELOPING DEVICE | 47000 | | 500000 | | | 2002/03/10 |
| 6 | WASTE TONER BOX | 47000 | 500000 | | | | 2002/03/10 |
| 7 | PRE-TRANSFER ELECTROSTATIC CHARGER | 47000 | 100000 | | | | 2002/03/10 |
| 8 | | | | | | | |
| 9 | | | | | | | |
| 10 | | | | | | | |
| 11 | | | | | | | |

OTHER MACHINE | RETURN | PREVIOUS PAGE

SYSTEM STATUS

FIG. 38

(CONSUMABLES STATUS)
(P3102) — 3201

| | A | B | C | D | E | F | G |
|---|---|---|---|---|---|---|---|
| 1 | DEVELOPING DEVICE | 2100 | | 1000000 | | | 2001/10/06 |
| 2 | CLEANER SEPARATION CLAW | 2100 | | 500000 | | | 2001/10/06 |
| 3 | CLEANING BLD | 2100 | | 1000000 | | | 2001/10/06 |
| 4 | PRIMARY ELECTROSTATIC CHARGER | 2100 | | 1000000 | | | 2001/10/06 |
| 5 | TRANSFER ELECTROSTATIC CHARGER | 2100 | | 1000000 | | | 2001/10/06 |
| 6 | PRE-TRANSFER ELECTROSTATIC CHARGER | 2100 | | 1000000 | | | 2001/10/06 |
| 7 | ELECTROSTATIC CHARGE WIRE CLEANER | 2100 | | 500000 | | | 2001/10/06 |
| 8 | FIXING ROLLER | 2100 | | 500000 | | | 2001/10/06 |
| 9 | FIXING WEB | 2100 | | 500000 | | | 2001/10/06 |
| 10 | FIXING ROLLER BEARING | 2100 | | 1000000 | | | 2001/10/06 |
| 11 | UPPER DISCHARGED SHEET-SEPARATING CLAW | 2100 | | 500000 | | | 2001/10/06 |

OTHER MACHINE | RETURN | NEXT PAGE

SYSTEM STATUS

(CONSUMABLES STATUS)
(P3102)

| | A | B | C | D | E | F | G |
|---|---|---|---|---|---|---|---|
| 1 | LOWER DISCHARGED SHEET-SEPARATING CLAW | 2100 | | | | | 2001/10/06 |
| 2 | WASTE TONER BOX | 2100 | 50000 | 1000000 | | | 2001/10/06 |
| 3 | | | | | | | |
| 4 | | | | | | | |
| 5 | | | | | | | |
| 6 | | | | | | | |
| 7 | | | | | | | |
| 8 | | | | | | | |
| 9 | | | | | | | |
| 10 | | | | | | | |
| 11 | | | | | | | |

[OTHER MACHINE] [RETURN] [PREVIOUS PAGE]

[SYSTEM STATUS]

FIG. 40

(SOFTWARE COUNTER CONSUMABLES STATUS) (P3103) — 3201

| | A | B | C | D | E | F | G |
|---|---|---|---|---|---|---|---|
| 1 | DOUBLE-SIDED CONVEYING ROLLER | 47000 | | 100000 | | | 2002/03/10 |
| 2 | SHEET FEED ROLLER (1) | 20000 | | 250000 | | | 2002/03/10 |
| 3 | SHEET FEED ROLLER (2) | 7000 | | 250000 | | | 2002/03/10 |
| 4 | SHEET FEED ROLLER (DECK) | 20000 | | 100000 | | | 2002/03/10 |
| 5 | SHEET FEED ROLLER (MULTI) | 0 | | 50000 | | | |
| 6 | | | | | | | |
| 7 | | | | | | | |
| 8 | | | | | | | |
| 9 | | | | | | | |
| 10 | | | | | | | |
| 11 | | | | | | | |

OTHER MACHINE | RETURN | NEXT PAGE

SYSTEM STATUS

(SOFTWARE COUNTER CONSUMABLES STATUS)
(P3103)

| | A | B | C | D | E | F | G |
|---|---|---|---|---|---|---|---|
| 1 | SHEET FEED ROLLER (1) | 500 | | 500000 | | | 2001/10/06 |
| 2 | SHEET FEED ROLLER (2) | 600 | | 500000 | | | 2001/10/06 |
| 3 | SHEET FEED ROLLER (3) | 0 | | 500000 | | | 2001/10/06 |
| 4 | SHEET FEED ROLLER (4) | 0 | | 500000 | | | 2001/10/06 |
| 5 | SHEET FEED ROLLER (DECK) | 1000 | | 500000 | | | 2001/10/06 |
| 6 | SHEET FEED ROLLER (MULTI) | 0 | | 120000 | | | 2001/10/06 |
| 7 | | | | | | | |
| 8 | | | | | | | |
| 9 | | | | | | | |
| 10 | | | | | | | |
| 11 | | | | | | | |

OTHER MACHINE | RETURN | NEXT PAGE

SYSTEM STATUS

FIG. 42

(ADJUSTMENT SEQUENCE: DOWN SEQUENCE CONFIGURATION)
(P3103)                                                                              3201

| | A | B | C | D | E | F |
|---|---|---|---|---|---|---|
| 1 | LOW IMAGE QUALITY | 173°C,168°C,163°C,178°C | 20°C | 40% | ±1°C | ±5% |
| 2 | HIGH IMAGE QUALITY | 178°C,173°C,168°C,183°C | 20°C | 40% | ±1°C | ±5% |
| 3 | VERY HIGH IMAGE QUALITY | 183°C,178°C,173°C,188°C | 20°C | 40% | ±1°C | ±5% |
| 4 | | | | | | |
| 5 | | | | | | |
| 6 | | | | | | |

A: MODE
B: FIXING TEMPERATURE LIMITER VALUES AT TIME OF 100% PERFORMANCE, 82% SPEC., INTERRUPTION AND RESTART (SPEED UNIT: cpm)
C: TEMPERATURE AT TIME OF MODE SETTING
D: HUMIDITY AT TIME OF MODE SETTING
E: ALLOWABLE TEMPERATURE DIFFERENCE RANGE
F: ALLOWABLE HUMIDITY DIFFERENCE RANGE

[SET] [OTHER MACHINE] [RETURN] [NEXT PAGE]

SYSTEM STATUS

FIG. 43

(ADJUSTMENT SEQUENCE: DOWN SEQUENCE CONFIGURATION) (P3102)

| | A | B | C | D | E | F |
|---|---|---|---|---|---|---|
| 1 | LOW IMAGE QUALITY | 173°C,168°C,163°C,178°C | 17°C | 35% | ±2°C | ±10% |
| 2 | HIGH IMAGE QUALITY | 178°C,173°C,168°C,183°C | 17°C | 35% | ±2°C | ±10% |
| 3 | VERY HIGH IMAGE QUALITY | 183°C,178°C,173°C,188°C | 17°C | 35% | ±2°C | ±10% |
| 4 | | | | | | |
| 5 | | | | | | |
| 6 | | | | | | |

A: MODE
B: FIXING TEMPERATURE LIMITER VALUES AT TIME OF 100% PERFORMANCE, 82% SPEC., INTERRUPTION AND RESTART (SPEED UNIT: cpm)
C: TEMPERATURE AT TIME OF MODE SETTING
D: HUMIDITY AT TIME OF MODE SETTING
E: ALLOWABLE TEMPERATURE DIFFERENCE RANGE
F: ALLOWABLE HUMIDITY DIFFERENCE RANGE

[SET] [OTHER MACHINE] [RETURN] [NEXT PAGE]

SYSTEM STATUS

(ADJUSTMENT SEQUENCE: THICK SHEET MODE CONFIGURATION)
(P3103)

| | A | B | C | D | E | F | G |
|---|---|---|---|---|---|---|---|
| 1 | THICK SHEET 1 | SHEET A, SHEET B, SHEET C | 173°C, 168°C, 163°C, 178°C | 20°C | 40% | ±2°C | ±10% |
| 2 | THICK SHEET 2 | SHEET D | 178°C, 173°C, 168°C, 183°C | 20°C | 40% | ±2°C | ±10% |
| 3 | THICK SHEET 3 | SHEET E | 183°C, 178°C, 173°C, 188°C | 20°C | 40% | ±2°C | ±10% |
| 4 | | | | | | | |
| 5 | | | | | | | |
| 6 | | | | | | | |

A: MODE
B: FIXING TEMPERATURE LIMITER VALUES AT TIME OF 100% PERFORMANCE, 82% SPEC., INTERRUPTION AND RESTART (SPEED UNIT: cpm)
C: TEMPERATURE AT TIME OF MODE SETTING
D: HUMIDITY AT TIME OF MODE SETTING
E: ALLOWABLE TEMPERATURE DIFFERENCE RANGE
F: ALLOWABLE HUMIDITY DIFFERENCE RANGE

3201

OTHER MACHINE | RETURN | NEXT PAGE

SYSTEM STATUS

FIG. 45

(ADJUSTMENT SEQUENCE: THICK SHEET MODE CONFIGURATION)
(P3102)

| | A | B | C | D | E | F | G |
|---|---|---|---|---|---|---|---|
| 1 | THICK SHEET 1 | SHEET H, SHEET I | 173°C, 168°C, 163°C, 178°C | 17°C | 35% | ±2°C | ±10% |
| 2 | THICK SHEET 2 | SHEET J | 178°C, 173°C, 168°C, 183°C | 17°C | 35% | ±2°C | ±10% |
| 3 | THICK SHEET 3 | SHEET K | 183°C, 178°C, 173°C, 188°C | 17°C | 35% | ±2°C | ±10% |
| 4 | | | | | | | |
| 5 | | | | | | | |
| 6 | | | | | | | |

A: MODE
B: FIXING TEMPERATURE LIMITER VALUES AT TIME OF 100% PERFORMANCE, 82% SPEC., INTERRUPTION AND RESTART (SPEED UNIT: cpm)
C: TEMPERATURE AT TIME OF MODE SETTING
D: HUMIDITY AT TIME OF MODE SETTING
E: ALLOWABLE TEMPERATURE DIFFERENCE RANGE
F: ALLOWABLE HUMIDITY DIFFERENCE RANGE

NEXT PAGE    RETURN    SYSTEM STATUS    OTHER MACHINE

3201

IMAGE FORMING APPARATUS AND IMAGE FORMING SYSTEM

BACKGROUND OF THE INVENTION

1. Field of the Invention

The present invention relates to an image forming apparatus and an image forming system which are capable of registering one or more jobs which should be executed within a predetermined time period.

2. Description of the Related Art

Conventionally, an image forming apparatus has been proposed which can be set to a copying mode, and if the apparatus has not been initialized to conditions necessary for the copying mode at the start of a copying operation, notifies the operator of the fact by displaying necessary information (see e.g. Japanese Laid-Open Patent Publication (Kokai) No. 11-174910). Therefore, if the apparatus has not been initialized to the necessary conditions, the operator is prompted to take actions, such as setting of initial conditions, execution of adjustment on items which need to be adjusted for execution of the copying operation, and execution of maintenance based on all maintenance items.

However, in such an image forming apparatus as described above, when a plurality of jobs are registered, the operator is prompted to take the above mentioned actions at the start of each job, which makes it inefficient to carry out the actions and therefore impossible to reduce downtime.

SUMMARY OF THE INVENTION

It is a first object of the present invention to provide an image forming apparatus and an image forming system which are capable of efficiently performing necessary actions to thereby reduce downtime.

It is a second object of the present invention to provide an image forming apparatus and an image forming system which are capable of efficiently performing adjustment based on adjustment items which need to be adjusted for execution of jobs to thereby reduce downtime.

It is a third object of the present invention to provide an image forming apparatus and an image forming system which are capable of notifying an operator of maintenance items unnecessary to execute maintenance based thereon, to thereby reduce downtime owing to maintenance.

To attain the first to third objects, in a first aspect of the present invention, there is provided an image forming apparatus comprising a registration device that is capable of registering at least one job, an image forming device that performs image formation according to the at least one registered job, and an action object-detecting device that detects action objects on which actions necessary for the image forming apparatus should be taken.

With the arrangement of the image forming apparatus according to the first aspect of the invention, action objects on which an action necessary for the image forming apparatus should be taken are detected. This makes it possible to efficiently take actions on the only action objects necessary for the image forming apparatus to thereby reduce downtime.

Preferably, the at least one job should be executed within a predetermined time period, and the action object-detecting device comprises an adjustment item-detecting device that detects items of adjustment to be executed for the image forming apparatus as the action objects, from contents of the at least one registered job, the image forming apparatus further comprising a display device that displays an adjustment table describing the items of adjustment detected by the adjustment item-detecting device, an adjustment item-selecting device that selects at least one item of adjustment on which adjustment should be executed, from the items of adjustment described in the adjustment table displayed by the display device, and an adjustment executing device that executes adjustment on the at least one item of adjustment selected by the adjustment item-selecting device.

With the arrangement of the preferred embodiment, items of adjustment to be executed for the image forming apparatus are detected from contents of the at least one registered job, and an adjustment table is displayed in which the items of adjustment are described. An item of adjustment on which adjustment should be executed is selected from the items of adjustment described in the adjustment table, and adjustment is executed on the selected item of adjustment. This makes it possible to efficiently perform adjustment on the items of adjustment necessary for execution of the at least one job, to thereby reduce downtime.

More preferably, the image forming apparatus further comprises an output device that outputs contents of the adjustment table displayed by the display device.

More preferably, the image forming apparatus further comprises an adjustment contents-storing device that stores contents of the adjustment executed by the adjustment executing device.

More preferably, a post-processing apparatus is connected to the image forming apparatus, and the items of adjustment include items of adjustment for the post-processing apparatus.

To attain the first and third objects, preferably, the at least one job comprises a plurality of jobs, and the action object-detecting device comprises a discriminating device that is operable when all of the at least one registered job are executed, to discriminate between items which require execution of maintenance and items which do not require execution of maintenance from items of maintenance for the image forming apparatus as the action objects, the image forming apparatus comprising a display device that displays the items which require execution of maintenance and the items which do not require execution of maintenance in respective different manners of display according to results of the discrimination by the discriminating device, and a permitting device that permits start of execution of the at least one registered job upon completion of maintenance on the items which require execution of maintenance.

With the arrangement of the preferred embodiment, in executing all of the at least one registered job, discrimination is carried out between items which require execution of maintenance and items which do not require execution of maintenance from items of maintenance for the image forming apparatus, and the items which require execution of maintenance and the items which do not require execution of maintenance are displayed in respective different manners of display, according to results of the discrimination, and start of execution of the at least one registered job is permitted upon completion of maintenance on the items which require execution of maintenance. This makes it possible to notify the operation of items of maintenance which do not require execution of maintenance, to thereby reduce downtime caused by maintenance operations.

More preferably, one of the different manners of display comprises shading in gray the items.

More preferably, the image forming device comprises a plurality of image forming devices, and the image forming apparatus further comprises a control device that controls the action object-detecting device, the display device, and the permitting device such that when the registration device registers the at least one job, an image forming device which should execute image formation according to each of the at least one job is selectively set from the plurality of image forming devices, and the start of execution of the job is permitted in association with the set image forming device.

More preferably, the image forming apparatus further comprises a management device connected to the plurality of image forming devices for management thereof, and the management device has incorporated wherein the registration device, the action object-detecting device, the display device, the permitting device, and the control device.

To attain the first and third objects, preferably, the at least one job comprises a plurality of jobs, and the action object-detecting device comprises a counting device that counts a number of times of image formation by the image forming device, an endurance limit count-holding device that holds an endurance limit number of times of operation associated with each of components provided in the image forming apparatus, an image formation number-of-time estimating device that estimates a count value by the counting device when all of the at least one registered job are to be executed, as an estimated number of times of image formation, and a discriminating device that compares the estimated number of times of image formation estimated by the image formation number-of-time estimating device with the endurance limit number of times of operation held by the endurance limit count-holding device, and discriminates, based on results of the comparison, between components of which the endurance limit number of times of operation exceeds the estimated number of times of image formation and components of which the endurance limit number of times of operation does not exceed the estimated number of times of image formation, and the image forming apparatus further comprises a display device that displays items indicative of the components of which the endurance limit number of times of operation exceeds the estimated number of times of image formation and items indicative of the components of which the endurance limit number of times of operation does not exceed the estimated number of times of image formation, in respective different manners of display according to results of the determination by the determining device, and a permitting device that permits start of execution of the at least one registered job, when maintenance of the components of which the endurance limit number of times of operation does not exceed the estimated number of times of image formation has been completed.

With the arrangement of the preferred embodiment, in executing all of the at least one registered job, the endurance limit number of times of operation associated with each of components provided in the image forming apparatus is compared with the estimated number of times of image formation, and discrimination is carried out, based on results of the comparison, between components of which the endurance limit number of times of operation exceeds the estimated number of times of image formation and components of which the endurance limit number of times of operation does not exceed the estimated number of times of image formation, and respective items indicative of the components of which the endurance limit number of times of operation exceeds the estimated number of times of image formation and respective items indicative of the components of which the endurance limit number of times of operation does not exceed the estimated number of times of image formation are displayed in respective different manners of display according to results of the discrimination. Start of execution of the at least one registered job is permitted when maintenance of the components of which the endurance limit number of times of operation does not exceed the estimated number of times of image formation has been completed. This makes it possible to notify the operator of the items of maintenance which do not require execution of maintenance, to thereby reduce downtime caused by maintenance operations.

Preferably, one of the different manners of display comprises shading in gray the items.

More preferably, the image forming device comprises a plurality of image forming devices, and the image forming apparatus further comprises a control device that controls the action object-detecting device, the display device, and the permitting device such that when the registration device registers the at least one job, an image forming device which should execute image formation according to each of the at least one job is selectively set from the plurality of image forming devices, and the start of execution of the job is permitted in association with the set image forming device.

More preferably, the image forming apparatus further comprises a management device connected to the plurality of image forming devices for management thereof, and the management device has incorporated therein the registration device, the action object-detecting device, the display device, the permitting device, and the control device.

To attain the first and third objects, preferably, the at least one job comprises a plurality of jobs, and the image forming apparatus further comprises a process configuration device that performs configuration of processes by the image forming device according to a mode associated with each of the at least one job, the action object-detecting device comprising a measuring device that measures an ambient environment value representative of an ambient environment of the image forming device, a holding device that holds the ambient environment value measured by the measuring device when the process configuration device performs the configuration of the processes, in association with the processes configuration, and a determining device that compares the ambient environment value held by the holding device in association with the configuration of the processes by the process configuration device for each of the at least one registered job with the ambient environment value measured by the measuring device, and determines, based on results of the comparison, whether or not it is necessary to re-configure the processes, as the action objects, already configured for each of the at least one registered job, the image forming apparatus further comprising a display device that displays respective items indicative of process configurations associated with the at least one registered job in respective different manners of display according to results of the determination by the determining device, and a permitting device that permits start of execution of the at least one registered job, when configuration of the processes for jobs which require re-configuration of the processes already configured has been completed.

With the arrangement of the preferred embodiment, in executing all of the at least one registered job, it is determined whether or not it is necessary to re-configure the processes already configured for each of the at least one registered job, and respective items indicative of process configurations associated with the at least one registered job are displayed according to results of the determination, in respective different manners of display. Start of execution of the at least one registered job is permitted when configuration of the processes for jobs which require re-configuration of the processes already configured has been completed. This makes it possible to notify the operator of items of maintenance which do not require execution of maintenance, to thereby reduce downtime caused by maintenance operations.

More preferably, out of the items indicative of the process configurations associated with the at least one registered job, the display device causes items indicative of process configurations which do not require re-configuration, to be shaded in gray.

More preferably, the image forming device comprises a plurality of image forming devices, and the image forming apparatus further comprises a control device that controls the action object-detecting device, the display device, and the permitting device such that when the registration device registers the at least one job, an image forming device which should execute image formation according to each of the at least one job is selectively set from the plurality of image forming devices, and the start of execution of the job is permitted in association with the set image forming device.

More preferably, the image forming apparatus further comprising a management device connected to the plurality of image forming devices for management thereof, and the management device has incorporated therein the registration device, the action object-detecting device, the display device, the permitting device, and the control device.

To attain the first and third objects, preferably, the at least one job comprises a plurality of jobs, and the image forming apparatus comprises a plurality of sheet feeding devices that feed sheets to the image forming device, and a switching device that switches between the sheet feeding devices according to a mode associated with each of the at least one registered job, the action object-detecting device comprising sheet feeding number-of-time counting devices that are provided in association with respective ones of the sheet feeding devices, for counting numbers of times of sheet feeding from the sheet feeding devices, detecting devices that are provided in association with respective ones of the sheet feeding devices, for detecting respective numbers of sheets that the sheet feeding devices contain and a discriminating device that compares, for respective ones of the sheet feeding devices used when all of the at least one registered job are executed, the respective numbers of sheets with respective required numbers of times of sheet feeding to be counted by a corresponding one of the sheet feeding number-of-time counting devices, and based on results of the comparison, discriminates ones of the sheet feeding devices of which the respective numbers of sheets, as the action objects, are smaller than the respective required numbers of sheets, and ones of the sheet feeding devices of which the respective numbers of sheets are equal to or larger than the respective required numbers of sheets, the image forming apparatus comprising a display device that displays items indicative of the ones of the sheet feeding devices of which the respective numbers of sheets are smaller than the respective required numbers of sheets, and items indicative of the ones of the sheet feeding devices of which the respective numbers of sheets are equal to or larger than the respective required numbers of sheets, in respective different manners of display according to results of the discrimination by the discriminating device, and a permitting device that permits start of execution of the at least one registered job, when replenishment of sheets to the ones of the sheet feeding devices of which the respective numbers of sheets are smaller than the respective required number of sheets, is completed.

With the arrangement of the preferred embodiment, in executing all of the at least one registered job, for each of the sheet feeding devices used for executing all of the at least one registered job, the numbers of sheets are compared with required numbers of times of sheet feeding to be counted by sheet feeding time counting devices, respectively, and based on results of the comparison, discrimination is performed between ones of the sheet feeding devices of which the respective numbers of sheets are smaller than the required numbers of sheets, and ones of the sheet feeding devices of which the numbers of sheets are equal to or larger than the required numbers of sheets, and according to results of the discrimination by the discriminating device, items indicative of the ones of the sheet feeding devices of which the numbers of sheets are smaller than the required numbers of sheets, respectively, and items indicative of the ones of the sheet feeding devices of which the numbers of sheets are equal to or larger than the required numbers of sheets, respectively, are displayed in respective different manners of display. Start of execution of the at least one registered job is permitted when replenishment of sheets to the ones of the sheet feeding devices of which the maximum numbers of sheets are smaller than the required number-of sheets, is completed.

More preferably, one of the different manners of display comprises shading in gray the items.

More preferably, the image forming device comprises a plurality of image forming devices, and the image forming apparatus further comprises a control device that controls the action object-detecting device, the display device, and the permitting device such that when the registration device registers the at least one job, an image forming device which should execute image formation according to each of the at least one job is selectively set from the plurality of image forming devices, and the start of execution of the job is permitted in association with the set image forming device.

More preferably, the image forming apparatus further comprises a management device connected to the plurality of image forming devices for management thereof, and the management device has incorporated therein the registration device, the action object-detecting device, the display device, the permitting device, and the control device.

To attain the first and third objects, in a second aspect of the present invention, there is provided an image forming system comprising at least one image forming apparatus, a management apparatus connected to the at least one image forming apparatus for communication therebetween, for managing the at least one image forming apparatus, a registration device that is capable of registering at least one object to be executed by the at least one image forming apparatus, an image forming device that performs image formation according to each of the at least one job registered by the registration device, and an action item-detecting device that detects items of actions necessary for performing the image formation.

With the arrangement of the image forming system according to the second aspect of the invention, items of actions necessary for performing the image formation are determined from the at least one registered job, a management apparatus is interconnected to at least one image forming apparatus, for management of the at least one image forming apparatus, items necessary for image formation according to each of at least one job registered by a registration device are detected. This makes it possible to efficiently perform the necessary actions necessary for execution of the at least one job, to thereby reduce downtime.

To attain the first and third objects, preferably, the at least one job should be executed within a predetermined time period, and the action item-detecting device comprises an adjustment item-detecting device that detects items of adjustment to be executed for the image forming apparatus as the action objects, from contents of the at least one registered job, the image forming apparatus further comprising a display device that displays an adjustment table describing the items of adjustment detected by the adjustment item-detecting device, an adjustment item-selecting device that selects at least one item of adjustment on which adjustment should be executed, from the items of adjustment described in the adjustment table displayed by the display device, and an adjustment executing device that executes adjustment on the at least one item of adjustment selected by the adjustment item-selecting device.

With the arrangement of the preferred embodiment, items of adjustment to be executed for each of the at least one image forming apparatus are detected from contents of the at least one registered job, and an adjustment table is displayed in which the items of adjustment are described. An item of adjustment on which adjustment should be executed is selected from the items of adjustment described in the adjustment table, and adjustment is executed on the selected item of adjustment. This makes it possible to efficiently perform adjustment on the items of adjustment necessary for execution of the at least one job, to thereby reduce downtime.

The above and other objects of the invention will become more apparent from the following description taken in conjunction with the accompanying drawings.

BRIEF DESCRIPTION OF THE DRAWINGS

FIG. 14 is a view showing an example of a screen displaying an adjustment table, which is displayed in a step S1207 of the flowchart shown in FIG. 13;

FIG. 15 is a view showing an example of a printing setup screen displayed in a step S1209 of the flowchart shown in FIG. 13;

FIG. 28 is a view showing an example of a data registration menu screen displayed on the sever 3101;

FIG. 29 is a view showing an example of a job registration menu screen displayed on the server 3101;

FIG. 34 is a view showing an example of a screen displaying a time-change component status of the image forming apparatus 3103;

FIG. 35 is a view showing an example of a screen displaying a time-change component status of the image forming apparatus 3102;

FIG. 36 is a view showing an example of a screen displaying a status of consumables of the mage forming apparatus 3103;

FIG. 37 is a view showing an example of a screen displaying a status of consumables of the mage forming apparatus 3103;

FIG. 38 is a view showing an example of a screen displaying a status of consumables of the mage forming apparatus 3102;

FIG. 39 is a view showing an example of a screen displaying a status of consumables of the mage forming apparatus 3102;

FIG. 40 is a view showing an example of a screen displaying a status of software counter consumables of the mage forming apparatus 3103;

FIG. 41 is a view showing an example of a screen displaying a status of software counter consumables of the mage forming apparatus 3102;

FIG. 42 is a view showing an example of a screen for configuring a down sequence for the image forming apparatus 3103;

FIG. 43 is a view showing an example of a screen for configuring a down sequence for the image forming apparatus 3102;

FIG. 44 is a view showing an example of a screen for configuring a thick paper mode for the image forming apparatus 3103;

FIG. 45 is view showing an example of a screen for configuring a thick paper mode for the image forming apparatus 3102;

DETAILED DESCRIPTION OF THE PREFERRED EMBODIMENTS

The present invention will now be described in detail with reference to the accompanying drawings showing preferred embodiments thereof.

Figure 1:
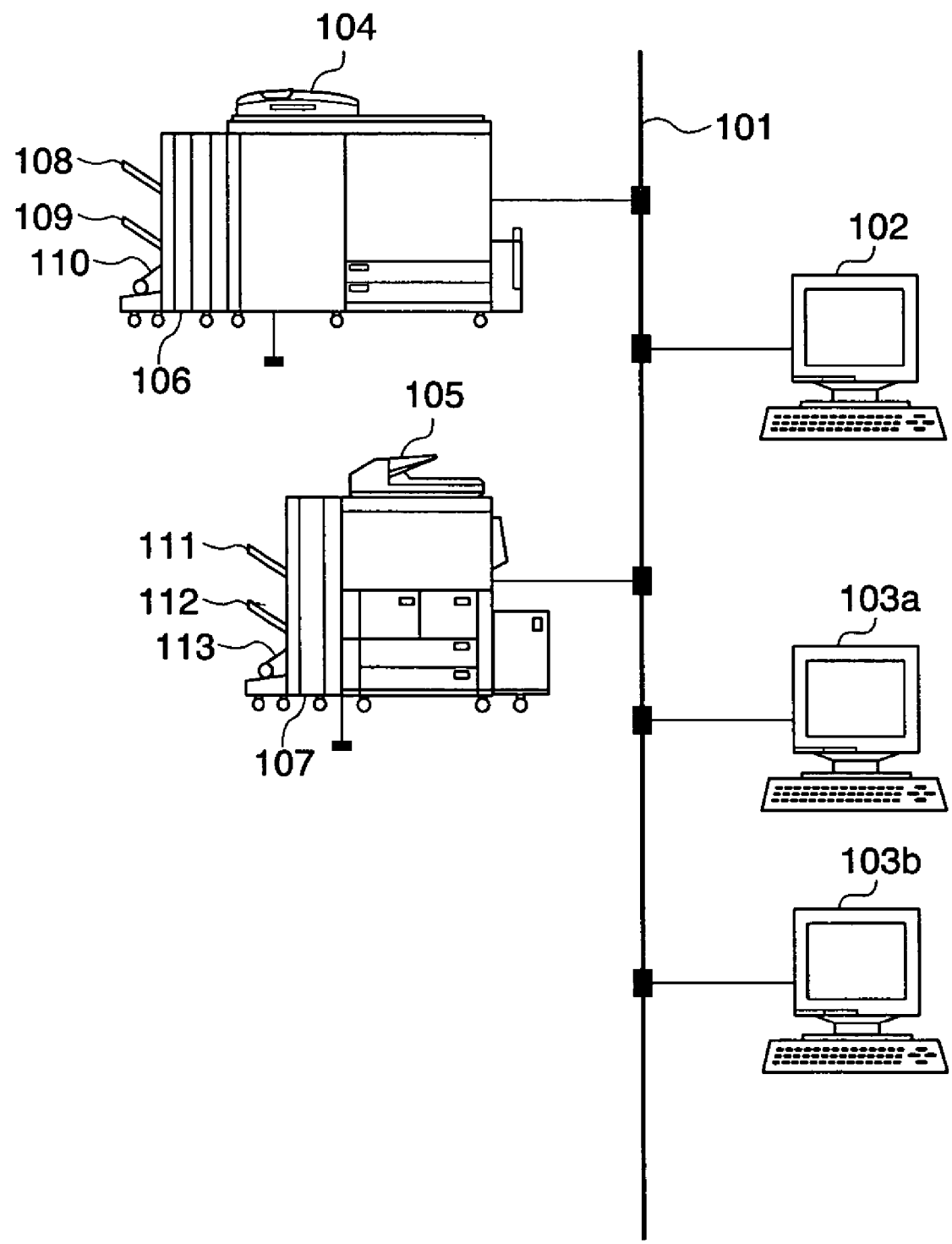
FIG. 1 is a diagram schematically showing the arrangement of an image forming system according to a first embodiment of the present invention.

FIG. 1 schematically shows the arrangement of an image forming system according to a first embodiment of the present invention.

As shown in FIG. 1, the image forming system is comprised of a computer 102 as a server, computers 103a, 103b as clients, MFP's (Multi Function Peripherals) 104, 105, and a network 101 through which these apparatuses are interconnected. It is to be understood that numerous computers (not shown) as clients are connected to the network 101 in addition to the computers 103a, 103b. Hereafter, the numerous computers as clients, including the computers 103a and 103b, will be generically referred to as the computer 103.

The MFP 104 is a color MFP capable of performing full-color scanning and printing. In the MFP 104, output sheets for printing are stacked on trays 108, 109, 110 of a finisher section 106. On the other hand, the MEP 105 is a monochrome MFP capable of performing monochrome scanning and printing. In the MFP 105, output sheets for printing are stacked on trays 111, 112, 113 of a finisher section 107.

Further, devices and apparatuses, such as MFP's other than the above-mentioned ones, scanners, printers and facsimiles, not shown, are interconnected on the network 101.

On the computer 103, application software for carrying out so-called DTP (Desk Top Publishing) operates for generation/editing of various documents/graphics. The computer 103 converts the generated documents/graphics to the PDL (Page Description Language). The PDL is delivered to the MFP 104 (105) via the network 101 to be printed out.

The MFP's 104, 105 have communication means capable of exchanging information with the computers 102, 103 via the network 101, whereby information and statuses of the MFP's are sequentially notified to the computers 102, 103. On each of the computers 102, 103, there is installed utility software operable in response to information from the MFP 104 or 105, for managing the MFP 104 or 105.

Figure 2:
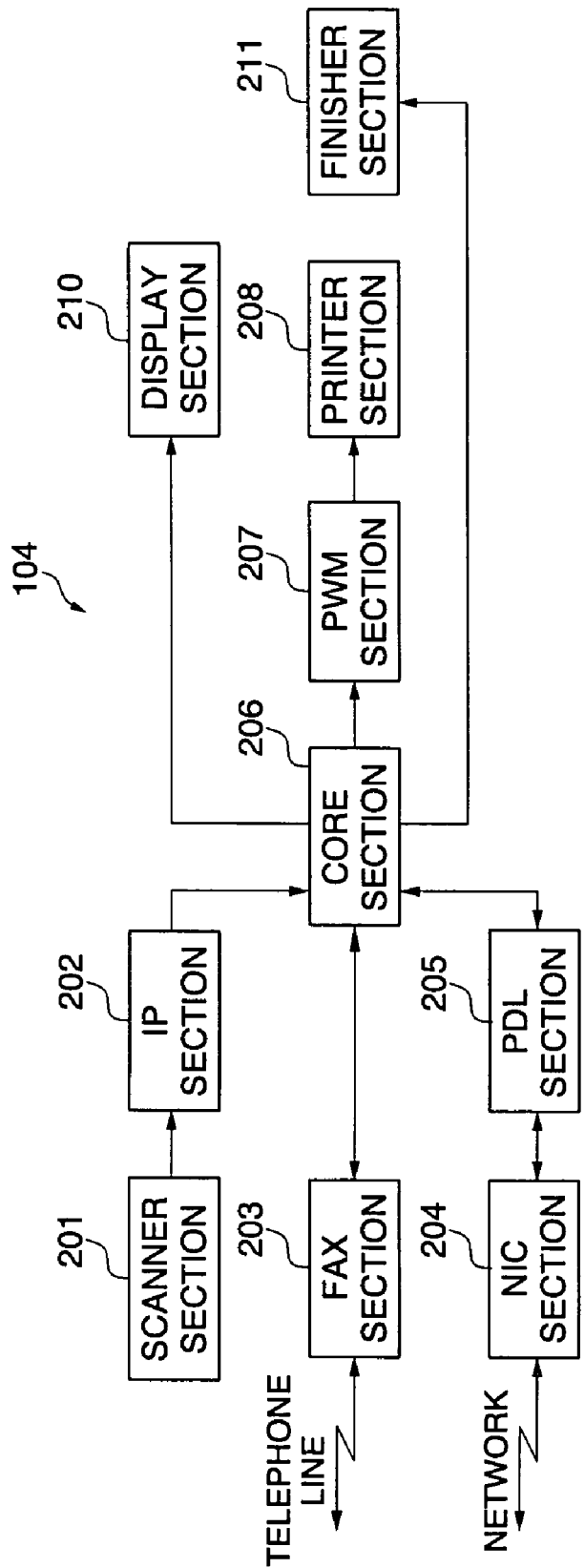
FIG. 2 is a block diagram showing the arrangement of an MFP 104 appearing in FIG. 1.

Next, the arrangement of the MFP 104 will be described with reference to FIG. 2. FIG. 2 is a block diagram showing the arrangement of the MFP 104. The MFP 104 and the MFP 105 are different from each other in that the former is a full-color MFP and the latter is a monochrome MFP. However, in many cases, a full-color apparatus includes the arrangement of a monochrome apparatus, and therefore, hereafter a description will be mainly given of the MFP 104 as the color MFP, with the MFP 105 as the monochrome MFP being additionally described as required.

As shown in FIG. 2, the MFP 104 is comprised of a scanner section 201 that reads an image, an IP (image processing) section 202 that processes the image read by the scanner section 201, a FAX section 203 that transmits and receives images using a telephone line, typified by a facsimile, an NIC (Network Interface Card) section 204 that transmits and receives image data and apparatus information using a network, a PDL section 205 that develops PDL sent from the computer 103 into an image signal, and a core section 206 that temporarily stores the image signal depending on the manner of use of the MFP 104 and determines a path for the signal.

Image data outputted from the core section 206 is delivered via a PWM (Pulse Width Modulation) section 207 to a printer section 208 that performs image formation. In the printer section 208, an image is printed on a sheet (output sheet) based on the image data, and the sheet is delivered to a finisher section 211 (corresponding to the finisher section 106 appearing in FIG. 1) In the finisher section 211, a plurality of sheets delivered from the printer section 208 are subjected to post-processing as required, and then sequentially stacked on an associated tray.

Further, connected to the core section 206 is a display section 210 for displaying image data from the core section 206. This function of the display section 210 enables execution of so-called preview for confirming the state of an image before printing. Further, the display section 210 is capable of displaying operation information outputted from the PDL section 205 via the core section 206.

Figure 3:
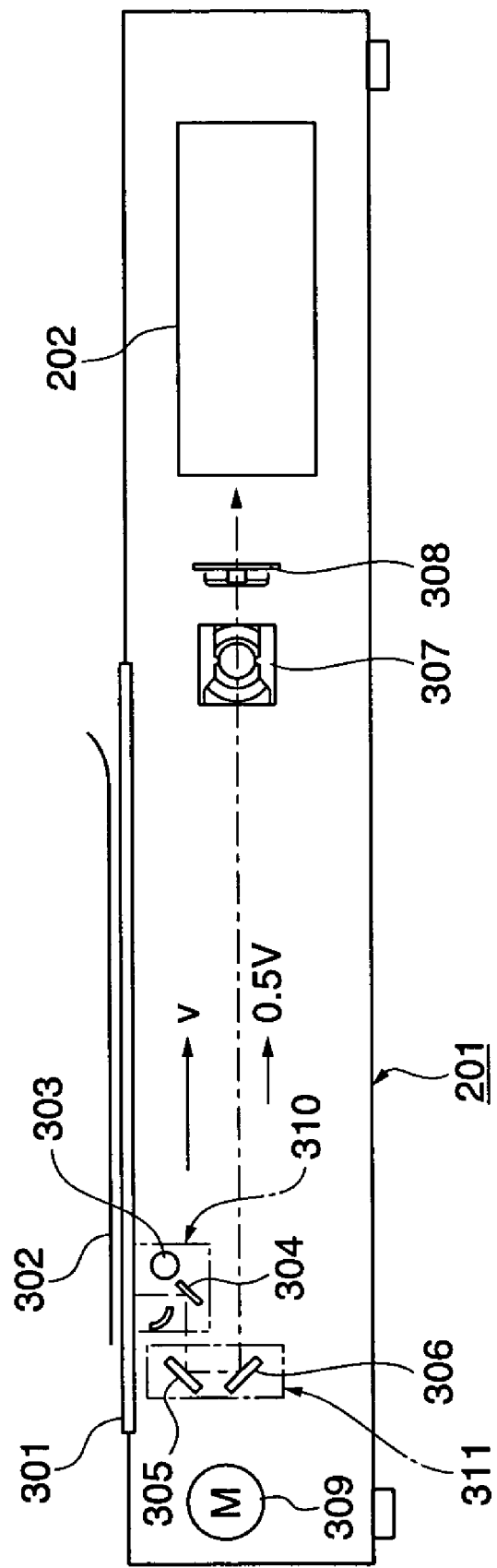
FIG. 3 is a longitudinal cross-sectional view schematically showing details of the arrangement of a scanner section 201 including an IP section 202, appearing in FIG. 2.

Next, the arrangement of the scanner section 201 will be described with reference to FIG. 3. FIG. 3 is a longitudinal cross-sectional view showing details of the arrangement of the scanner section 201 including the IP section 202 appearing in FIG. 2.

As shown in FIG. 3, the scanner section 201 has an original platen glass plate 301 on which an original 302 to be read is placed. The original 302 on the original platen glass plate 301 is irradiated with light from an illuminating lamp 303, and reflected light from the original 302 is reflected by mirrors 304, 305, 306 and then focused through a lens 307 onto a CCD sensor 308 to form an image thereon. The CCD sensor 308 converts the formed optical image into an electric signals and then outputs the signals. More specifically, the CCD sensor 308 is a color sensor comprised of three line sensors of RGB (red, green, blue), and outputs respective image signals (electric signals) of RGB. The mirror 304 and the illuminating lamp 303 are installed in a first mirror unit 310, which moves at a velocity of v. The mirrors 305, 306 are installed in a second mirror unit 311, which moves at a velocity of 0.5 v. The movement of the first and second mirror units 310, 311 causes the surface of the original 302 to be scanned for reading. The first and second mirror units 310, 311 are driven by a motor 309.

Figure 4:
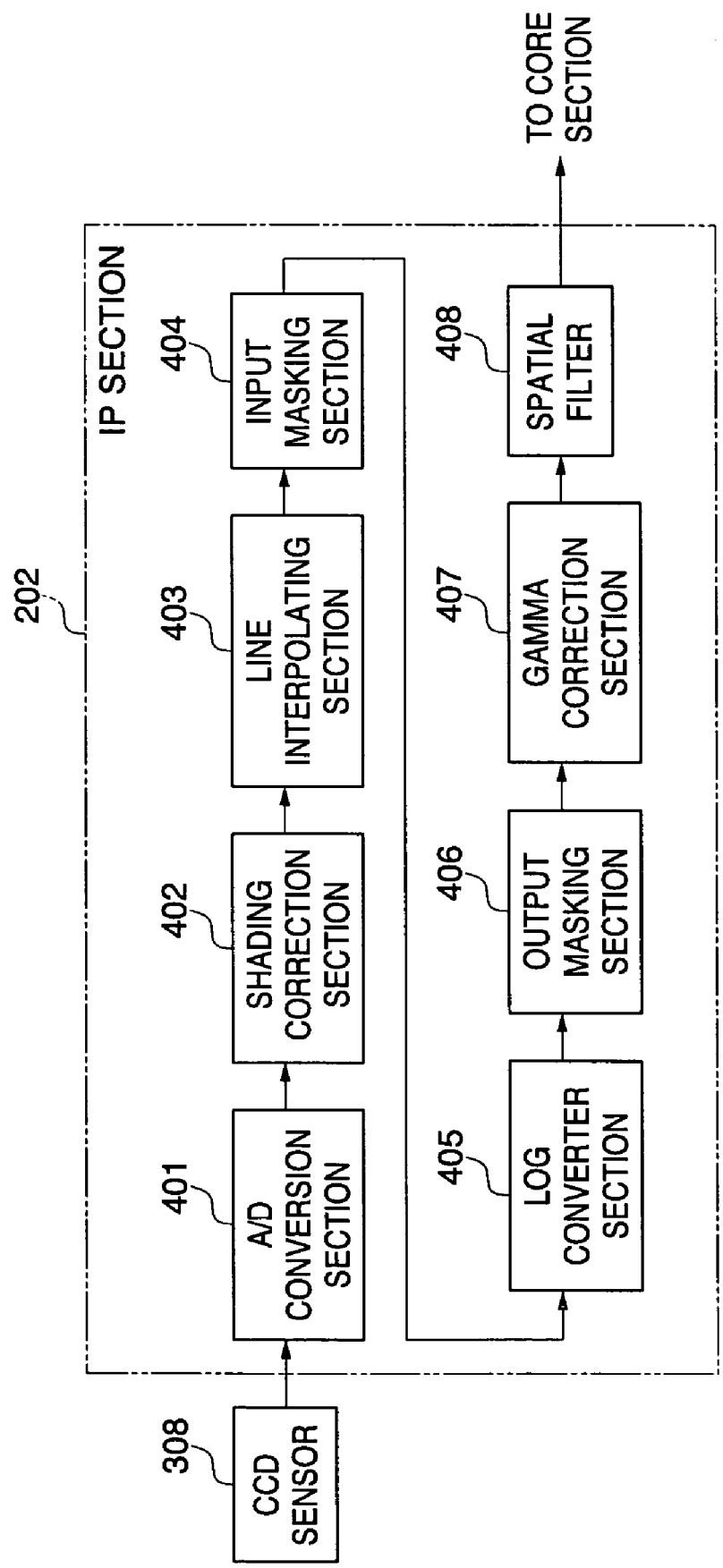
FIG. 4 is a block diagram showing the arrangement of the IP section 202.

Next, the arrangement of the IP section 202 will be described with reference to FIG. 4. FIG. 4 is a block diagram showing the arrangement of the IP section 202.

The IP section 202 includes an A/D conversion section 401 that receives the electric signals (RGB) from the CCD sensor 308 as image signals. The electric signals (RGB) from the CCD sensor 308 are subjected to gain adjustment and offset adjustment in the A/D conversion section 401, and then converted into 8-bit digital image signals R0, G0, B0 by an A/D converter thereof on a color signal-by-color signal basis. The digital image signals R0, G0, B0 are inputted to a shading correction section 402, and known shading correction is performed on each of the digital image signals R0, G0, B0 using a read signal from a standard white board on a color-by-color basis. The line sensors of the CCD sensor 308 are arranged in predetermined spaced relation, and therefore the signals delivered from the shading correction section 402 after execution of shading correction have their spatial deviation in the sub scanning direction corrected by a line interpolating section 403 implemented by line delay adjusting circuits.

The image signals outputted from the line interpolating section 403 are inputted to an input masking section 404. The input masking section 404 converts a read color space determined depending on spectral characteristics of R, G, B filters of the CCD sensor 308 to a standard color space pursuant to the NTSC (National Television System Committee) standards, and performs 3×3 matrix operation using an apparatus-specific constant set in view of characteristics, such as the sensitivity characteristics of the CCD sensor 308 and the spectral characteristics of the illuminating lamp 303, to thereby convert the digital image signals R0, G0, B0 into standard R, G, B signals.

The R, G, B signals from the input masking section 404 are inputted to a LOG converter section 405 as a luminance-to-optical density converter section. The LOG converter section 405 includes a RAM storing a lookup table (LUT), and converts the R, G, B signals as luminance signals to respective optical density signals C1, M1, Y1.

The optical density signals C1, M1, Y1 are inputted to an output masking section 406 implemented by output masking/UCR (Under Color Removal) circuits. The output masking section 406 converts the optical density signals C1, M1, Y1 into respective Y (yellow), M (magenta), C (cyan) and K (black) signals indicative of toner colors by matrix operation, and corrects C1, M1, Y1, K1 signals based on the R, G, B signals read by the CCD sensor 308 into C, M, Y, K signals based on the spectral distribution characteristics of toners, and outputs the C, M, Y, K signals.

Then, in a gamma correction section 407, gamma conversion is performed on the C, M, Y, K signals using a RAM storing a lookup table (LUT) for correction by taking the color tone characteristics of toners into consideration, whereby the C, M, Y, K signals are converted to C, M, Y, K data for image output. The data are subjected to sharpness or smoothing by a spatial filter 408, and then delivered to the core section 206.

In the case of the MFP 105, which performs monochrome image processing, A/D conversion and shading are executed for a single color by a monochrome 1-line CCD, whereafter input/output masking, gamma conversion and spatial filtering may be performed in the mentioned order, or alternatively processing may be executed in the same procedure as in the MFP 104.

Figure 5:
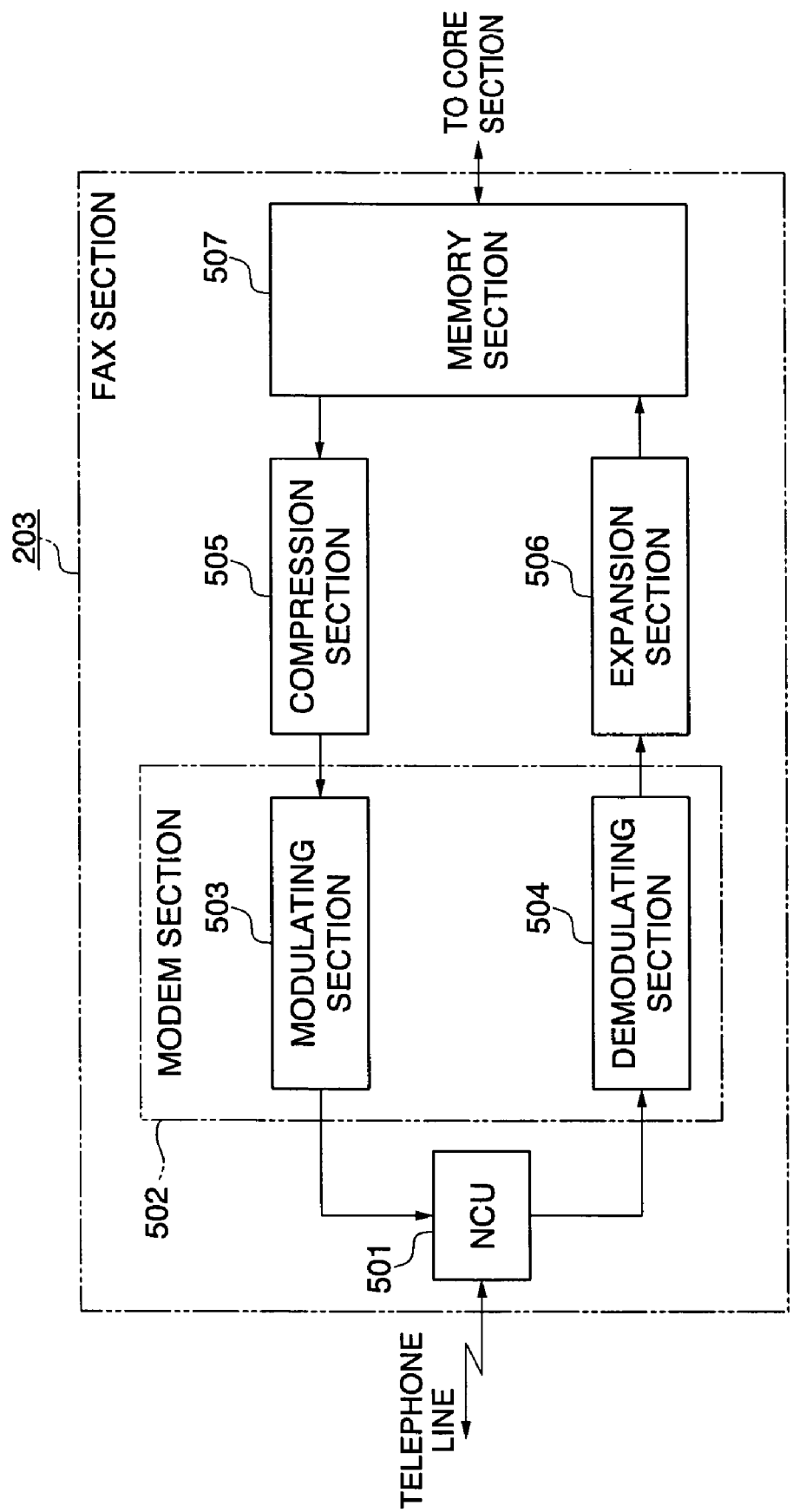
FIG. 5 is a block diagram showing the arrangement of a FAX section 203 appearing in FIG. 2.

Next, the arrangement of the FAX section 203 will be described with reference to FIG. 5. FIG. 5 is a block diagram showing the arrangement of the FAX section 203.

As shown in FIG. 5, the FAX section 203 receives a signal of data from a telephone line, and carries out voltage conversion of the signal in an NCU 501, A/D conversion and modulation in a modulating section 504 of a modem section 502, and then developing the data into raster image data in an expansion section 506. In general, the run length method is employed for compression and expansion, referred to hereinafter, in the FAX section 203. The image data converted into the raster image data is temporarily stored in a memory section 507, and checked for transfer error of the image data. After being confirmed that there is no transfer error, the image data is sent to the core section 206.

When the FAX section transmits data, an image signal of raster image data inputted from the core section 206 is compressed e.g. by the run length method in a compression section 505 and subjected to D/A conversion and modulation in a modulating section 503 of the modem section 502, followed by being sent to the telephone line via the NCU 501.

Figure 6:
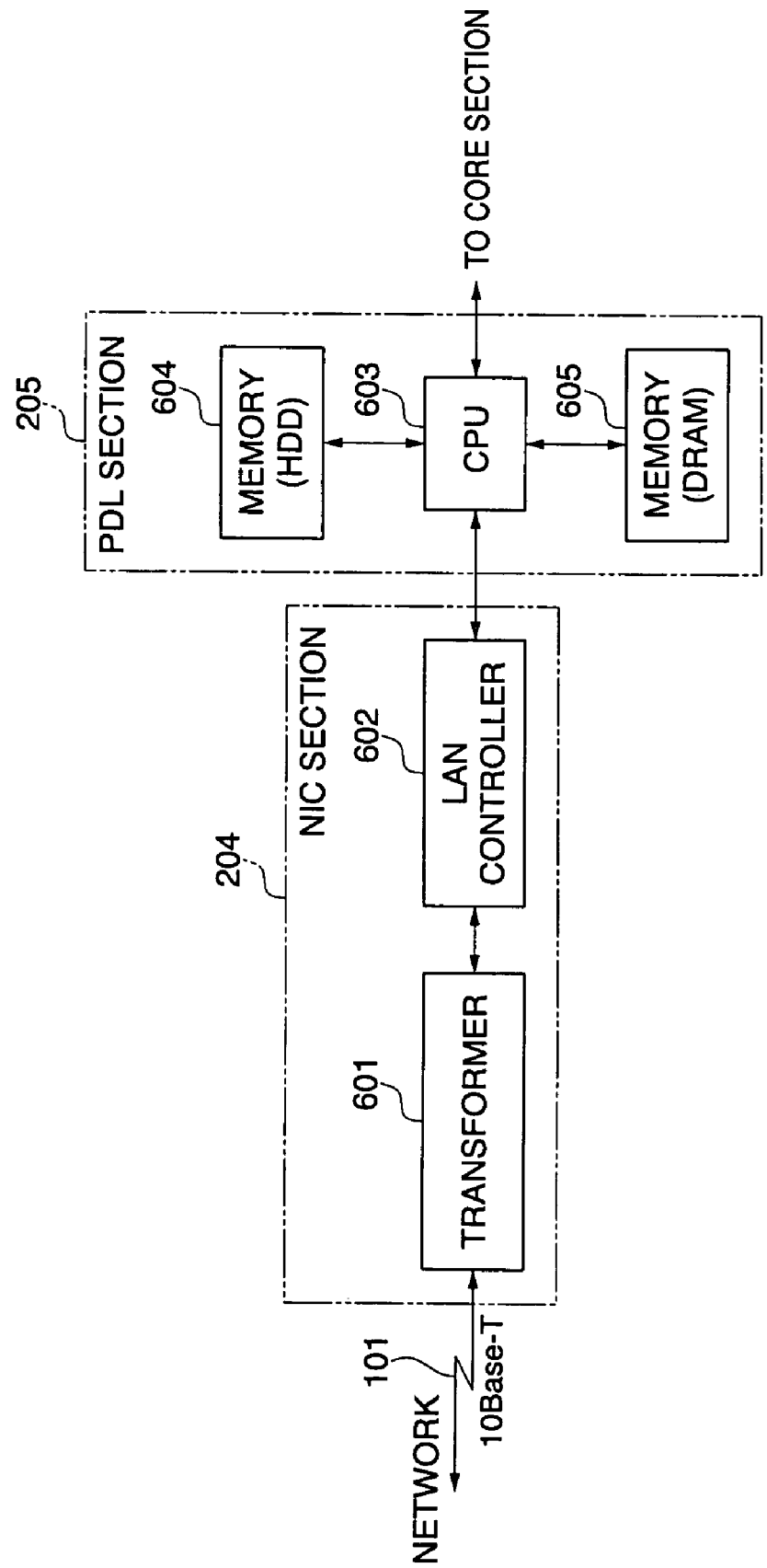
FIG. 6 is a block diagram showing the arrangement of a NIC section 204 and a PDL section 205 appearing in FIG. 2.

Next, the arrangement of the NIC section 204 will be described with reference to FIG. 6. FIG. 6 is a block diagram showing the arrangement of the NIC section 204 appearing in FIG. 2 and that of the PDL section 205 also appearing in FIG. 2.

The NIC section 204 has a function of interfacing with the network 101. This interface function is to exchange information with an external apparatus using an Ethernet (registered trademark) cable, such as a 10Base-T cable or a 100Base-TX cable.

When the NIC section 204 receives a signal of information from an external apparatus, first, the received signal is subjected to voltage conversion in a transformer 601, and then delivered to a LAN controller 602. The LAN controller 602 includes a first buffer memory (not shown) for storing information carried by the received signal, and determines whether or not the information is necessary information, and then delivers the information from the first buffer memory to a second buffer memory (not shown), whereafter the information is outputted to the PDL section 205.

When the NIC section 204 transmits a signal of information to an external apparatus, necessary information is added to data inputted from the PDL section 205, by the LAN controller 602, whereafter the data is sent to the network 101 via the transformer 601 as the signal.

Next, the arrangement of the PDL section 205 will be described with reference to FIG. 6.

Image data generated by application software operating on the computer 103 is written in a PDL (Page Description Language) which is a combination of image-describing elements, such as character codes, graphic codes, and raster image data, for describing text, graphics and a photograph, respectively. The PDL is typified by the PostScript (registered trademark) language of Adobe Systems Incorporated.

The PDL section 205 converts the PDL data into raster image data. In doing this, first, the PDL data outputted from the NIC section 204 is delivered via a CPU 603 to a large-capacity memory 604 implemented e.g. by a hard disk drive (HDD) and stored in the memory 604, as shown in FIG. 6. In the memory 604, data is managed and stored on a job-by-job basis. Then, the CPU 603 carries out so-called raster image processing (RIP) to thereby develop the PDL data into raster image data. The obtained raster image data is stored in a fast accessible memory 605 implemented e.g. by a DRAM such that the C, M, Y, K color components of the data are separately stored in units of pages, on a job-by-job basis. Each page of the stored raster image data is delivered to the core section 206 via the CPU 603 in accordance with the status of the printer section 208. Further, in the PDL section 205, operation information is generated and delivered to the display section 210 via the core section 206.

Figure 7:
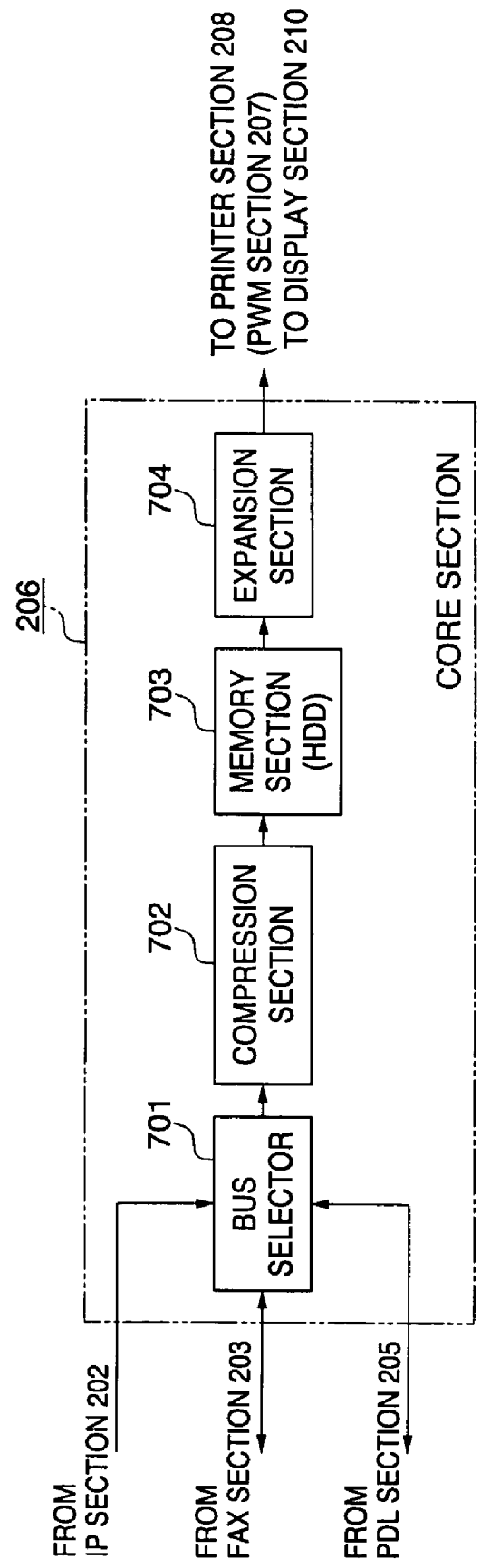
FIG. 7 is a block diagram showing the arrangement of a core section 206 appearing in FIG. 2.

Next, the arrangement of the core section 206 will be described with reference to FIG. 7. FIG. 7 is a block diagram showing the arrangement of the core section 206 appearing in FIG. 2.

As shown in FIG. 7, the core section 206 includes a bus selector 701. The bus selector 701 is in charge of performing, so to speak, traffic control in the case where the MFP 104 (105) is used. More specifically, the bus selector 701 switches buses according to selected functions of the MFP 104 (105), such as copying, network scanning, network printing, facsimile transmission/reception, or screen display.

For execution of the functions (1) to (6) enumerated below, respective data paths are selected by bus switching, as follows:

(1) copying: scanner section 201→core section 206→printer section 208

(2) network scanning: scanner section 201→core section 206→NIC section 204

(3) network printing: NIC section 204→core section 206→printer section 208

(4) facsimile transmission: scanner section 201→core section 206→FAX section 203

(5) facsimile reception: FAX section 203→core section 206→printer section 208

(6) screen display: scanner section 201, FAX section 203 or NIC section 204→core section 206→display section 210

Image data outputted via the bus selector 701 is delivered to the printer section 208 (PWN section 207), the display section 210 or the finisher section 211 via a compression section 702, a memory section 703 comprised of a large-capacity memory implemented e.g. by a hard disk drive (HDD), and an expansion section 704. The compression section 702 employs a common compression method, such as JPEG, JBIG or ZIP. The compressed image data is managed on a job-by-job basis, and stored in the memory section 703, together with additional data including a file name, a creator, a preparation date and time, and a file size.

Further, if a job number and a password are set and stored together with the above data, it is possible to support a personal box function. This function is not only for temporarily storing data but also for preventing the data from being printed out (read out from the memory section 703) by a person other than a certain person authenticated by the password. When an instruction is given for printout of a stored job, authentication is executed based on the password, and then corresponding data is read from the memory section 703 and expanded into raster image data in the expansion section 704, followed by being delivered to the printer section 208.

Figures 8A, 8B:
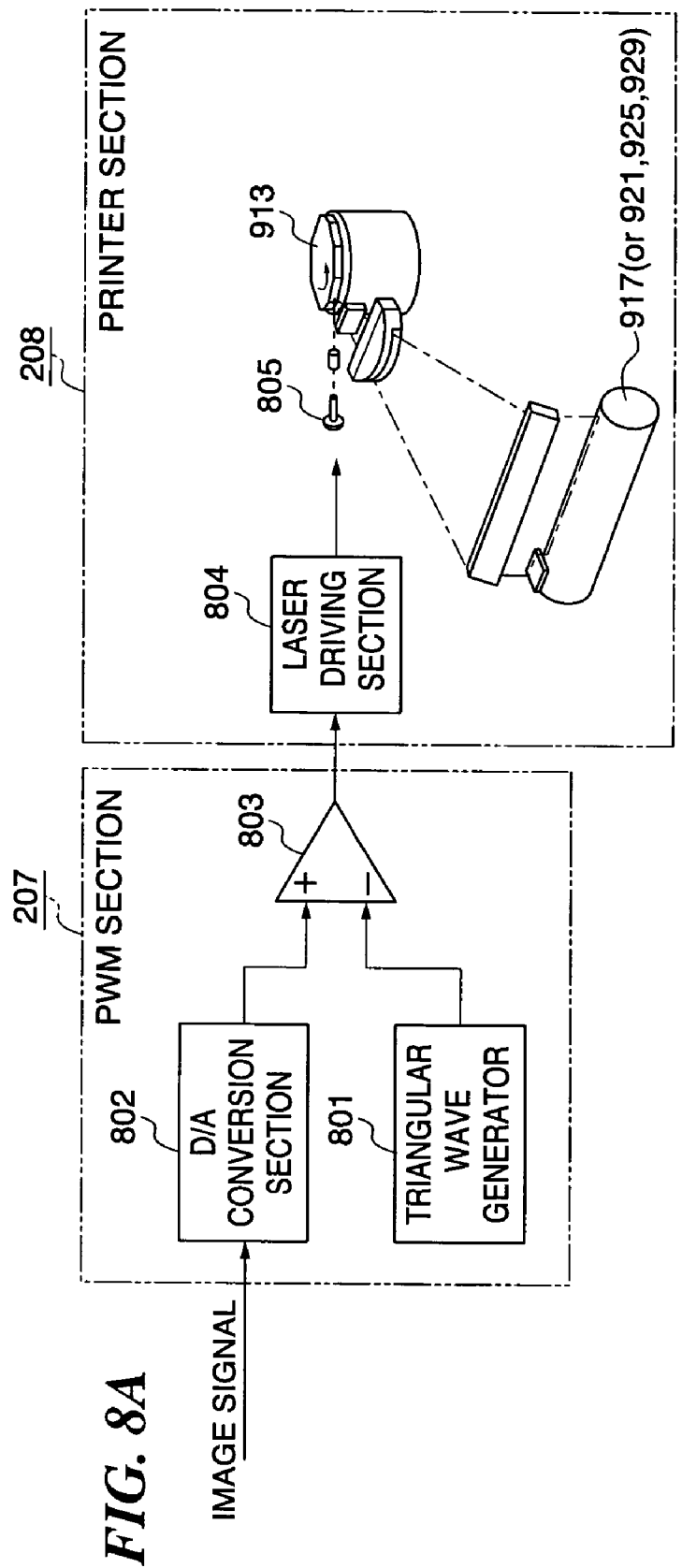
FIG. 8A is a block diagram showing the arrangement of a PWM section 207 and a printer section 208 appearing in FIG. 2.
FIG. 8B is signal waveform diagram showing waveforms of respective output signals from a triangular wave generator 801, a D/A conversion section 802, a comparator 803 appearing in FIG. 8A.

Next, the arrangement of the PWN section 207 will be described with reference to FIGS. 8A and 8B. FIG. 8A is a block diagram showing the arrangement of the PWN section 207 appearing in FIG. 2 and that of the printer section 208 also appearing in FIG. 2, while FIG. 8B is a diagram showing respective waveforms of output signals from a triangular wave generator 801, a D/A conversion section 802, and a comparator 803 each appearing in FIG. 8A. It should be noted that there are provided PWM sections 207 for the Y, M, C, K colors, respectively. However, in FIG. 2, they are collectively shown as the PWN section 207, and in FIG. 8A, reference numeral 207 designates a specific one of the specific PWM sections.

Image data subjected to color-separation into Y, M, C, K colors and outputted from the core section 206 (or monochrome image data in the case of the MFP 105) pass through the respective associated PWN sections 207 to the printer section 208, wherein they are subjected to image formation. As shown in FIG. 8A, the PWN section 207 includes the triangular wave generator 801 and the D/A conversion section 802 that converts an inputted digital image signal to an analog signal. A signal (corresponding to a waveform "a" appearing in FIG. 8B) from the triangular wave generator 801 and an analog signal (corresponding to a waveform "b" appearing in FIG. 8B) from the D/A conversion section 802 have respective values thereof compared with each other by the comparator 803, and the results of comparison are delivered as an output signal (corresponding to a waveform "c" appearing in FIG. 8B) from the comparator 803 to a laser driving section 804. Each of semiconductor lasers 805 provided for the C, M, Y, K colors emits a laser beam according to an output signal from the associated one of the comparators 803 supplied with the C, M, Y, K analog signals. The laser beams are scanned by a polygon scanner 913, and applied onto photosensitive drums 917, 921, 925, 927, described in detail hereinbelow with reference to FIG. 9, respectively.

Figure 9:
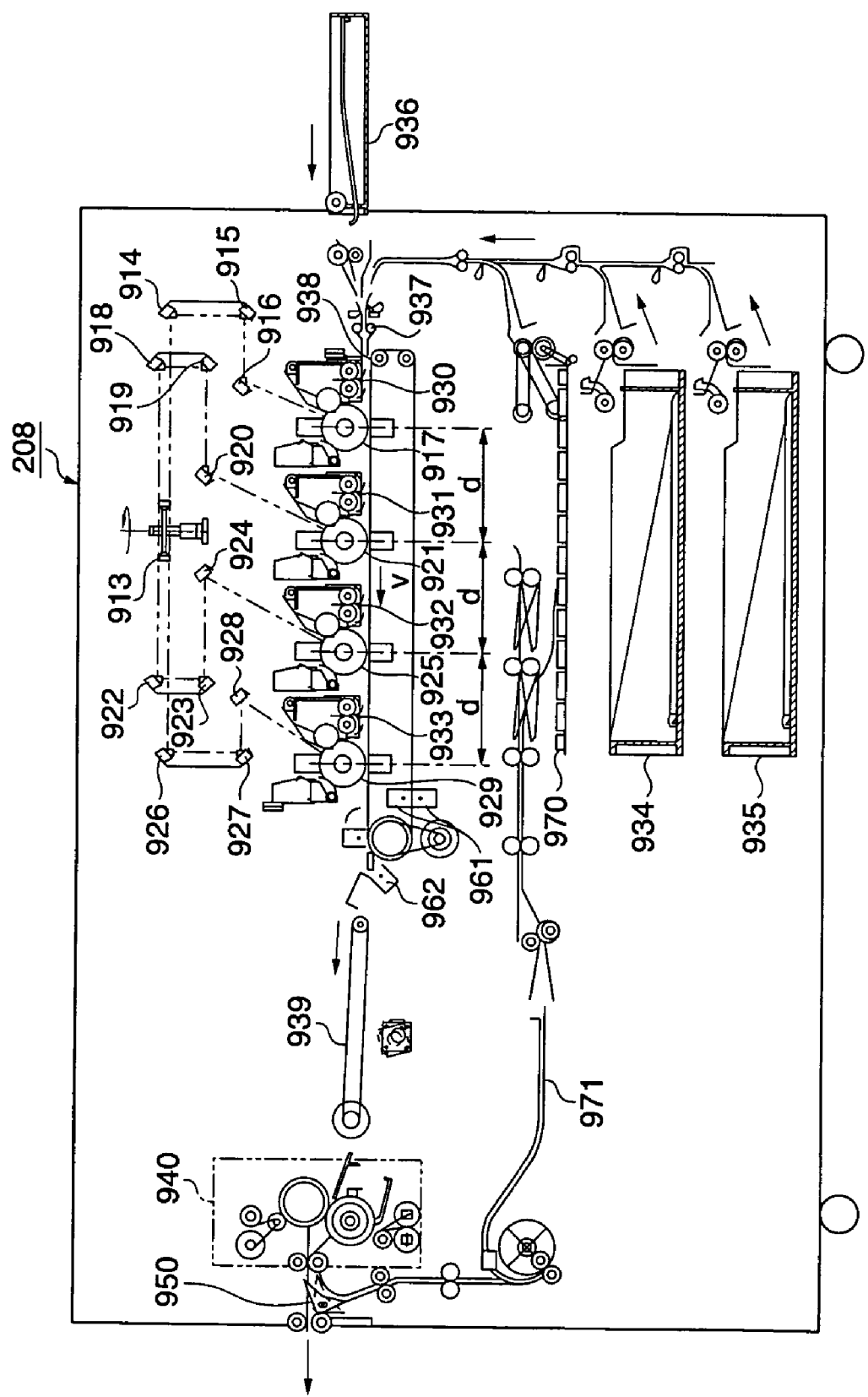
FIG. 9 is a longitudinal cross-sectional view showing details of the arrangement of the printer section 208 of the MFP 104 appearing in FIG. 1.

Next, the arrangement of the printer section 208 of the color MFP 104 will be described in detail with reference to FIG. 9. FIG. 9 is a longitudinal cross-sectional view showing details of the arrangement of the printer section 208 of the MFP 104 appearing in FIG. 1.

As shown in FIG. 9, the printer section 208 includes the polygon mirror 913, which receives the four laser beams emitted from the respective four semiconductor lasers appearing in FIG. 8A. One of the four laser beams reaches the photosensitive drum 917 via mirrors 914, 915, 916 to scan the same. Another laser beam reaches the photosensitive drum 921 via mirrors 918, 919, 920 to scan the same. Still another laser beam reaches the photosensitive drum 925 via mirrors 922, 923, 924 to scan the same, and the other laser beam reaches the photosensitive drum 929 via mirrors 926, 927, 928 to scan the same.

A laser beam corresponding to the yellow (Y) analog signal forms an electrostatic latent image on the photosensitive drum 917. This electrostatic latent image is visualized as a toner image by yellow toner supplied from a developing device 930. A laser beam corresponding to the magenta (M) analog signal forms an electrostatic latent image on the photosensitive drum 921. This electrostatic latent image is visualized as a toner image by magenta toner supplied from a developing device 931. A laser beam corresponding to the cyan (C) analog signal forms an electrostatic latent image on the photosensitive drum 925. This electrostatic latent image is visualized as a toner image by cyan toner supplied from a developing device 932. A laser beam corresponding to the black (K) analog signal forms an electrostatic latent image on the photosensitive drum 927. This electrostatic latent image is visualized as a toner image by black toner supplied from a developing device 933. Thus, the toner images of the four colors (Y, M, C, K) are formed on the photosensitive drums 917, 921, 925, 929, respectively. The color toner images are transferred onto a sheet fed from one of sheet cassettes 934, 935 and a manual feed tray 936.

The sheet fed from one of the sheet cassettes 934, 935 and the manual feed tray 936 passes between a registration roller pair 937 to be attracted to a transfer belt 938 and conveyed by the transfer belt 938. The sheet is fed (conveyed) in timing synchronous with formation of the respective color toner images on the photosensitive drums 917, 921, 925, 929, and the color toner images are transferred onto the conveyed sheet. After the color toner images are transferred onto the sheet, the sheet is separated from the transfer belt 938 by a separator 962 and then delivered to a fixing device 940 by a conveyor belt 939. In the fixing device 940, the toner images on the sheet are fixed to the sheet by being heated under pressure. After having passed through the fixing device 940, the sheet is discharged from the printer section 208 via a switching flapper 950, or alternatively introduced into a double-sided conveying path 971.

The sheet introduced into the double-sided conveying path 971 is reversed and then conveyed to a double-sided conveying section 970. The double-sided conveying section 970 feeds the sheet again in the same timing as described above. Thus, images can be printed on both sides of the sheet.

The four photosensitive drums 917, 921, 925, 929 are arranged in equally spaced relation at intervals of distance d; each sheet is conveyed by the transfer belt 938 at a constant speed v; and the four semiconductor lasers 805 are driven in timing synchronous with conveyance of the sheet.

Figure 10:
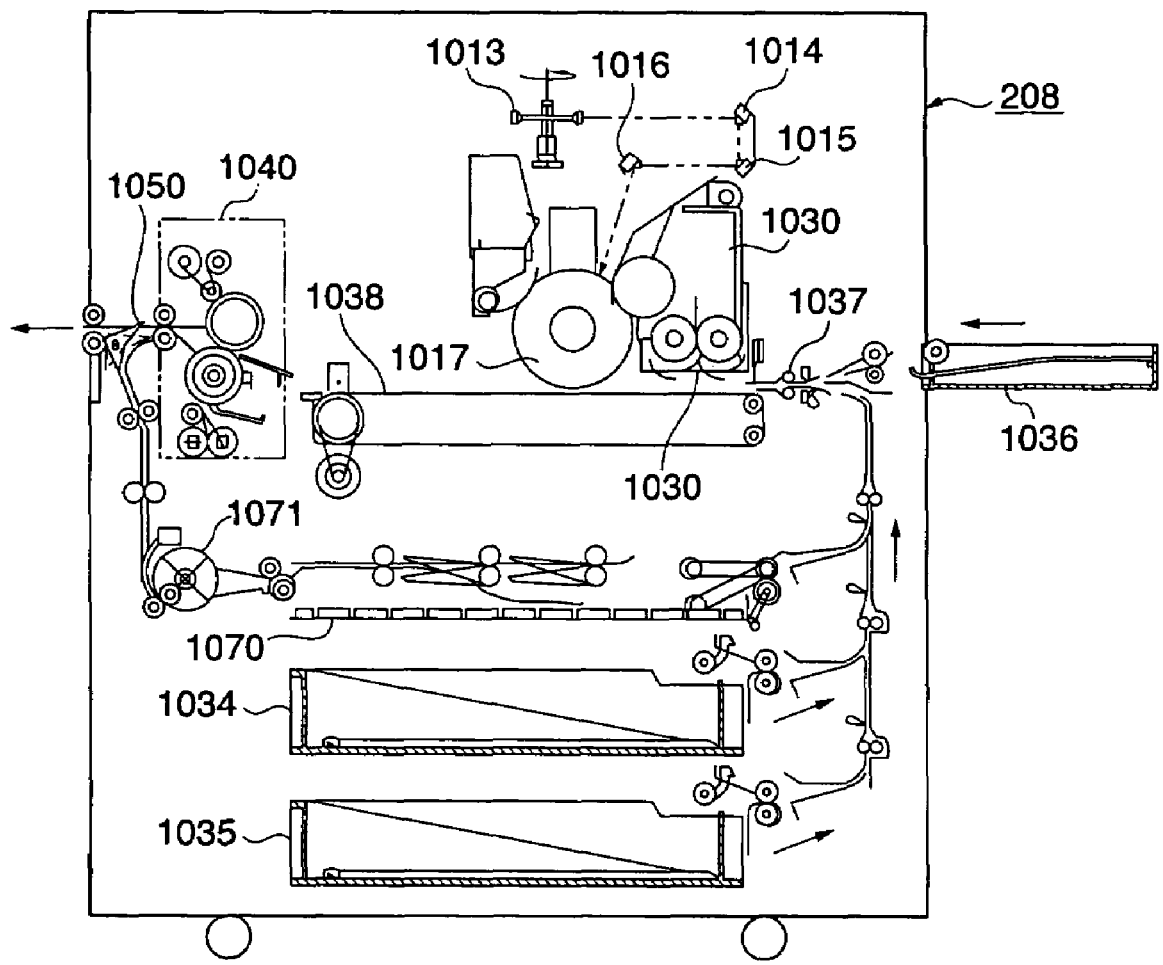
FIG. 10 is a longitudinal cross-sectional view showing details of the arrangement of a printer section 208 of an MFP 105 appearing in FIG. 1.

Next, the arrangement of the printer section 208 of the monochrome MFP 105 will be described with reference to FIG. 10. FIG. 10 is a longitudinal cross-sectional view showing details of the arrangement of the printer section 208 of the MFP 105.

In the printer section 208 of the monochrome MFP 105, a polygon mirror 1013 receives a laser beam emitted from the semiconductor laser 805, as shown in FIG. 10. The laser beam reaches a photosensitive drum 1017 via mirrors 1014, 1015, 1016 to scan the same, whereby an electrostatic latent image is formed on the photosensitive drum 1017. The electrostatic latent mage formed on the photosensitive drum 1017 is visualized as a toner image by black toner supplied from a developing device 1030. This toner image is transferred onto a sheet fed from one of sheet cassettes 1034, 1035 and a manual feed tray 1036. The sheet fed from one of the sheet cassettes 1034, 1035 and the manual feed tray 1036 passes between a registration roller pair 1037 to be attracted to a transfer belt 1038 and conveyed by the transfer belt 1038 in timing synchronous with formation of the toner image on the photosensitive drum 1017. After the toner image is transferred onto the sheet, the sheet is separated from the transfer belt 1038 and then delivered to a fixing device 1040. In the fixing device 1040, the toner image on the sheet is fixed to the sheet by being heated under pressure. After having passed through the fixing device 1040, the sheet is discharged from the printer section 208 via a switching flapper 1050, or alternatively introduced into a double-sided conveying path 1071.

The sheet introduced into the double-sided conveying path 1071 is reversed and then conveyed to a double-sided conveying section 1070. The double-sided conveying section 1070 feeds the sheet again in the same timing as described above. Thus, images can be printed on both sides of the sheet.

Figures 11, 12:
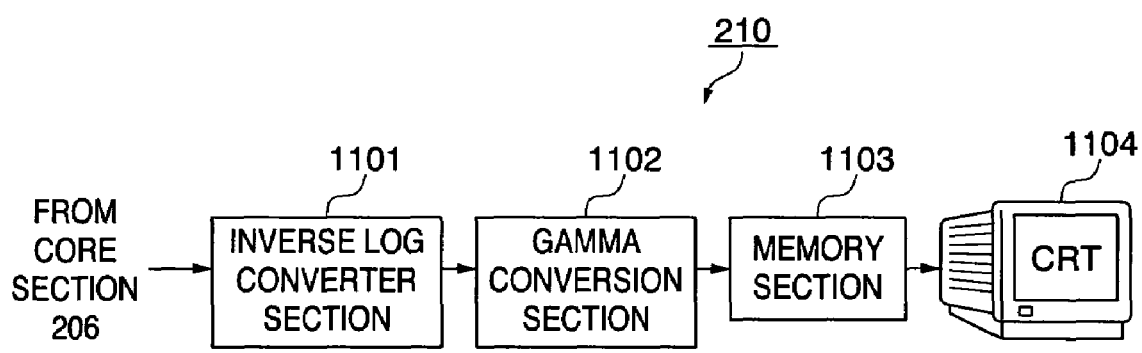
FIG. 11 is a block diagram showing the arrangement of a display section 210 appearing in FIG. 2.
FIG. 12 is a diagram showing an example of mode-specific adjustment items associated with modes of the MFP's 104, 105 appearing in FIG. 1.

Next, the arrangement of the display section 210 ill be described with reference to FIG. 11. FIG. 11 is a block diagram showing the arrangement of the display section 210.

As shown in FIG. 11, the display section 210 includes an inverse LOG converter section 1101. The inverse LOG converter section 1101 converts image data outputted as CMYK data from the core section 206 to RGB data. A gamma conversion section 1102 performs gamma-conversion of the RGB data using a lookup table, so as to adapt the RGB data to the color characteristics of a display device 1104 formed e.g. by a CRT (Cathode Ray Tube). After the gamma conversion, the image data is stored in a memory 1103, and then an output image corresponding to the image data is displayed on the display device 1104. This enables the display device 1104 to realize a preview function of previewing an output image for confirmation or a proof reading function of allowing an operator to check whether an image to be outputted is identical to the intended image. Further, the display section 210 is also used as an operating display section, and therefore provided with a plurality of hard keys. The display device 1104 is provided with a touch panel, not shown, on which soft keys, not shown, and information for setting modes and so on is displayed based on operation information generated by the PDL section 205. Inputs via the soft keys are delivered to the CPU 603 of the PDL section 205, and the contents of the inputs are stored therein.

Next, a description will be given of network utility software operating on the computers 103, 102.

In a network interface part (the NIC section 204 and the PDL section 205) of the MFP 104 (105), a standardized database called the MIB (Management Information Base) is constructed, and the MFP 104 (105) can communicate with the computers 102, 103 on the network 101 based on a network management protocol called the SNMP (Simple Network Management Protocol). This enables the computers 102, 103 to manage the MFP's 104, 105 and other devices and apparatuses, such as scanners, printers and facsimile machines, interconnected on the network 101.

On the computer 102 (103), software programs called utilities are operating which enable the computer 102 (103) to exchange required information with the MFP 104 (105) via the network 101 using the MIB based on the SNMP.

For example, the use of the MIB makes it possible to detect equipment information indicative of whether or not the finisher section 211 (corresponding to the finisher section 106 or 107 in FIG. 1) is connected to the MFP 104 (105) and status information indicative of whether or not printing is currently allowed, as well as to write, change, or confirm the name, installation site, and so forth of the MFP 104 (105). In short, the operator of the computer 102 (103) can confirm information of the MFP 104 (105) connected to the network 101, on the computer 102 (103). Further, by distinguishing between the computer 102 as a server and the computer 103 as a client, it is possible to impose limitations on reading/writing of the above-mentioned information.

Thus, the use of the function described above allows the operator of the computer 102 (103) to obtain all information about the equipment and status of the MFP 104 (105), the settings of the network 101, the management and control of the use state, and the history of jobs in the MFP 104 (105), etc. via the computer 102 (103).

Next, processes for adjusting the MFP 104 (105) will be described with reference to FIG. 12. FIG. 12 is a diagram showing an example of mode-specific adjustment items associated with modes of the MFP's 104, 105 appearing in FIG. 1.

In the MFP 104 (105), one or more jobs to be executed within a predetermined time period, e.g. one day, are registered in advance. The jobs are executed in order of registration. Before a first registered job is started, processing described below is executed on the MFP 104 (105) e.g. in response to a predetermined input (adjustment confirmation input) by the operator. Upon receiving the operator's predetermined input, first, the MFP 104 (105) prepares an adjustment table listing items of adjustment necessary for execution of the one or more registered jobs, based on the information of the jobs, and displays the adjustment table on the display section 210. Then, one of the adjustment items in the displayed adjustment table, which should be executed, is selected, and adjustment is executed based on the selected adjustment item, followed by writing the contents or details of the executed adjustment in the adjustment table. Further, it is possible to print out the list of the adjustment items or a specific adjustment item in the displayed adjustment table as required.

Each adjustment item which needs to be adjusted for execution of a job corresponds to a mechanical part which requires adjustment depending on each of modes included in the job, and adjustment based on each adjustment item is automatically executed by the MFP 104 (105). The adjustment items are specified in advance on a mode-by-mode basis as shown in FIG. 12. The example shown in FIG. 12 is a portion extracted from a typical adjustment table, and therefore this is not limitative. The illustrated example includes the adjustment items of clutch adjustment (CL adjustment) and air adjustment for each sheet type. Clutch adjustment is performed according to the type of a sheet because different types of sheets slide differently when a clutch is engaged or disengaged. Further, air adjustment is performed according to the type of a sheet because the feeding of sheets by air requires adjustment of the amount of blown air according to the type of a sheet.

Further, different models of apparatuses or devices may require different adjustment items. In such a case, mode-specific adjustment items can be provided on a model-by-model basis.

Figure 13:
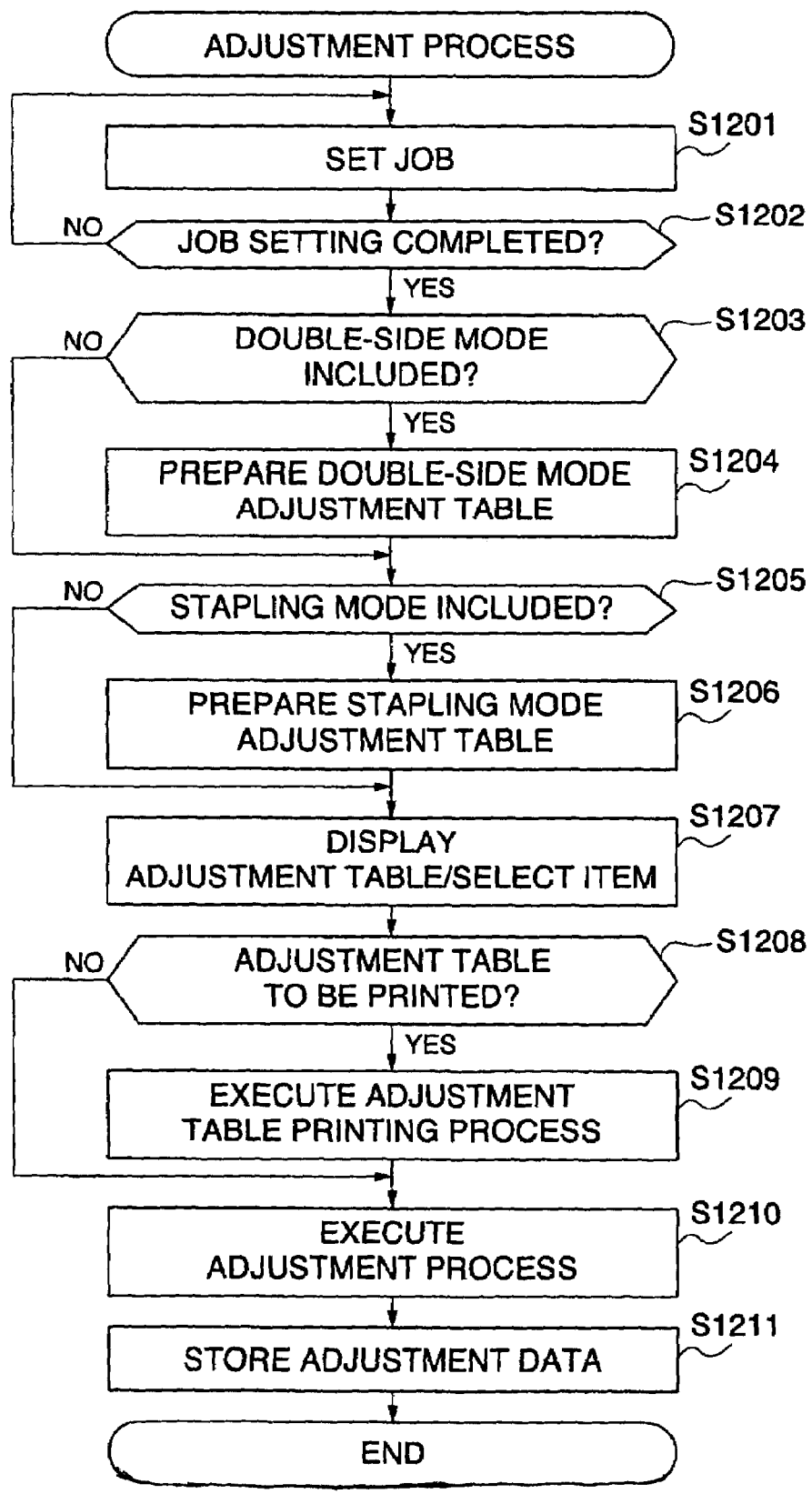
FIG. 13 is a flowchart showing a procedure of operations in an adjustment process executed by the MFP 104 appearing in FIG. 1.

Next, an adjustment process executed by the image forming apparatus according to the present embodiment will be described with reference to FIGS. 13 to 15. FIG. 13 is a flowchart of the adjustment process executed by the MFP 104 in FIG. 1. FIG. 14 is a view showing an example of a screen displaying an adjustment table, which is displayed in a step S1207 of the flowchart shown in FIG. 13, and FIG. 15 is a view showing an example of a printing setup screen displayed in a step S1209 of the flowchart shown in FIG. 13. The adjustment process shown by the flowchart in FIG. 13 is not only executed by the MFP 104 but also similarly executed by the MFP 105.

In the present embodiment, as shown in FIG. 13, first in a step S1201, settings of a job (type of an original, a double-sided mode or a single-side mode, detailed information of a post-processing mode, such as setting of a stapling mode, numerical values, etc.) entered via the computer 102 (103) by the operator are read in. The setting of a job (inputting of settings of a job) can also be performed via the display section 210 of the MFP 104 used as the operating display section. Then, in a step S1202, it is determined whether or not the setting of a job is completed. If the setting of a job (hereinafter also referred to as "the job setting") is not completed, the process returns to the step S1201. When there are a plurality of jobs which need to be set, the steps S1201 and S1202 are repeatedly executed, whereby each of the set jobs (data of settings thereof) is stored in the memory 604 of the PDL section 205.

When the job setting is completed (YES to S1202), it is determined in a step S1203 whether any of the one or more stored jobs includes the double-sided mode. If there is a job including the double-sided mode, adjustment items related to the double-sided mode are tabulated in a step S1204, whereby a double-sided mode adjustment table 1401, described in detail hereinafter with reference to FIG. 14, is formed. The adjustment items related to the double-sided mode include the items of sensor adjustment for sensors in the double-sided conveying path 971 and registration adjustment in the double-sided conveying section 970, for example. Then, the process proceeds to a step S1205. On the other hand, if there is no job including the double-sided mode, the process skips over the step S1204 to the step S1205.

In the step S1205, just as in the step S1203, it is determined whether or not any of the one or more stored jobs includes the stapling mode. If there is a job including the stapling mode, adjustment items related to the stapling mode are tabulated in a step S1206, whereby a stapling mode adjustment table 1402, described in detail hereinafter with reference to FIG. 14, is formed. The adjustment items related to the stapling mode include the items of staple position adjustment and staple width adjustment in the case of double staple, for example. Then, the process proceeds to a step S1207. On the other hand, if there is no job including the stapling mode, the process skips over the step S1206 to the step S1207.

In the step S1207, the respective lists of the adjustment tables 1401, 1402 generated in the steps S1204 and S1206 are displayed on the display section 210 in response to a predetermined input from the operator, and the operator selects adjustment items for execution of adjustment, from the adjustment tables 1401, 1402. The adjustment tables 1401, 1402 are displayed as illustrated in FIG. 14 by way of example. In the illustrated example, there is shown a list display screen showing the adjustment tables 1401, 1402 for the double-sided mode and the stapling mode. The operator carries out an operation for selecting between execution and non-execution of each adjustment (i.e. depression of an associated soft key) on the screen. In the present example, for the double-sided mode, the operator has selected "Not adjust" for a conveyance sensor, "Adjust" for a lateral registration sensor, and "Adjust" for the clutch. Further, for the stapling mode, "Adjust" is selected for each of the staple position and the staple width. When an "Apply" key is depressed, it is judged that selection of the adjustment items is completed, and the printing setup screen is displayed.

Then, in a step S1208, it is determined, based on the operator's operation on the printing setup screen, whether or not the adjustment tables 1401, 1402 or selected adjustment items are to be printed out. The printing setup screen is displayed as illustrated in FIG. 15 by way of example. The illustrated example shows a screen which displays the items, "Adjust" and "Not adjust" set in the step S1207, and on which the operator can select whether or not the whole list of adjustment items is to be printed out. Further, it is also possible to select "Print" for adjustment items for which "Adjust" has been selected, to thereby instruct printout of operating procedures of adjustment for the adjustment items or the like.

If it is determined in the step S1208 that the adjustment tables 1401, 1402 or selected adjustment items are to be printed out, printout of the adjustment tables 1401, 1402 or the selected adjustment items is carried out in a step S1209. The printout is executed by the MFP 104 (105) itself. Then, the process proceeds to a step S1210. On the other hand, if it is determined in the step S1208 that the printout is not to be executed, the process skips over the step S1209 to the step S1210.

In the step S1210, adjustment operations are executed based on the adjustment items selected in the step 51207. Then, in a step S1211, adjustment data concerning the adjustment items based on which the adjustment operations have been executed are stored and written into the adjustment tables 1401, 1402, followed by terminating the present process.

Figure 16:
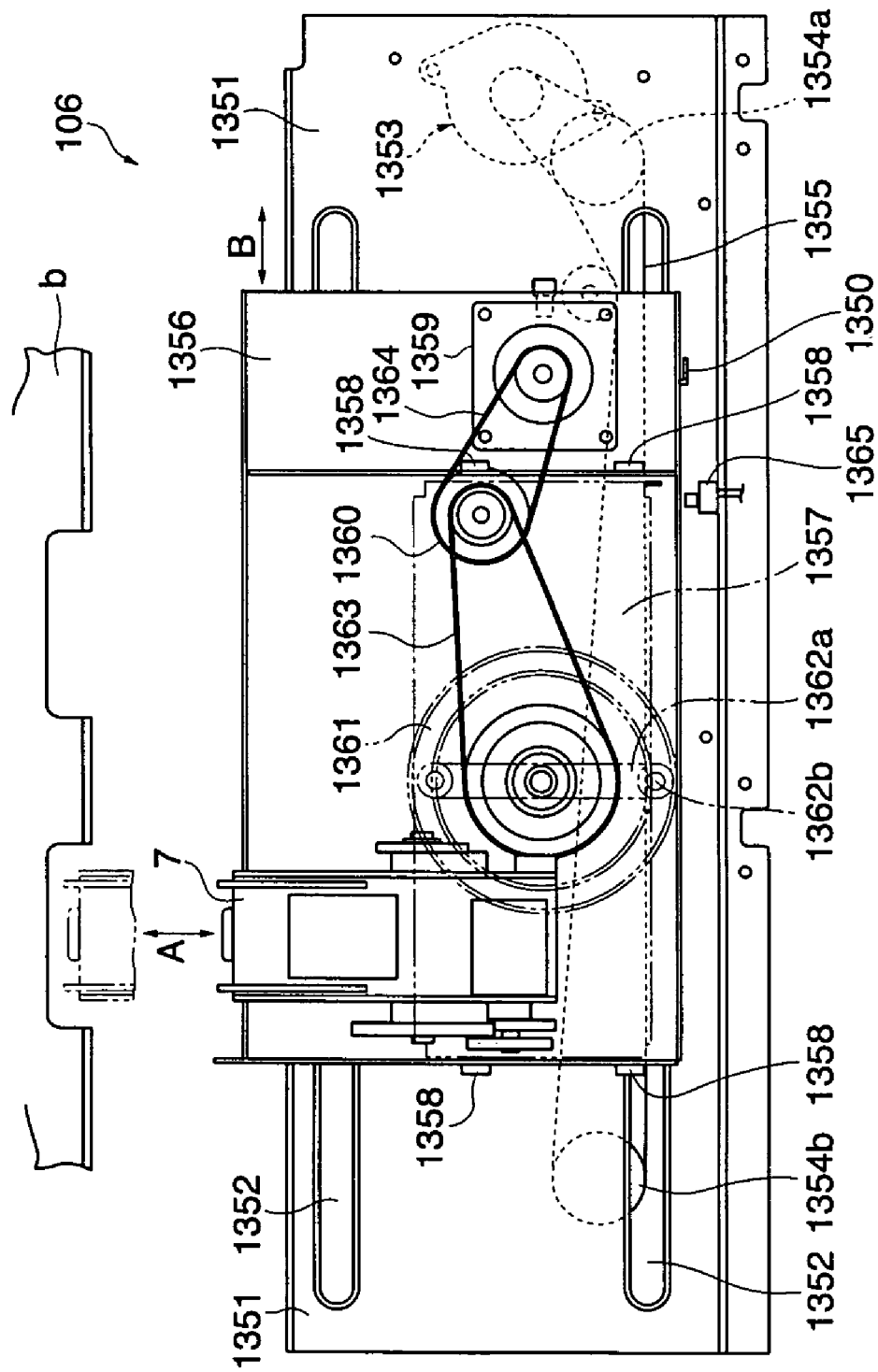
FIG. 16 is longitudinal cross-sectional view showing the arrangement of a stapling mechanism of a finisher 106.
Figure 17:
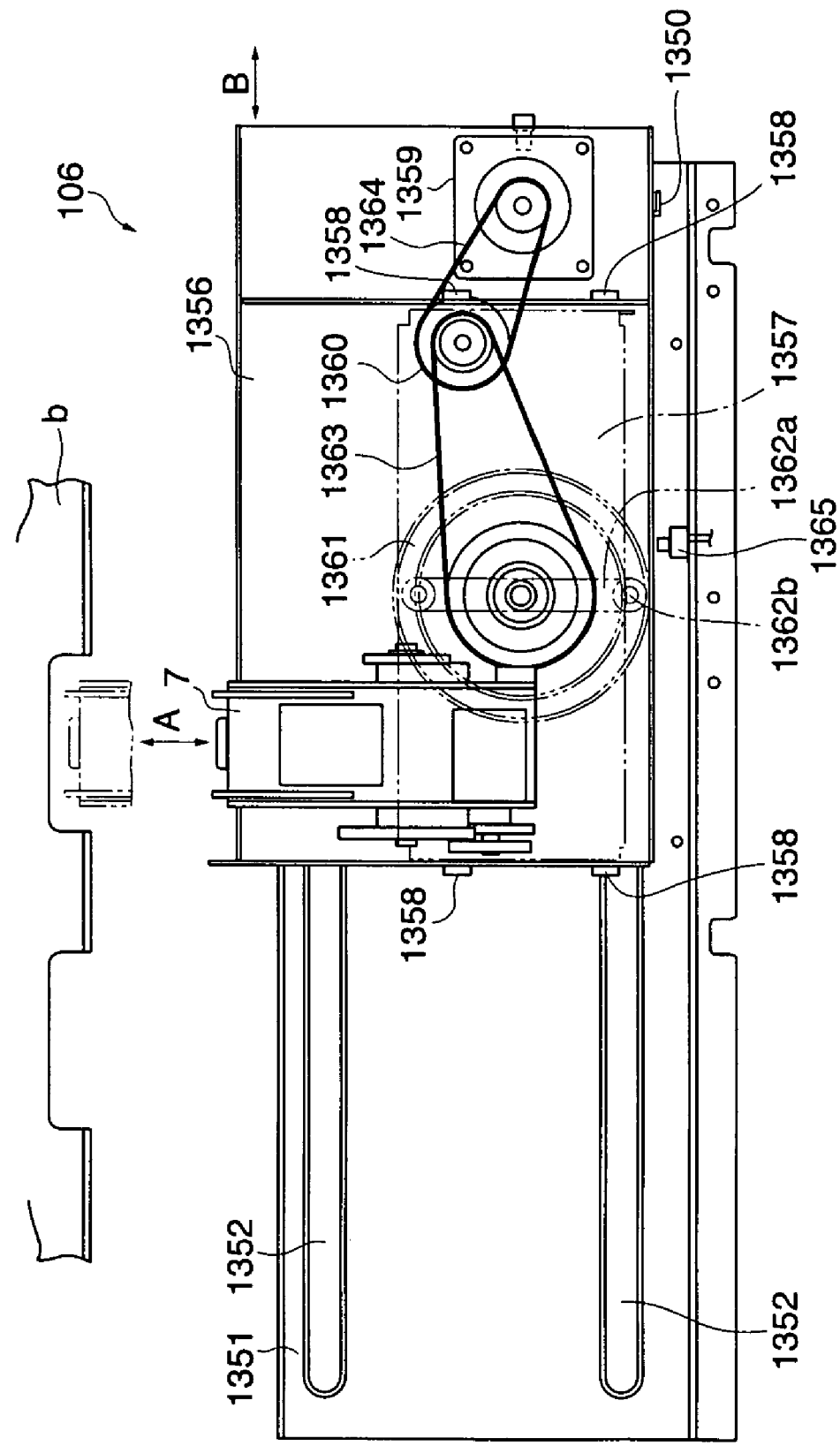
FIG. 17 is longitudinal cross-sectional view showing the arrangement of the stapling mechanism of the finisher 106.

Next, the arrangement of a stapling mechanism included in the finisher section 106 and adjustment of the mechanism will be described with reference to FIGS. 16 and 17. The arrangement of a stapling mechanism included in the finisher section 107 and the adjustment of the mechanism can be described similarly to those of the finisher section 106, and therefore a description thereof is omitted. FIGS. 16 and 17 are longitudinal cross-sectional views showing the arrangement of the stapling mechanism of the finisher section 106.

The finisher section 106 has a single stapler 7 capable of stapling a sheet bundle at a plurality of positions thereof while moving in a direction of width of the sheet bundle. The finisher 106 has a frame 1351 secured to a body thereof. The frame 1351 is formed with guide grooves 1352 that guide a first moving base 1356 moving in the direction of width of the sheet bundle. A pulse motor 1353 is disposed on the frame 1351, and the driving force of the pulse motor 1353 is transmitted to the first moving base 1356 via a timing belt 1355 stretched between pulleys 1354a and 1354b. The first moving base 1356 has guide pins (not shown) engaged with the respective guide grooves 1352. The guide pins enable the first moving base 1356 to move smoothly along the guide grooves 1352 on the frame 1351 in a direction indicated by an arrow B. On the frame 1351, there is provided a home position sensor 1365 that detects the home position of the first moving base 1356. The home position sensor 1365 detects a home position flag 1350 of the first moving base 1356.

In the illustrated example, the home position of the stapler 7 is set to a position for stapling the left side end of the sheet bundle appearing in FIG. 16, and when the right side end of a sheet bundle appearing in FIG. 17 is to be stapled, the first moving base 1356 is moved with a traveling distance thereof controlled by the number of pulses delivered from a motor driver (not shown) to the pulse motor 1353.

Next, a description will be given of operation of the stapler 7 for stapling a sheet bundle on a tray "b" of a finisher 106.

A second moving base 1357 has four roller bearings 1358, via which it is engaged with guide grooves (not shown) formed on the first moving base 1356, for motion in directions indicated by an arrow A. A pulse motor 1359 is provided on the first moving base 1356, and the driving force thereof is transmitted to a link 1361 provided on the first moving base 1356 via timing belts 1363, 1364 to rotate the link 1361. The link 1361 includes an arm 1362a and pins 1362b, and the pins 1362b are engaged with the second moving base 1357. Consequently, one rotation of the link 1361 causes the second moving base 1357 to perform one reciprocating motion in the directions A. Further, one stroke of the link 1361 is adjusted to the distance from a retreat position of the stapler 7 to a clinch position of the same, so that one rotation of the link 1361 enables the stapler 7 to perform a series of operations from stapling to retreat. Therefore, it is possible to easily staple a sheet bundle on each bin b at two positions by the single stapler 7.

When the staple position adjustment and the staple width adjustment are selected as adjustment items for the stapling mechanism constructed as above, the number of motor pulses is automatically adjusted based on data set for the adjustment items, to thereby adjust the staple position and staple width.

Figure 18:
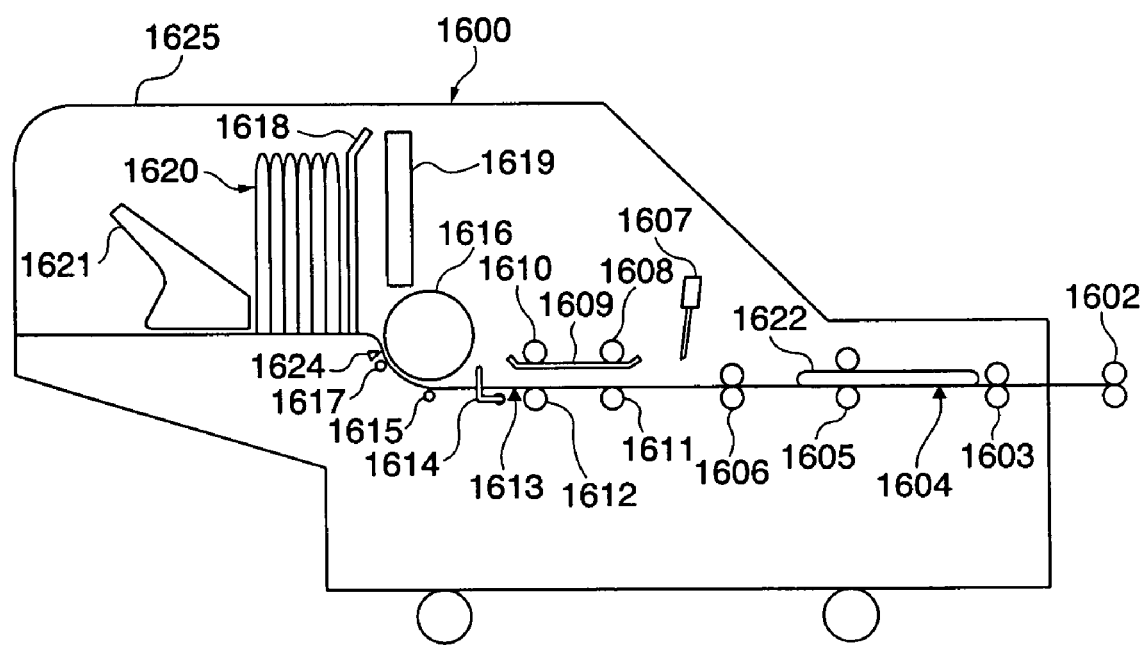
FIG. 18 is a longitudinal cross-sectional view schematically showing the arrangement of a trimmer.
Figure 19:
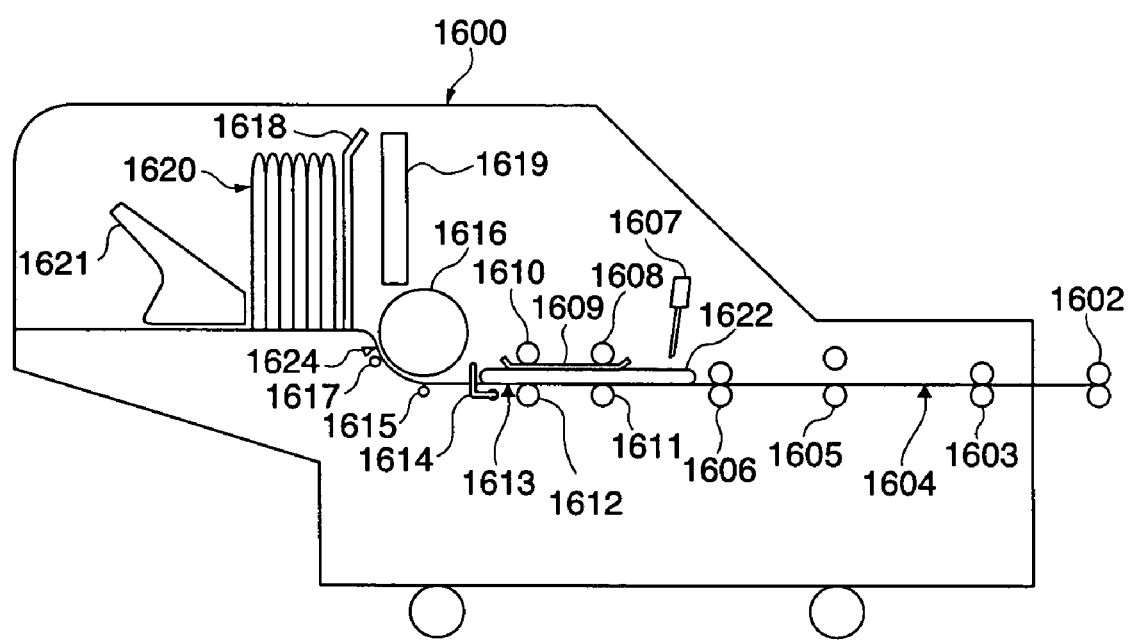
FIG. 19 is a longitudinal cross-sectional view schematically showing the arrangement of the trimmer.

Next, the arrangement of a trimmer and adjustment of the trimmer will be described with reference to FIGS. 18 and 19. FIGS. 18 and 19 are longitudinal cross-sectional views schematically showing the arrangement of the trimmer.

The finisher section 106 (107) has a saddle stitching function. The trimmer 1600 shown in FIG. 18 is used to cut and trim the side ends of a sheet bundle saddle-stitched by the finisher section 106 (107). The trimmer 1600 is connected to the finisher section 106 (107) to receive a sheet bundle saddle-stitched by the finisher section 106 (107).

More specifically, as shown in FIG. 18, a saddle-stitched sheet bundle 1622 is conveyed into the trimmer 1600 via an inlet roller pair 1602. The sheet bundle 1622 is further conveyed by conveying rollers and conveying roller pairs 1603, 1605, 1606, 1611, 1612 until the leading end of the sheet bundle 1622 abuts on a stopper 1614. When the sheet bundle 1622 passes an inlet sensor 1604, a pusher 1619 for discharging the sheet bundle 1622 is retracted to a predetermined position.

After the leading end of the sheet bundle 1622 abuts on the stopper 1614, to uniformly cut and trim the trailing end of the sheet bundle 1622, a presser plate 1609 is lowered, as shown in FIG. 19, and driven rollers 1608, 1610 apply pressure to the sheet bundle 1622 via the presser plate 1609 to thereby cause the same to be fixed in position. Then, a cutter 1607 is lowered toward the sheet bundle 1622 and cuts the trailing end of the sheet bundle 1622 by a predetermined cutting amount (i.e. at a predetermined cutting position). After the cutting operation, the stopper 1614 is retreated downward, and the sheet bundle 1622 is conveyed by the conveying rollers 1611, 1612 and then discharged into a space between a holder plate 1618 and a pusher plate 1619 by discharge rollers 1616, 1615, 1617. Thereafter, the holder plate 1618 is lowered, and in a manner interlocked with the motion of the holder plate 1618, the pusher plate 1619 pushes and discharges the sheet bundle 1622 toward sheet bundles already stacked.

Adjustment items for the trimmer 1600 include the cutting amount as described above. Normally, the cutting amount is set according to a sheet type, and therefore the stopper 1614 is shifted to a position corresponding to a set cutting amount.

When a trimmer of the above-mentioned kind is connected to the image forming apparatus, a step of determining whether or not there is a job including a trimmer mode and a step of generating a trimmer mode adjustment table may be added to the flowchart shown in FIG. 13 to thereby enable selection and setting of adjustment items for the trimmer mode.

Similarly, in adjustment in the case where there is a job including the double-sided mode, the sensor adjustment, the clutch adjustment, the lateral registration position adjustment, etc. in the double-sided conveying section 970 (1070) of the MFP 104 (105) are carried out.

As described above, in the present embodiment, when there are one or more jobs to be executed within a predetermined time period, the operator is informed of the items of adjustment necessary for each job, and adjustment is carried out based on adjustment items selected by the operator. Therefore, it is possible to efficiently perform adjustment for items which need to be adjusted before execution of a job, whereby downtime can be reduced.

Although in the present embodiment, the case where the MFP 104 (105) automatically executes adjustment based on selected adjustment items has been described, this is not limitative, but even when an adjustment item is associated with a mechanical part which requires manual adjustment, for example, it is possible to at least inform the operator of the adjustment item. In this case, the operator himself/herself has to carry out the adjustment, but it can be avoided that the operator fails to carry out the adjustment but carries out an extra operation, such as readjustment during execution of a job.

Further, although in the present embodiment, adjustment items are displayed and selected in each of the MFP's 104, 105, a screen for selecting adjustment items for the MFP's 104, 105 may be displayed on the computer 102 as a server, for example. In this case, the computer 102 may detect a mode or modes necessary for execution of each registered job through communication with the MFP's 104, 105 and displays the screen for selecting adjustment items for the MFP's 104, 105, and in such a case, it is preferred that the computer 102 sends the MFP's 104, 105 information indicative of the selected adjustment items, thereby providing control such that the MFP's 104, 105 perform adjustment based on the selected adjustment items. This makes it possible to obtain the same advantageous effects as described hereinabove.

Further, the computer 102 may register and manage jobs to be executed by the MFP 104 (105), and sequentially transfer the jobs to the MFP 104 (105). In this case, the same processing as described hereinabove is executed.

Figure 20:
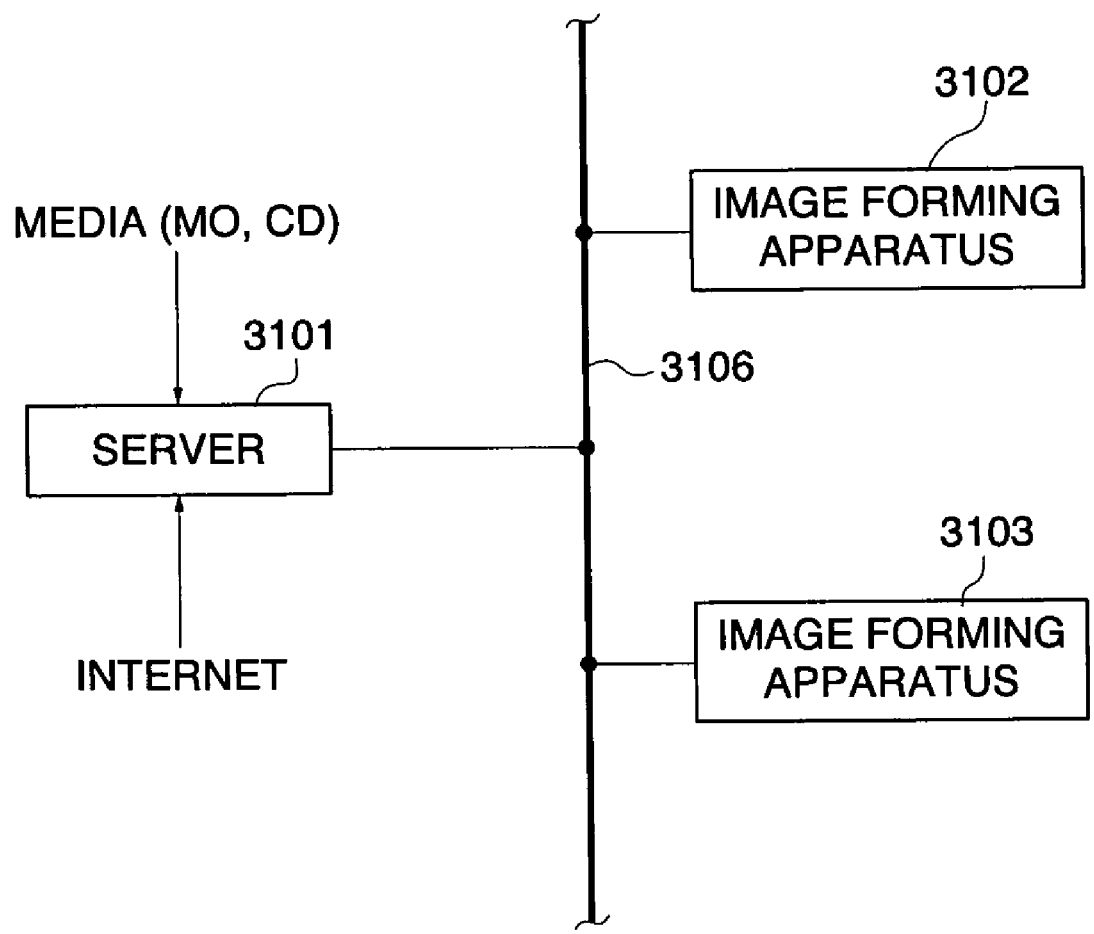
FIG. 20 is a block diagram showing an image forming system according to a second embodiment of the present invention.

Next, a second embodiment of the present invention will be described with reference to the accompanying drawings. FIG. 20 is a block diagram showing the arrangement of an image forming system according to the second embodiment.

As shown in FIG. 20, the image forming system according to the second embodiment includes a server 3101, an image forming apparatus 3102 as a monochrome digital copying machine, and an image forming apparatus 3103 as a color digital copying machine. The server 3101 is interconnected to each of the image forming apparatuses 3102, 3103 through a network 3106. The server 3101 and the image forming apparatuses 3102, 3103 may be connected by hardware in place of the network 3106.

The server 3101 receives image print jobs inputted via various media, such as MO's and CD's, and the Internet, and stores these in a storage device, such as a hard disk drive. At this time, priorities of processing are assigned to the respective image print jobs, and destinations of transfer of the image print jobs are assigned to the image forming apparatuses. Further, the server 3101 is capable of grasping job execution states, condition settings, and so forth of the image forming apparatuses 3102, 3103 through communication therewith, and performing centralized control of the image forming apparatuses 3102, 3103.

In the present embodiment, for maintenance by an operator, judging from the contents of all image print jobs held in the server 3101 for execution, the server 3101 grasps the maintenance history and current conditions of the image forming apparatus 3102 (3103) and, as described in detail hereinafter, deactivate display of maintenance items which do not require execution of maintenance at present. This makes it possible for the operator to skip unnecessary items in a maintenance work flow.

Figure 56:
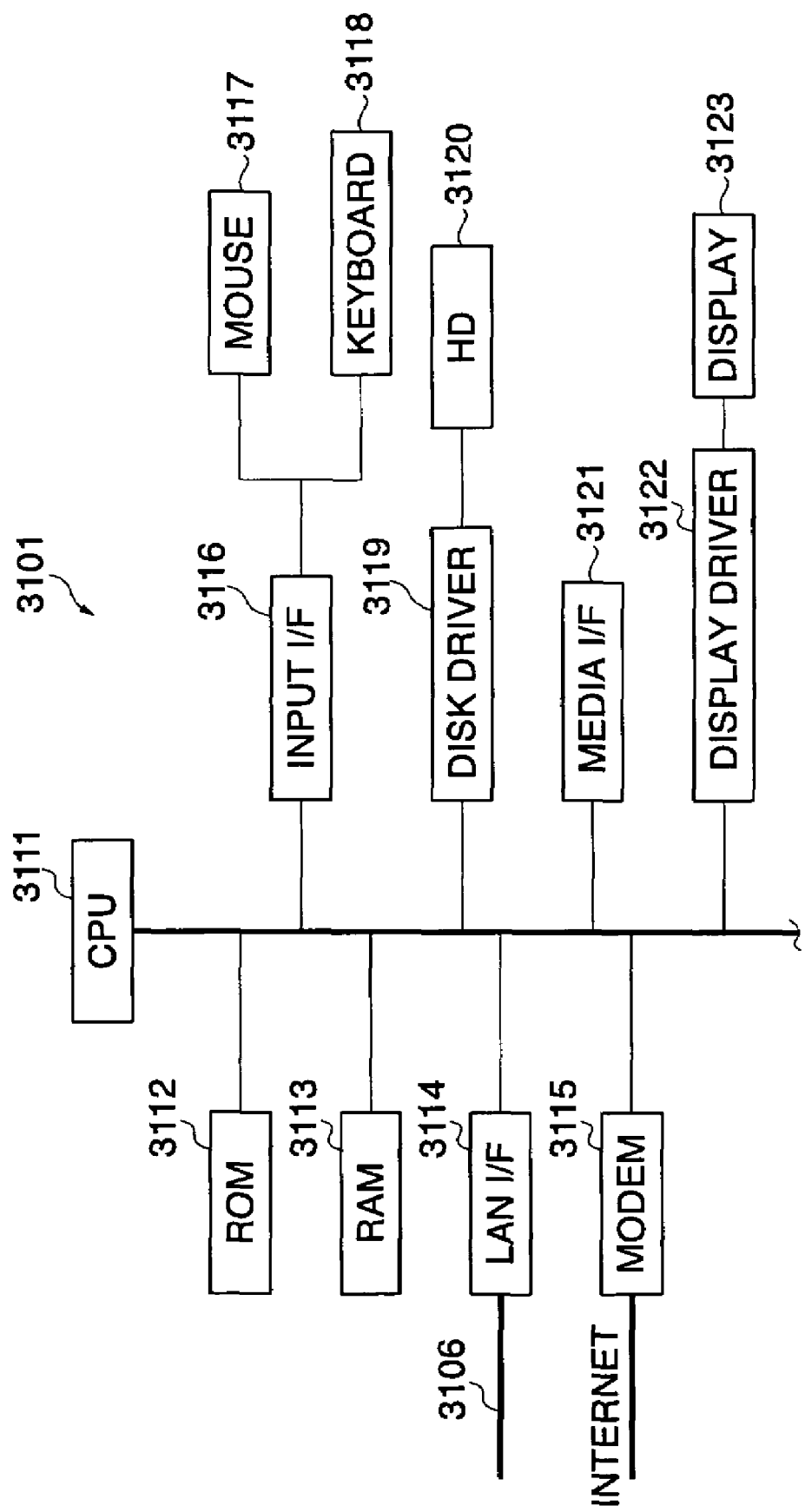
FIG. 56 is a block diagram showing the arrangement of the server 3101.

First, the arrangement of the server 3101 will be described with reference to FIG. 56. FIG. 56 is a block diagram showing the arrangement of the server 3101 appearing in FIG. 20.

As shown in FIG. 56, the server 3101 is comprised of a CPU 3111, a ROM 3112 storing a BIOS, a RAM 3113 that provides a work area for the CPU 3111, a LAN I/F (interface) 3114 for connection to the network 3106, a modem 3115 for connection to the Internet, an input I/F 3116 to which are connected a mouse 3117 and a keyboard 3118, a disk driver 3119 for driving a hard disk (HD) 3120, a media I/F 3121 for use in mounting a removable medium, such as an MO or a CD, and a display driver 3122 for driving a display 3123 implemented by a liquid crystal display. The display 3123 has a touch panel attached to a screen thereof. Therefore, it is possible to display soft keys on the screen of the display 3123, and various inputs and settings can be executed using the soft keys.

Figure 57:
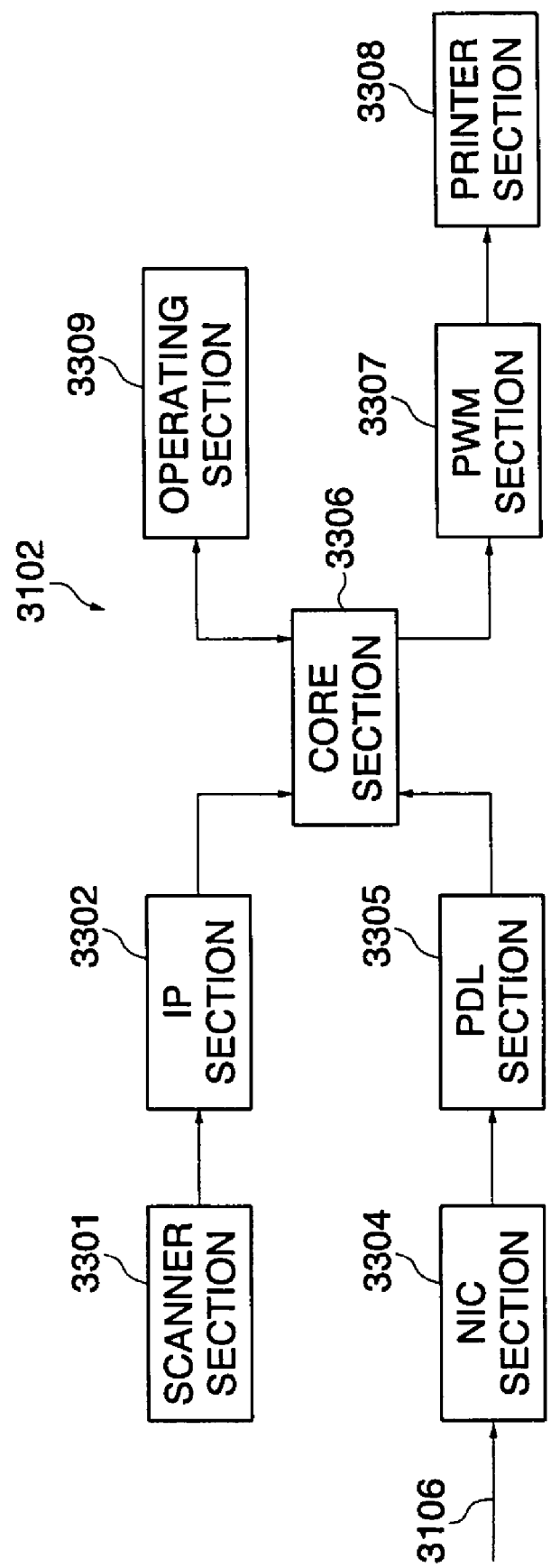
FIG. 57 is a block diagram showing the arrangement of the image forming apparatus 3102.
Figure 58:
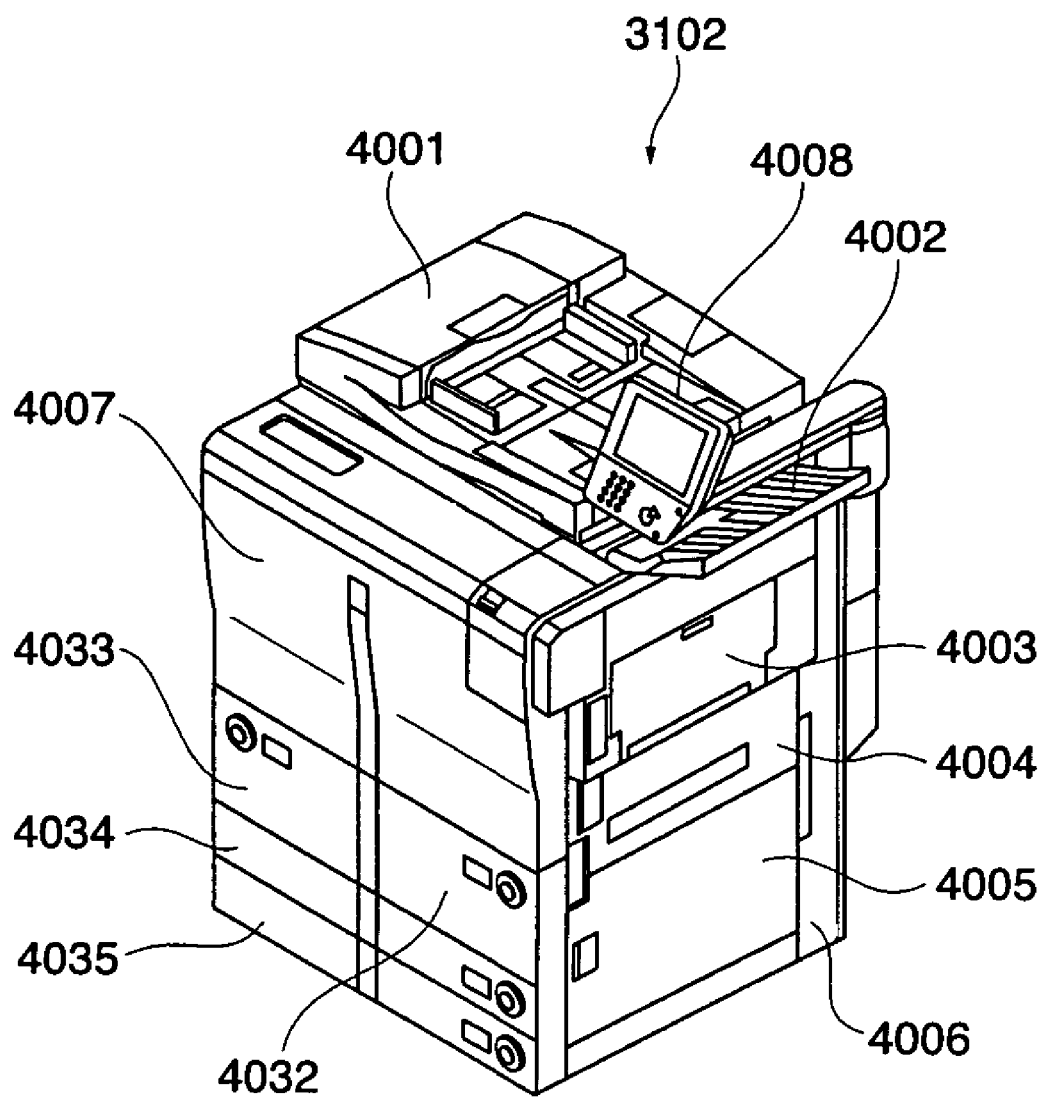
FIG. 58 is a perspective view showing the appearance the image forming apparatus 3102.
Figure 59:
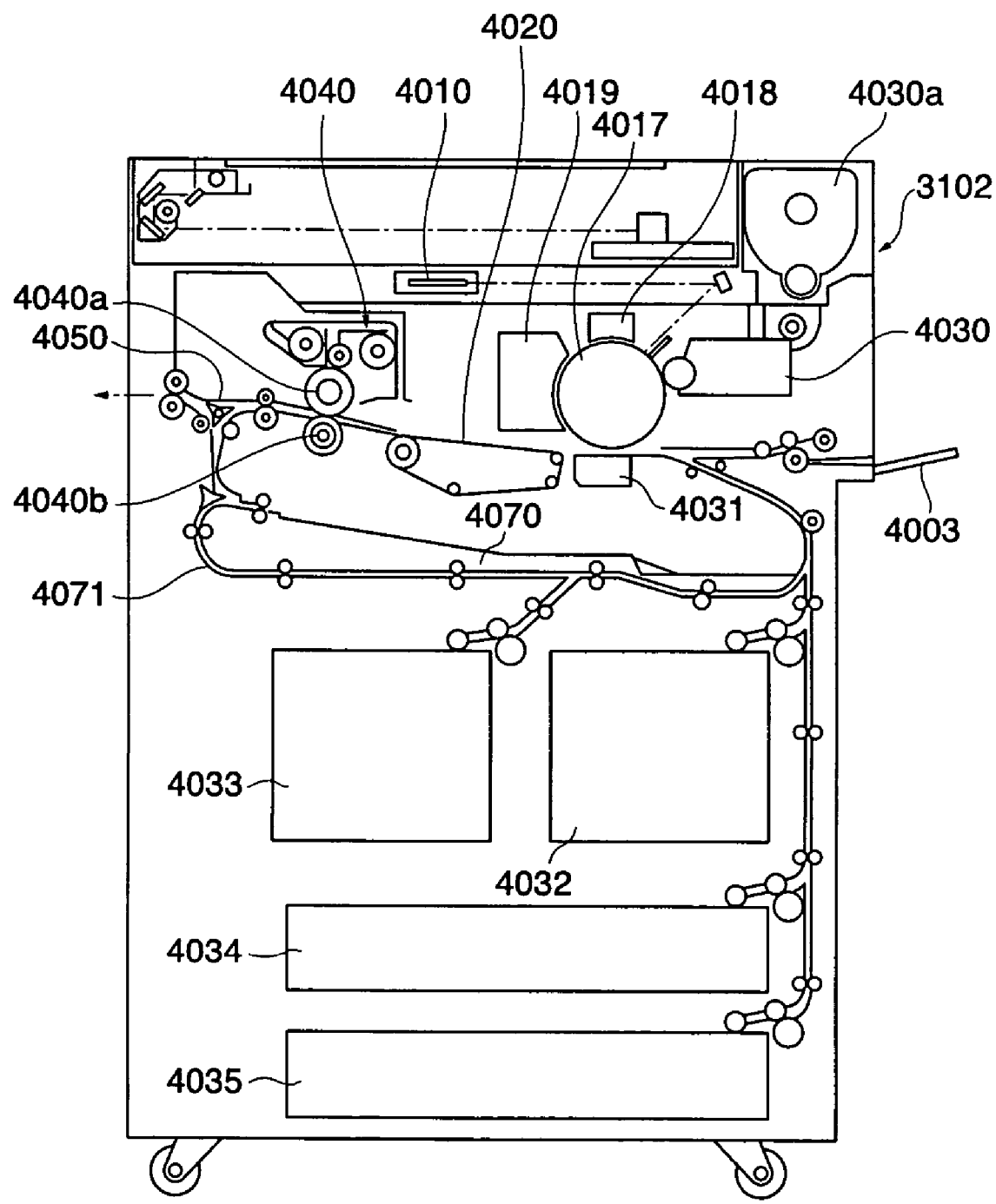
FIG. 59 is a longitudinal cross-sectional view showing details of the internal construction of the image forming apparatus 3102.
Figure 60:
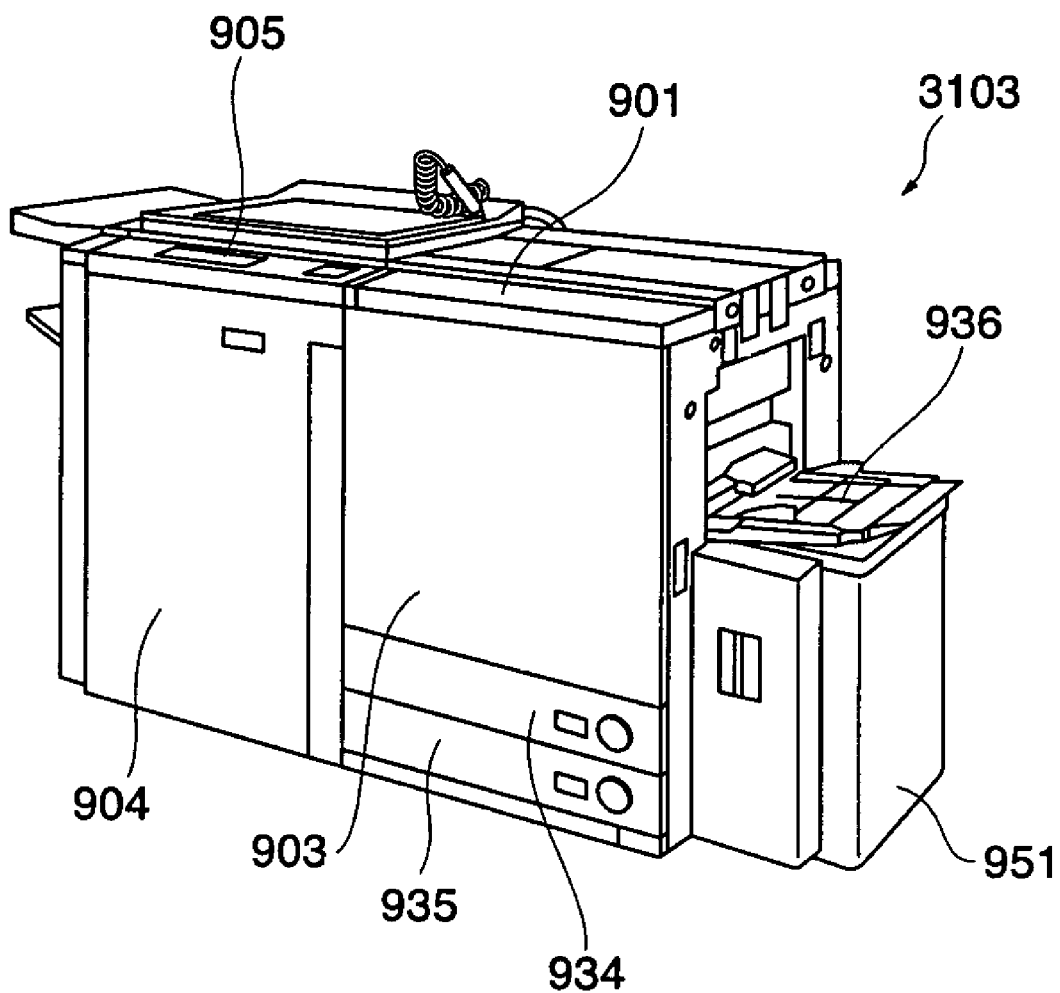
FIG. 60 is a perspective view showing the appearance of the image forming apparatus 3103.
Figure 61:
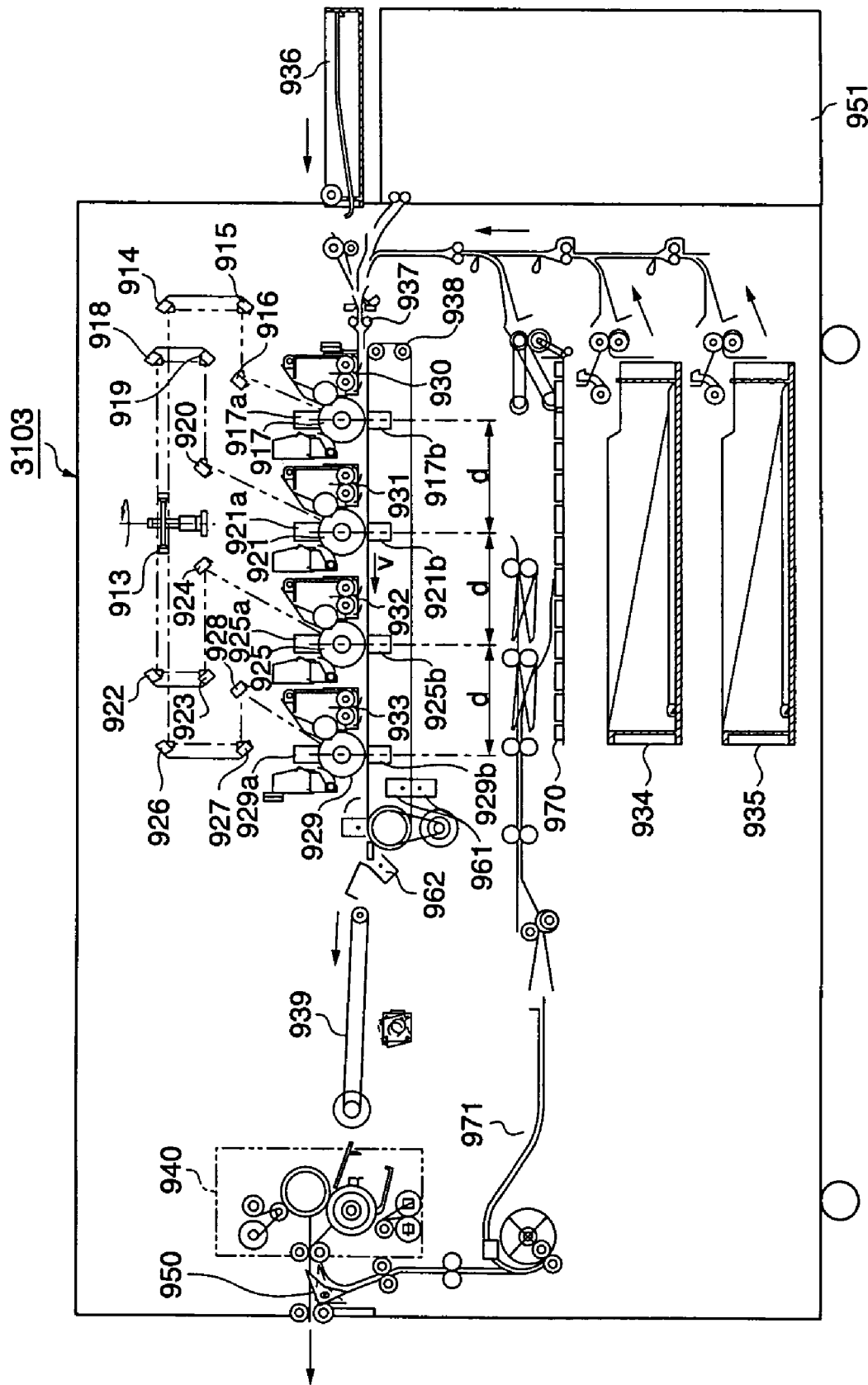
FIG. 61 is a longitudinal cross-sectional view showing details of the internal construction of the image forming apparatus 3103.

Next, the arrangement of the image forming apparatus 3102 and that of the image forming apparatus 3103 will be described with reference to FIGS. 57 to 61. FIG. 57 is a block diagram showing the arrangement of the image forming apparatus 3102 appearing in FIG. 20. FIG. 58 is a perspective view showing the appearance of the image forming apparatus 3102, while FIG. 59 is a longitudinal cross-sectional view showing details of the internal construction of the same. FIG. 60 is a perspective view showing the appearance of the image forming apparatus 3103 appearing in FIG. 20, while FIG. 61 is a longitudinal cross-sectional view showing details of the internal construction of the same.

As shown in FIG. 57, the image forming apparatus 3102 includes a scanner section 3301 that reads an image, an IP (image processing) section 3302 that processes the image read by the scanner section 3301, a NIC section 3304 that receives and transmits image data and apparatus information, using the network 3106, a PDL section 3305 that develops PDL data sent from the server 3101 into an image signal, and a core section 3306 that stores the image signal and determines a path for the signal.

Image data outputted from the core section 3306 is delivered via a PWM (Pulse Width Modulation) section 3307 to a printer section 3308 for forming an image. In the printer section 3308, an image is printed on a sheet based on the image data, and the sheet is outputted.

Further, connected to the core section 3306 is an operating section 3309 including a liquid crystal display panel with a touch panel, which displays operation information outputted via the core section 3306, etc., and various operating keys for use in mode setting, etc. In the present embodiment, only settings associated with a copying operation will be described as an example of settings inputted via the operating section 3309, and descriptions of the other settings are omitted.

As shown in FIG. 58, the image forming apparatus 3102 is equipped with an original feeder 4001, and left and right decks 4033, 4032 and cassettes 4034, 4035, which contain sheets. Further, on the front face of the apparatus, there is mounted a front cover 4007 that is opened for jam recovery or component replacement/adjustment. On the right side face of the apparatus, there are mounted an original discharge tray 4002, a manual feed tray 4003, an upper-stage vertical path cover 4004, a lower-stage vertical path cover 4005 and a waste toner box/drum protecting sheet pocket 4006. Further, on the top of the apparatus, there is disposed an operating section 4008 (corresponding to the operating section 3309 in FIG. 57).

Next, a description will be given of the internal construction of the image forming apparatus 3102. Here, the mechanical construction of the printer section 3308 will be described. As shown in FIG. 59, the image forming apparatus 3102 includes a photosensitive drum 4017 on which an electrostatic latent image is formed by scanning of a laser beam emitted from a CCD unit 4010. Around the photosensitive drum 4017, there are arranged a primary electrostatic charger 4018, a developing device 4030, a transfer device 4031, and a cleaner section 4019. The electrostatic latent image formed on the photosensitive drum 4017 is visualized as a toner image by black toner supplied from the developing device 4030. Toner to be supplied by the developing device 4030 is contained in a toner cartridge 4030a.

The toner image on the photosensitive drum 4017 is transferred by the transfer device 4031 onto a sheet fed from one of the left and right decks 4033, 4032, the cassettes 4034, 4035, and the manual feed tray 4003. The sheet fed from one of the sheet cassettes 4034, 4035 and the manual feed tray 4003 is sent into space between the photosensitive drum 4017 and the transfer device 4031 in synchronism with formation of the toner image.

After the toner image is transferred onto the sheet, the sheet is conveyed to a fixing device 4040 by a conveyor belt 4020. In the fixing device 4040, the toner image on the sheet is thermally fixed to the sheet by being heated under pressure. The fixing device 4040 includes a fixing roller 4040a and a pressure roller 4040b. The fixing roller 4040a incorporates a heater (not shown) for controlling the surface temperature of the fixing roller 4040a to a predetermined temperature, and the surface temperature of the fixing roller 4040a is detected by fixing temperature detecting means (not shown) implemented by a main thermistor and a sub thermistor. The heater is comprised of a main heater and a sub heater, and fixing temperature control is performed by using the main and sub heaters. In the fixing temperature control, it is determined, depending on the result of detection by the fixing temperature detecting means, that only the main heater is to be used, that only the sub heater is to be used, or that both of them are to be used, and based on the determination, one or both of the heaters are energized. The amount of AC power to be supplied to each of the heaters is controlled so as to perform the fixing temperature control in a fine-grained manner. The control of the amount of AC power to be supplied is performed by causing an AC driver having a PWM function to change a threshold value of AC current as AC input.

After having passed through the fixing device 4040, the sheet is discharged from the printer section 3308 via a switching flapper 4050, or alternatively introduced into a double-sided conveying path 4071. The sheet introduced into the double-sided conveying path 4071 is reversed and then conveyed to a double-sided conveying section 4070. The double-sided conveying section 4070 feeds the sheet again in predetermined timing. Thus, images can be formed on both sides of the sheet.

Next, a description will be given of the image forming apparatus 3103. It should be noted that the arrangement of blocks of the image forming apparatus 3103 is basically the same as to that of blocks of the image forming apparatus 3102 described hereinabove, and therefore a description thereof is omitted.

As shown in FIG. 60, the image forming apparatus 3103 has cassettes 934, 935 and a paper deck 951 each containing sheets, mounted thereon. On the front face of the apparatus, there are provided a left-side front cover 904 and a right-side front cover 903, and on the right side face of the apparatus, there is provided a multi-feeder section 936. Further, on the top of the apparatus, there are arranged an operating section 905 and a hopper lid 901 fitted on a toner replenishing port (not shown). In the present embodiment, it is assumed that just as in the image forming apparatus 3102, the operating section 905 is only used for setting for a copying operation, but not for setting the other modes.

Further, as shown in FIG. 61, the internal construction of the image forming apparatus 3103 is the same as that shown in FIG. 9 except that the paper deck 951 is mounted, and therefore a description of the internal construction of the image forming apparatus 3103 is omitted.

Next, an operation screen displaying process executed on the display 3123 of the server 3101 will be described with reference to FIGS. 21 to 55.

Figure 22:
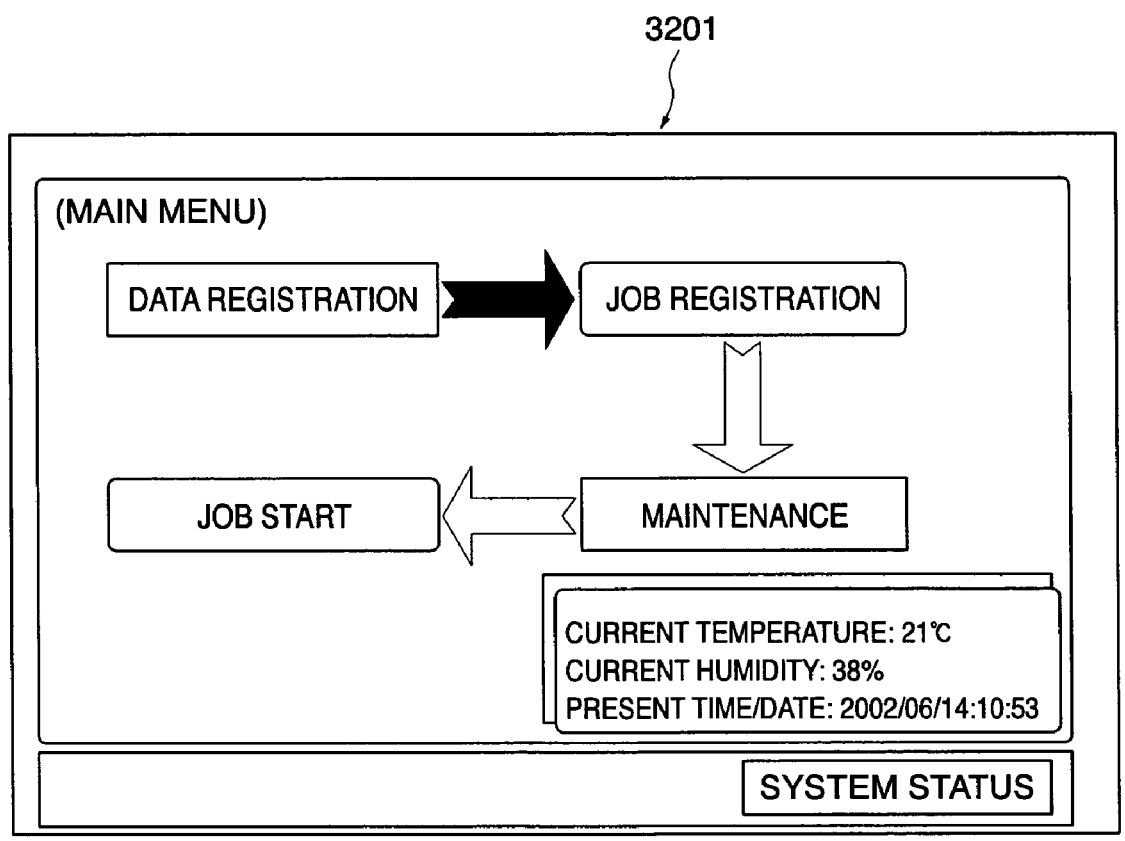
FIG. 22 is a view showing an example of an initial screen displayed on a server 3101 appearing in FIG. 20.

FIG. 22 is a view showing an example of an initial screen displayed on the display 3123 of the server 3101 appearing in FIG. 20. When a soft key displayed on the screen 3201 of the display 3123 is touched (depressed), corresponding information is inputted. On the initial screen, representative items of a work flow for an operator are displayed, and at the same time, current ambient temperature and humidity as well as date and time are also displayed. The ambient temperature and humidity are detected by sensors (not shown) disposed in the vicinity of the image forming apparatus 3102 (3103). The current date and time is outputted from a built-in clock.

Figure 21:
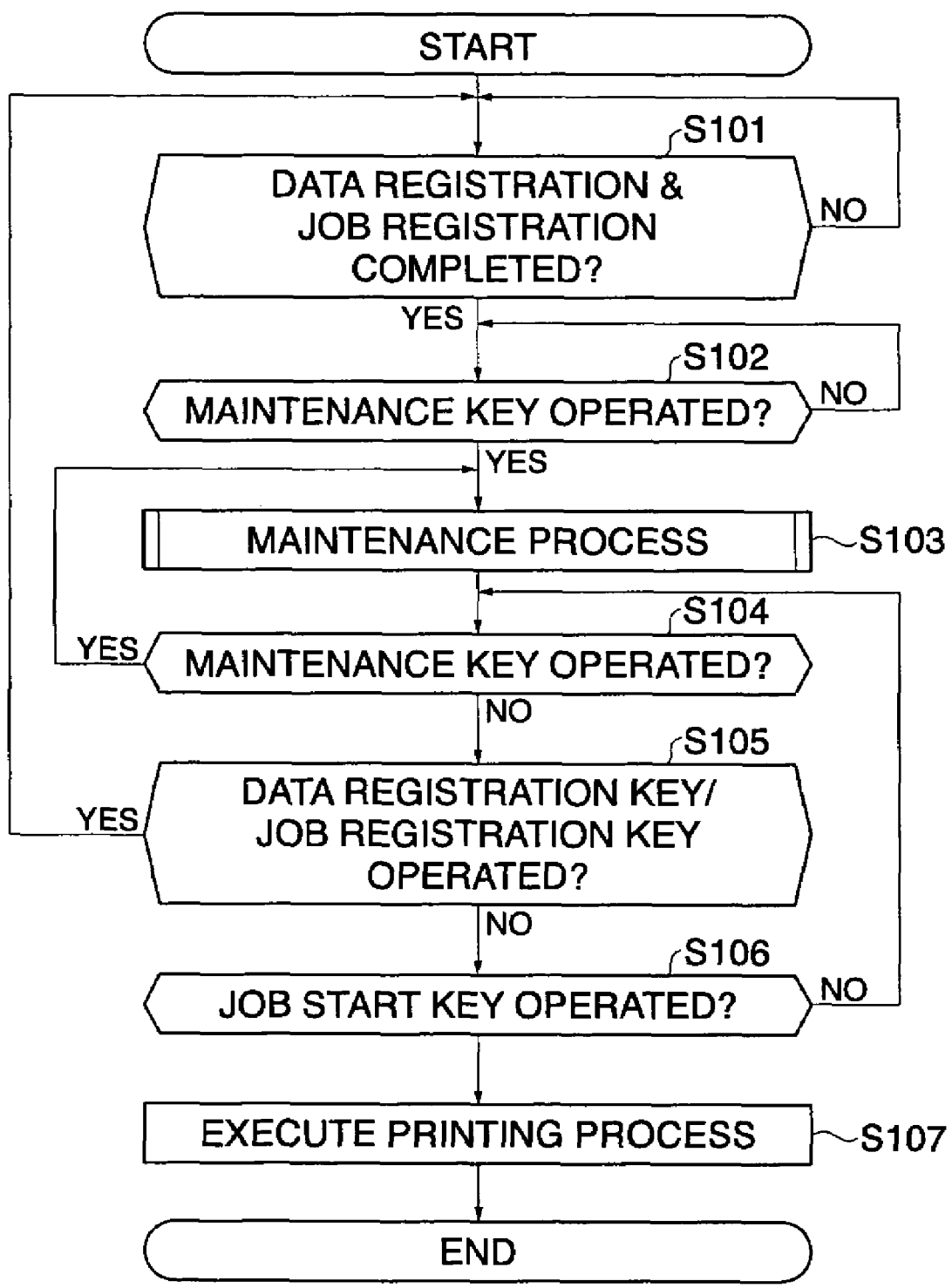
FIG. 21 is a flowchart showing a procedure of operations executed in association with a work flow of an operator of the image forming system shown in FIG. 20.

The work flow for the operator in the initial screen will be described with reference to FIG. 21. FIG. 21 is a flowchart showing a procedure of operations for the work flow for an operator of the image forming system in FIG. 20. The operations are executed by the server 3101, based on a program stored in the hard disk 3120.

First in a step S101, it is determined whether or not data registration and job registration are completed. An image print job is inputted by data registration. Data registration and job registration are executed, respectively, on a data registration menu screen and a job registration menu screen, each of which will be described in detail hereinafter. In the illustrated example of FIG. 22, data registration is completed, and in this case, an arrow from "Data registration" is filled in with black, and the other arrows are hollow. The operator understands from this display of the arrows on the initial screen in FIG. 22 that the step of job registration is to be carried out next.

If data registration and job registration are completed in the step S101, it is determined in a step S102 whether or not a maintenance key has been depressed. The maintenance key mentioned here is a displayed portion of "Maintenance" in FIG. 22. When this displayed position is depressed, the screen is switched to a display of maintenance items, whereby a maintenance process is allowed to be executed. At this time, an arrow between a job registration key ("Job registration") and the maintenance key is filled in with black.

If it is determined in the step S102 that the maintenance key has been depressed, the maintenance process, described in detail hereinafter, is executed in a step S103, followed by the process proceeding to a step S104. At this time, an arrow between the maintenance key and a job start key ("Job Start") is filled in with black. In the step S104, it is determined whether or not the maintenance key has been depressed again. If the maintenance key has been depressed again, the process returns to the step S103. On the other hand, if the maintenance key has not been depressed, the process proceeds to a step S105, wherein it is determined whether or not the data registration key or the job registration key has been depressed. If the data registration key or the job registration key has been depressed, the process returns to the step S101.

If it is determined in the step S105 that neither the data registration key nor the job registration key has been depressed, it is determined in a step S106 whether or not the job start key has been depressed. If the job start key has not been depressed, the process returns to the step S104. On the other hand, if the job start key has been depressed, the process proceeds to a step S107, wherein the server 3101 transmits data of image print jobs to the image forming apparatus 3103 and the image forming apparatus 3102, according to the contents of the jobs registered in the step S101, to cause the image forming apparatus 3103 and the image forming apparatus 3102 to perform an image forming operation.

Figure 23:
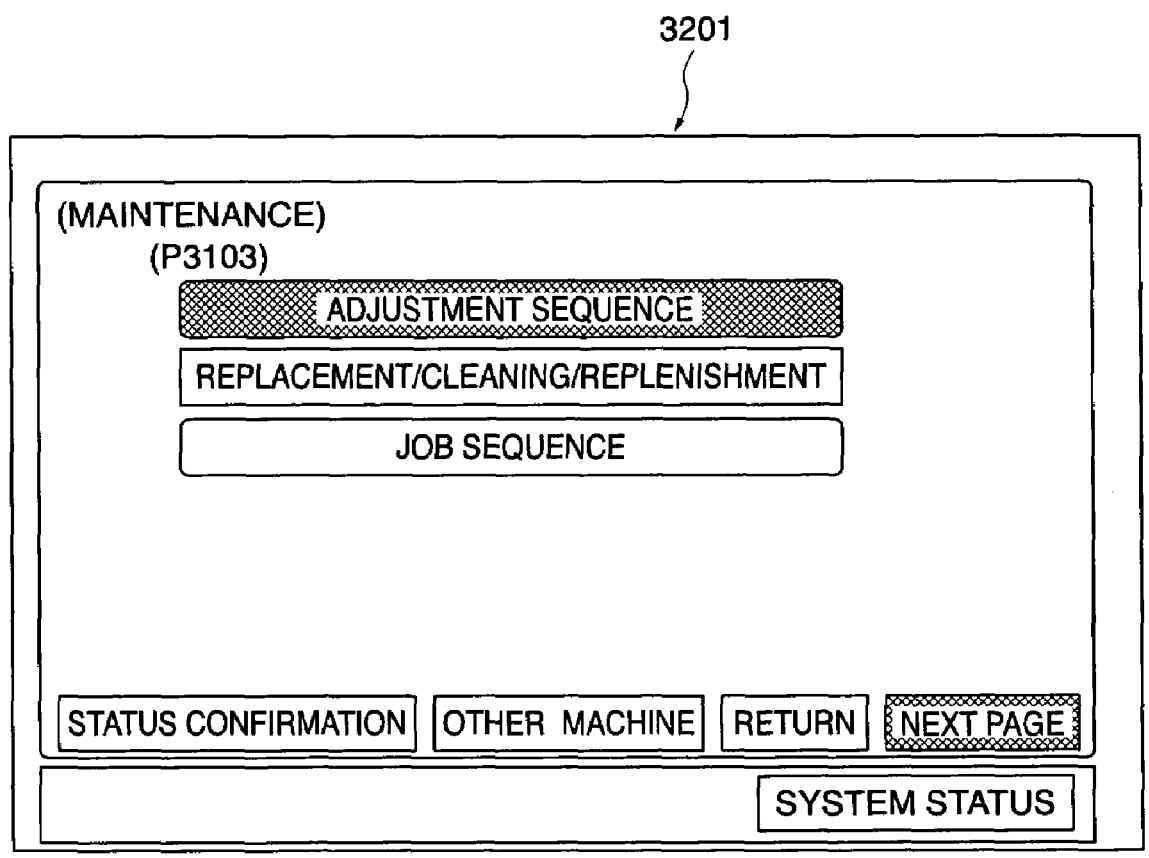
FIG. 23 is a view showing an example of a screen displaying maintenance items for an image forming apparatus 3103 appearing in FIG. 20.
Figure 24:
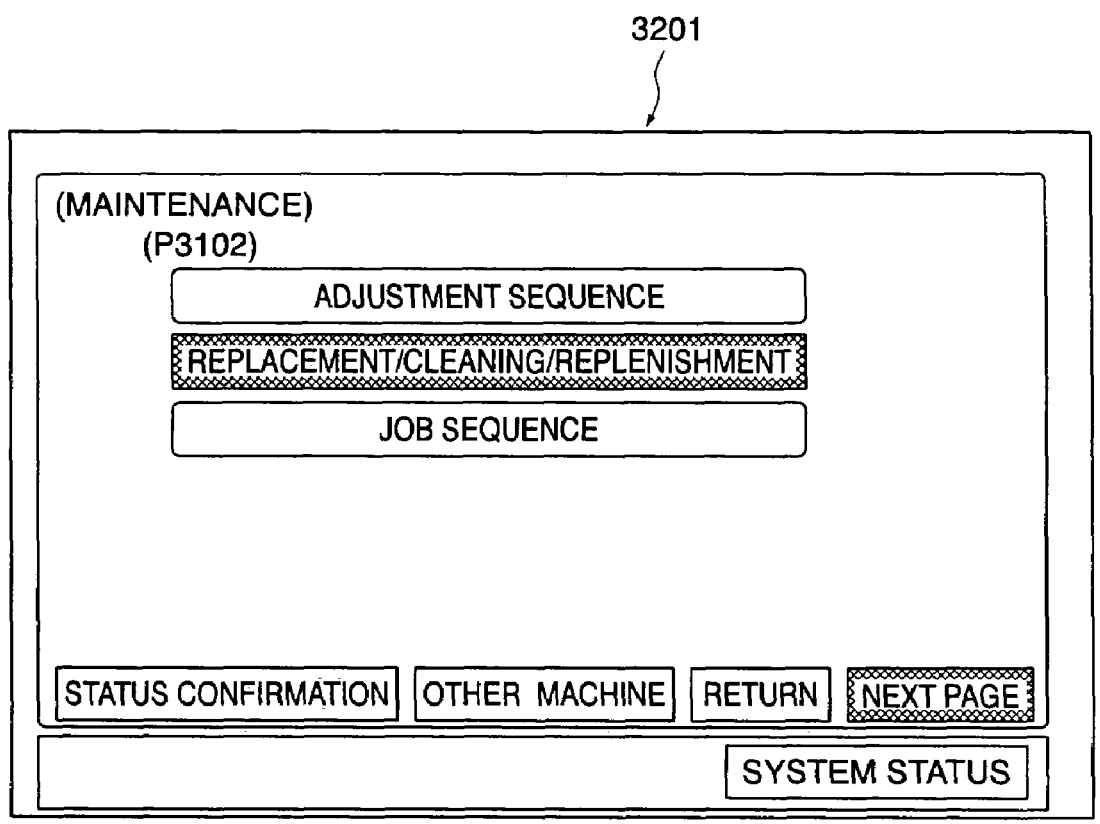
FIG. 24 is a view showing an example of a screen displaying maintenance items for an image forming apparatus 3102 appearing in FIG. 20.
Figure 25:
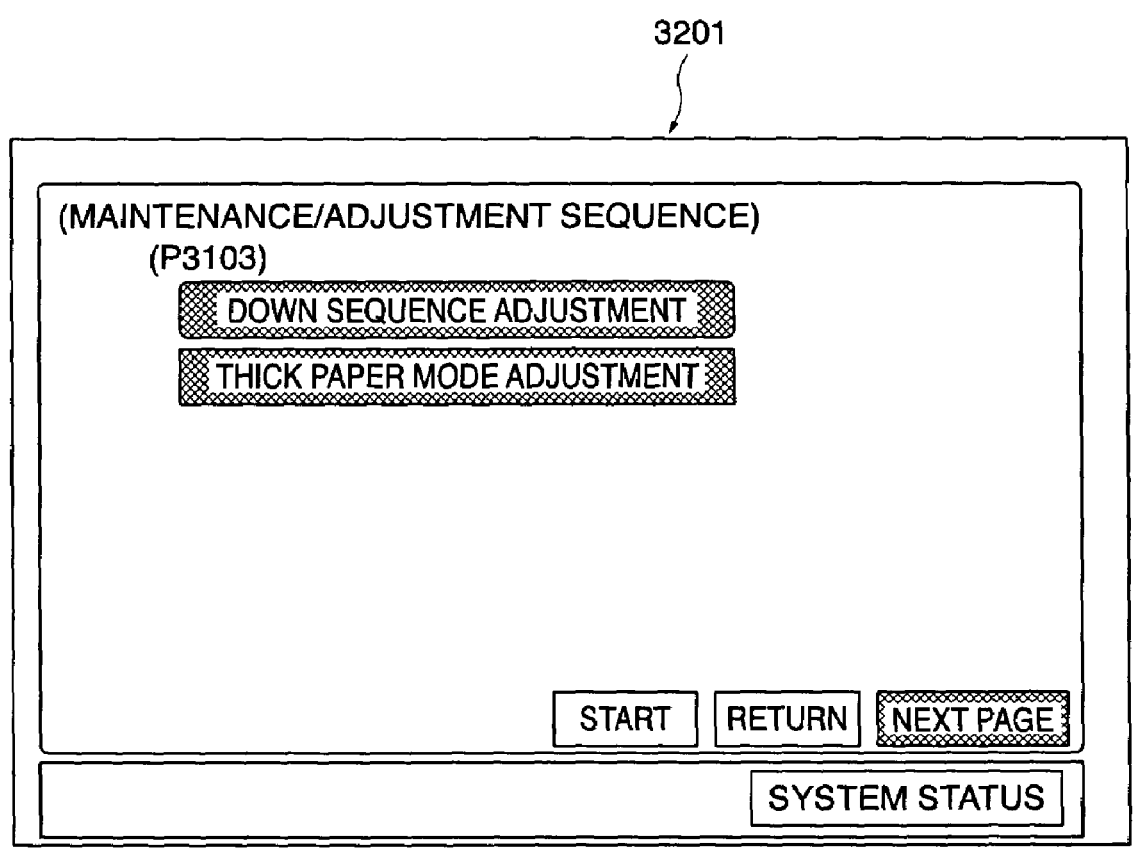
FIG. 25 is a view showing an example of a screen for configuring settings of an-adjustment sequence for the image forming apparatus 3103.
Figure 26:
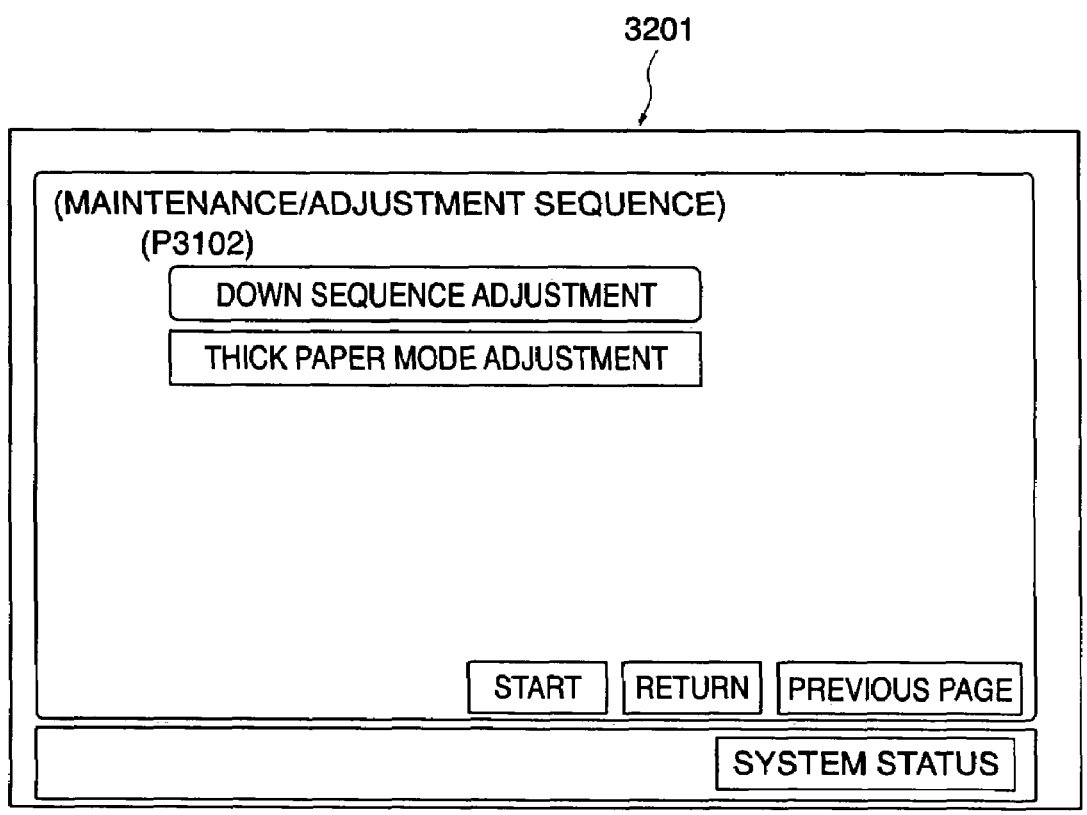
FIG. 26 is a view showing view showing an example of a screen for configuring an adjustment sequence for the image forming apparatus 3102.
Figure 27A:
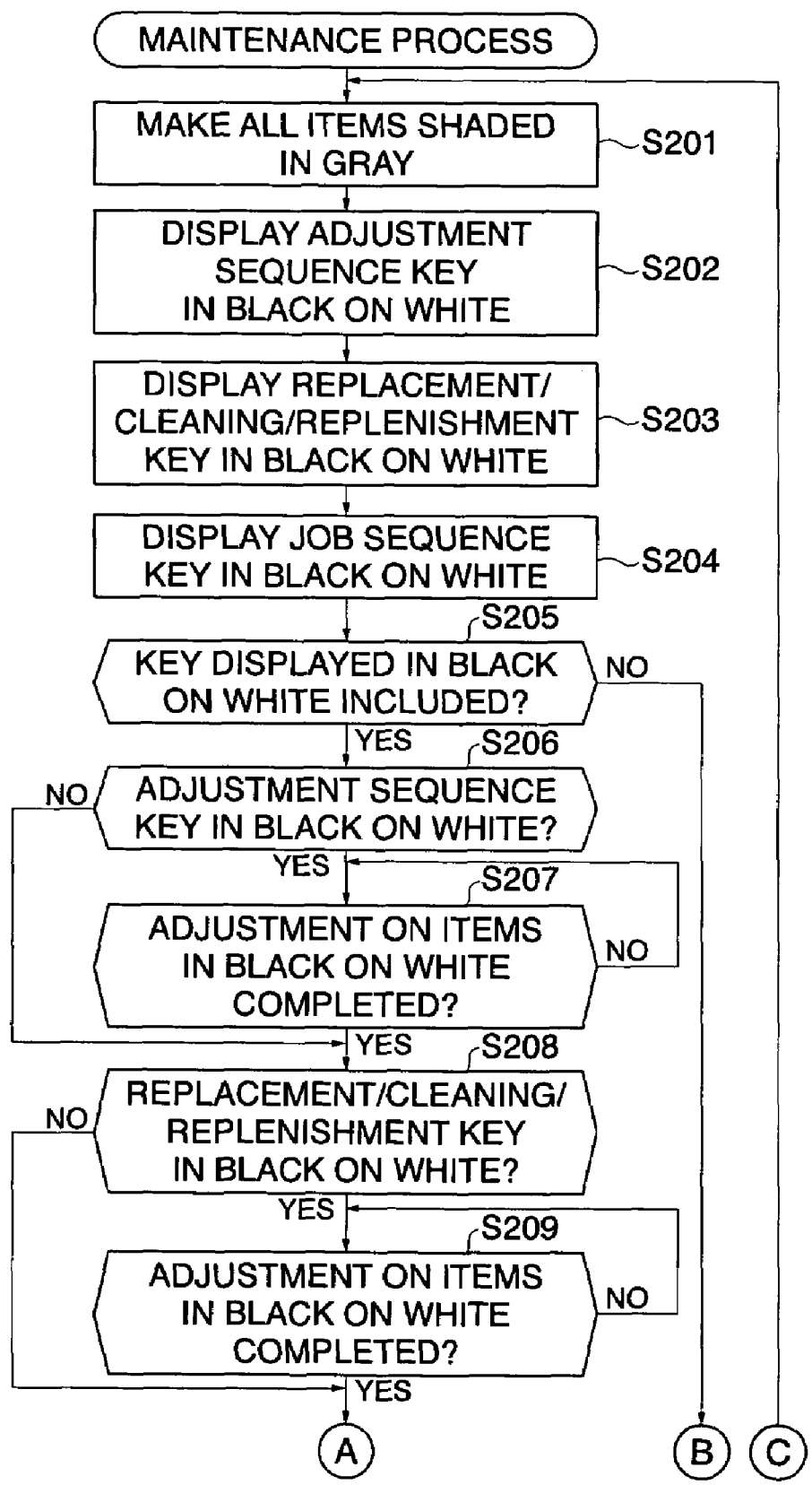
FIGS. 27A and 27B are flowchart showing a maintenance process executed in a step S103 in FIG. 21.
Figure 27B:
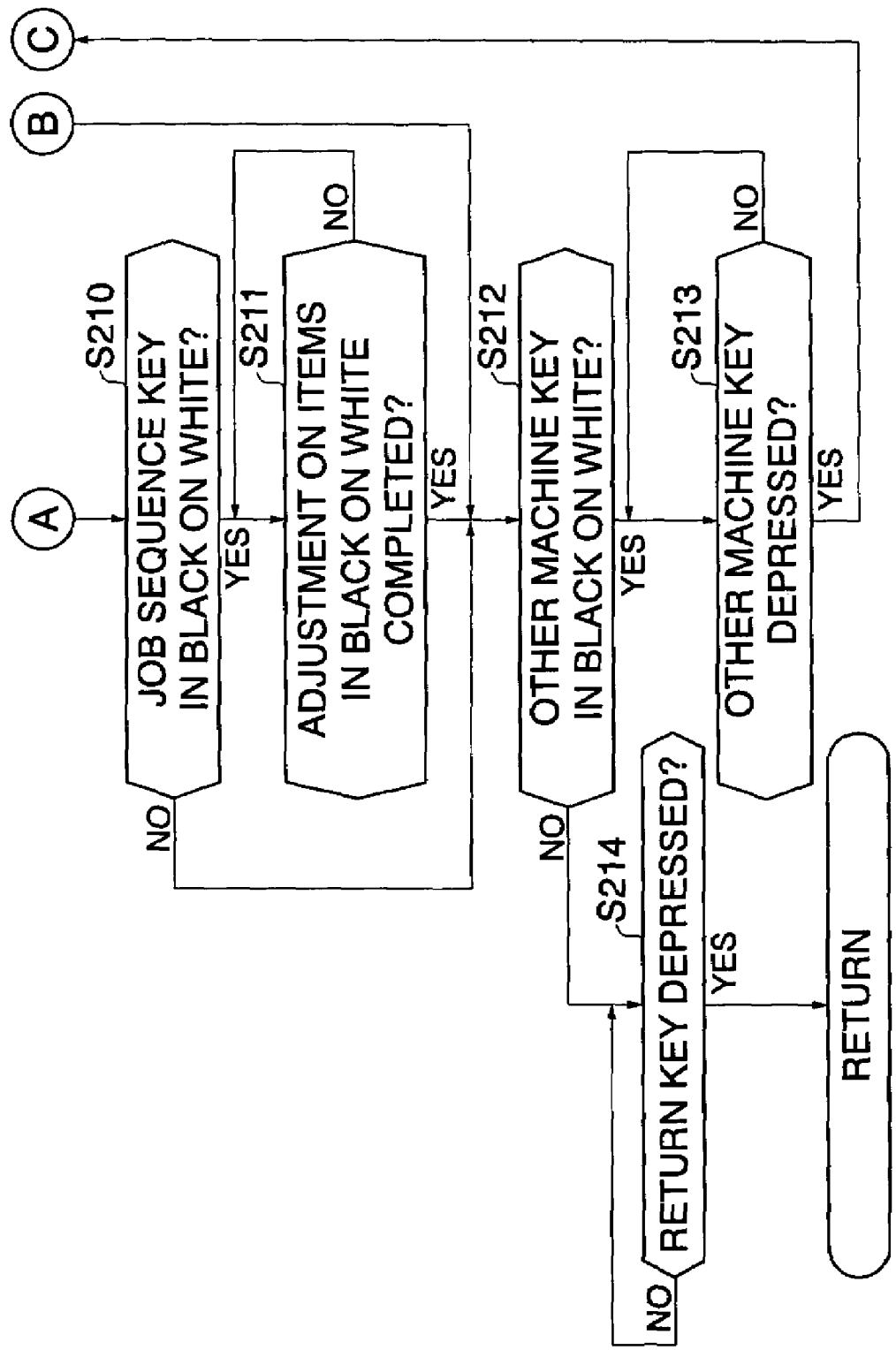

Next, the maintenance process executed in the step S103 will be described with reference to FIGS. 23 to 27B. FIG. 23 is a view showing an example of a screen displaying maintenance items for the image forming apparatus 3103 appearing in FIG. 20. FIG. 24 is a view showing an example of a screen displaying maintenance items for the image forming apparatus 3102 appearing in FIG. 20. FIG. 25 is a view showing an example of a screen for configuring settings of an adjustment sequence for the image forming apparatus 3103. FIG. 26 is a view showing view showing an example of a screen for configuring an adjustment sequence for the image forming apparatus 3102. FIGS. 27A and 27B are flowchart showing the maintenance process executed in the step S103 in FIG. 21.

When the maintenance key is depressed on the initial screen in FIG. 22, the initial screen is switched to the screen shown in FIG. 23. Further, when another machine key ("Other machine") is depressed on the screen in FIG. 23, the screen is switched to the screen shown in FIG. 24. When an adjustment sequence key ("Adjustment sequence") is depressed on the screen in FIG. 23, the screen is switched to the screen shown in FIG. 25. On the screen in FIG. 25, it is possible to change settings of maintenance items involving an adjustment sequence. The adjustment of the adjustment sequence and a process for determining whether each associated key should be displayed in black on a white background (hereinafter referred to as "black on white") or shaded in gray (hereinafter referred to as "shaded") will be described hereinafter.

When an adjustment sequence key ("Adjustment sequence") is depressed on the screen in FIG. 24, the screen is switched to the screen shown in FIG. 26. Switching between the screen in FIG. 25 and the screen in FIG. 26 is performed by depressing another machine key ("Other machine") on the screen in FIG. 25. When the screen in FIG. 25 is to be switched back to the screen in FIG. 23, a return key ("Return") is depressed on the screen in FIG. 25. Similarly, when the screen in FIG. 26 is to be switched back to the screen in FIG. 24, a return key is depressed on the screen in FIG. 26. On the screen in FIG. 25, the adjustment items of "Down sequence adjustment" and "Thick paper mode adjustment" (i.e. a down sequence adjustment key and a thick paper mode adjustment key) are shaded, which means that these items do not require adjustment. Since the adjustment items on the screen in FIG. 25 are all shaded, the adjustment sequence key on the screen in FIG. 23 is also shaded.

Differently from the display on the screen in FIG. 25, when all the adjustment items are displayed in black on white as shown on the screen in FIG. 26, it is necessary to perform adjustment based on all the adjustment items, and upon completion of the adjustment, the adjustment items become all shaded. When the adjustment items on the screen in FIG. 26 are all shaded due to completion of the adjustment based thereon, the adjustment sequence key on the screen in FIG. 24 is also shaded. Similarly, a replacement/cleaning/replenishment key ("Replacement/cleaning/replenishment") and a job sequence key ("Job sequence") on the screen in each of FIGS. 23 and 24 are also shaded after completion of respective adjustments. The adjustment based on the items of the replacement/cleaning/replenishment and the job sequence, and a determination as to whether each key associated therewith should be displayed in black on white or shaded will be described hereinafter. Insofar as the display of the other machine key is concerned, when all the items on the screen in FIG. 25 or 26 are shaded, an other machine key displayed on the associated screen is shaded.

A description will be given of the maintenance process based on the screen specifications described above.

In the maintenance process, as shown in FIGS. 27A and 27B, first, in a step S201, on a currently displayed maintenance screen (the screen in FIG. 23 or 24), the item keys (the adjustment sequence key, the replacement/cleaning/replenishment key, the job sequence key) are all shaded. This maintenance screen is initially a screen displayed in response to depression of the maintenance key in the step S102, and the default screen may be the screen in FIG. 23 or the screen in FIG. 24.

Then, in a step S202, the adjustment sequence key is displayed in black on white if there is an item to be displayed in black on white on any of the internal hierarchical screens of the adjustment sequence. The internal hierarchical screens of the adjustment sequence will be described in detail hereinafter. Then, in a step S203, the replacement/cleaning/replenishment key is displayed in black on white when there is an item to be displayed in black on white on any of the internal hierarchical screens of the replacement/cleaning/replenishment. The internal hierarchical screens of the replacement/cleaning/replenishment will be described in detail hereinafter. Further, in a step S204, the job sequence key is displayed in black on white when there is an item to be displayed in black on white on any of the internal hierarchical screens of the job sequence. The internal hierarchical screens of the job sequence will be described in detail hereinafter.

Then, in a step S205, it is determined whether or not any of the item keys (the adjustment sequence key, the replacement/cleaning/replenishment key, the job sequence key) on the currently displayed maintenance screen is displayed in black on white. If there is any displayed in black on white, it is determined in a step S206 whether or not the adjustment sequence key is displayed in black on white. If the adjustment sequence key is displayed in black on white, the process proceeds to a step S207, wherein completion of adjustment based on an item displayed in black on white on the associated internal hierarchical screen displayed by depressing the adjustment sequence key is awaited. Then, after the adjustment based on the item displayed in black on white on the internal hierarchical screen is completed, the process proceeds to a step S208. If it is determined in the step S206 that the adjustment sequence key is not displayed in black on white, the process skips over the step S207 to the step S208.

In the step S208, it is determined whether or not the replacement/cleaning/replenishment key is displayed in black on white. If the replacement/cleaning/replenishment key is displayed in black on white, the process proceeds to a step S209, wherein completion of adjustment based on an item displayed in black on white on an internal hierarchical screen displayed by depressing the replacement/cleaning/replenishment key is awaited. Then, when the adjustment based on the item displayed in black on white on the internal hierarchical screen is completed, the process proceeds to a step S210. If it is determined in the step S208 that the replacement/ cleaning/replenishment key is not displayed in black on white, the process skips over the step S209 to the step S210.

In the step S210, it is determined whether or not the job sequence key is displayed in black on white. If the job sequence key is displayed in black on white, the process proceeds to a step S211, wherein completion of adjustment based on an item displayed in black on white on an internal hierarchical screen displayed by depressing the job sequence key is awaited. Then, when the adjustment based on the item displayed in black on white on the internal hierarchical screen is completed, the process proceeds to a step S212. If it is determined in the step S210 that the job sequence key is not displayed in black on white, the process skips over the step S211 to the step S212.

In the step S212, it is determined whether or not the other machine key is displayed in black on white. If the other machine key is displayed in black on white, the process proceeds to a step S213, wherein depression of the other machine key is awaited. When the other machine key is depressed, the process returns to the step S201, wherein a maintenance screen associated with another machine designated by the depression of the other machine key is displayed. If it is determined in the step S212 that the other machine key is not displayed in black on white, the process proceeds to a step S214, wherein depression of a return key is awaited. When the return key is depressed, the present process is terminated, and the process returns to the step S104 in FIG. 21.

If there is no item key displayed in black on white in the step S205, the process skips over the steps S206 to S211 to the step S212.

As described above, when it is determined that there is no item key displayed in black on white on the currently displayed maintenance screen, or when it is determined in the steps S206, S208, S210 that there is no item key displayed in black on white, the process skips over to the respective corresponding steps therefore, the operator can distinguish between items shaded thereby indicating no requirement of maintenance and items displayed in black on white thereby indicating requirement of maintenance. This establishes a work flow in which maintenance is executed based on only the items indicating requirement of maintenance.

Next, the aforementioned data registration menu screen will be described with reference to FIG. 28. FIG. 28 is a view showing an example of the data registration menu screen displayed on the sever 3101 appearing in FIG. 20.

On the data registration menu screen, registrable print job data items are displayed in respective rows of the menu. A column "A" of the menu shows methods of supply of data from the operator or operator's customer. "NW" indicates that the data was supplied via the Internet. "CD" indicates that the data was supplied from a CD medium. "MO" indicates that the data was supplied from a MO medium. A column "B" shows sheet types designated for image formation. Each data item displayed here is based on the supplied data. A column "C" shows the numbers of sheets or pages to be printed based on image print job data. A column "D" shows the numbers of copies. A column "E" shows designations of color printing and monochrome printing. "Color" represents color printing, and "BW" represents monochrome printing. A column "F" shows designations of image qualities in print modes, which are selected from low image quality, high image quality, and very high image quality is specified. The image quality of a print becomes higher in the order of low image quality, high image quality, and very high image quality.

On the data registration menu screen described above, when a portion displaying the row number of print job data is depressed and then a registration key ("Registration") is depressed, the print job data thus selected is stored in the hard disk (HD) 3120. Then, the registered (stored) print job data is deleted from the display. Assuming, for example, that print job data in the first row is registered, the print job data is deleted from the first row, and print job data in the second row shifts to the first row. When the data registration menu screen contains pieces of print job data in more than eight rows, a next page key ("Next Page") is displayed in black on white, which enables the present screen to be switched to a screen displaying pieces of print job data in the ninth row et seq. In the illustrated example, there are displayed less than nine pieces of print job data, and therefore the next page key is shaded.

Registration of print job data stored by depressing the registration key in FIG. 28 is executed by depressing the job registration key on the screen in FIG. 22, as described hereinabove. When the job registration key is depressed, the screen shown in FIG. 22 shifts to the screen shown in FIG. 29.

Next, job registration will be described with reference to FIG. 29. FIG. 29 is a view showing an example of a job registration menu screen displayed on the server 3101 appearing in FIG. 20.

On the job registration menu screen shown in FIG. 29, in a column "A" of the menu, there are entered designation data of sheet types displayed in the column "B" on the screen in FIG. 28. Similarly, in a column "B", there are entered designation data in the column "C" in FIG. 28. In a column "C", there are entered the designation data in the column "D" in FIG. 28. In a column "D", there are entered designation data in the column "E" in FIG. 28. In a column "E", there are entered, for example, items of information (e.g. model name CLC5000) for identifying the image forming apparatus 3103 when "Color" is designated by associated data in the column "D", and for example, items of information (e.g. model name iR105) for identifying the image forming apparatus 3102 when "BW" is designated by associated data in the column "D". In the arrangement of the present image forming system, only a single color digital copying machine and a single monochrome digital copying machine are connected, and therefor data in the E column is automatically set based on designation data in the column "D". However, when the image forming system has a plurality of color digital copying machines and a plurality of monochrome digital copying machines connected thereto, data in the E column is designated by an operator. In a column "F", there are entered designation data in the column "F" in FIG. 28.

In the above described job registration menu screen, print job data is added in the eighth row due to registration thereof on the screen shown in FIG. 28, as described above. The server 3101 transmits the print job data in the job registration menu in the order of the row numbers to the image forming apparatus 3103 (color digital copying machine CLC5000) and the image forming apparatus 3102 (monochrome digital copying machine iR105) to cause them to perform image forming operations. Print job data of different row numbers are basically transmitted in the order of the row numbers, but operations for transmitting print job data to the different image forming apparatuses are performed simultaneously.

In the illustrated example in FIG. 29, print job data of the row numbers 1 and 2 are assigned to the different image forming apparatuses, and therefore the print job data are transmitted simultaneously. The sequence of print job data can be changed by depressing the positions of the two row numbers on the screen and then depressing a switch key ("Switch").

When there are print job data in more than eleven rows on the job registration menu screen, a next page key ("Next Page") is displayed in black on white, so that the present screen can be switched to a screen displaying print job data in the twelfth row et seq. In the illustrated example of the screen, there are displayed print job data in less than twelve rows, and therefore the next page key is shaded.

The registration of print jobs shown in the job registration menu is carried out by depressing a registration key ("Registration") shown on this registration menu screen. This makes affirmative (Yes) the answer to the question of the step S101 in FIG. 21.

Next, maintenance items will be described with reference to the accompanying drawings.

When a status confirmation key ("Status confirmation") is depressed on each of the maintenance item screen for the image forming apparatus 3103 in FIG. 23 and the maintenance item screen for the image forming apparatus 3102 in FIG. 24, the screen is switched to a screen displaying details of the current registration (settings) by the adjustment sequence key, the replacement/cleaning/replenishment key, and the job sequence key. When the status confirmation key is depressed on the screen in FIG. 23, the screen is switch to a screen shown in FIG. 30, while when the status confirmation key is depressed on the screen in FIG. 24, the screen is switch to a screen shown in FIG. 31. Further, when a return key ("Return") is depressed on each of the screens in FIGS. 23, 24, the screen is switched back to the screen in FIG. 22 at the hierarchically higher level.

Figure 30:
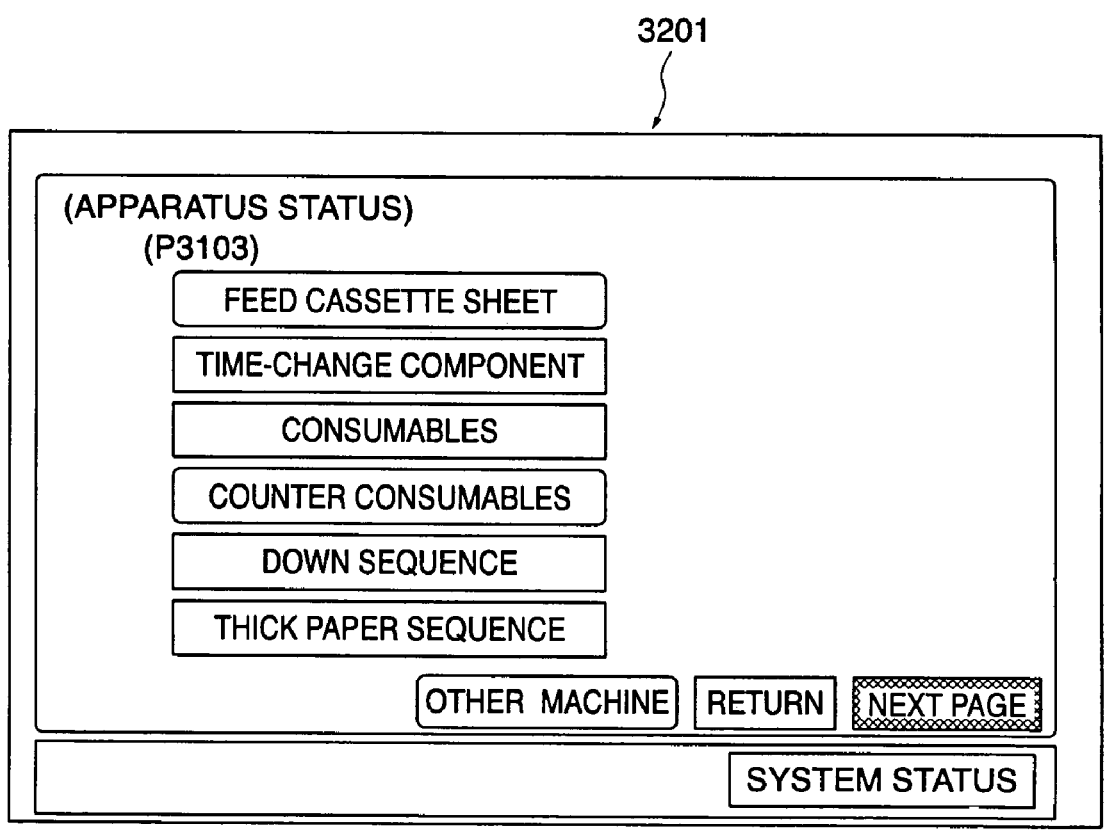
FIG. 30 is a view showing an example of an apparatus status display screen showing a status of the image forming apparatus 3103.
Figure 31:
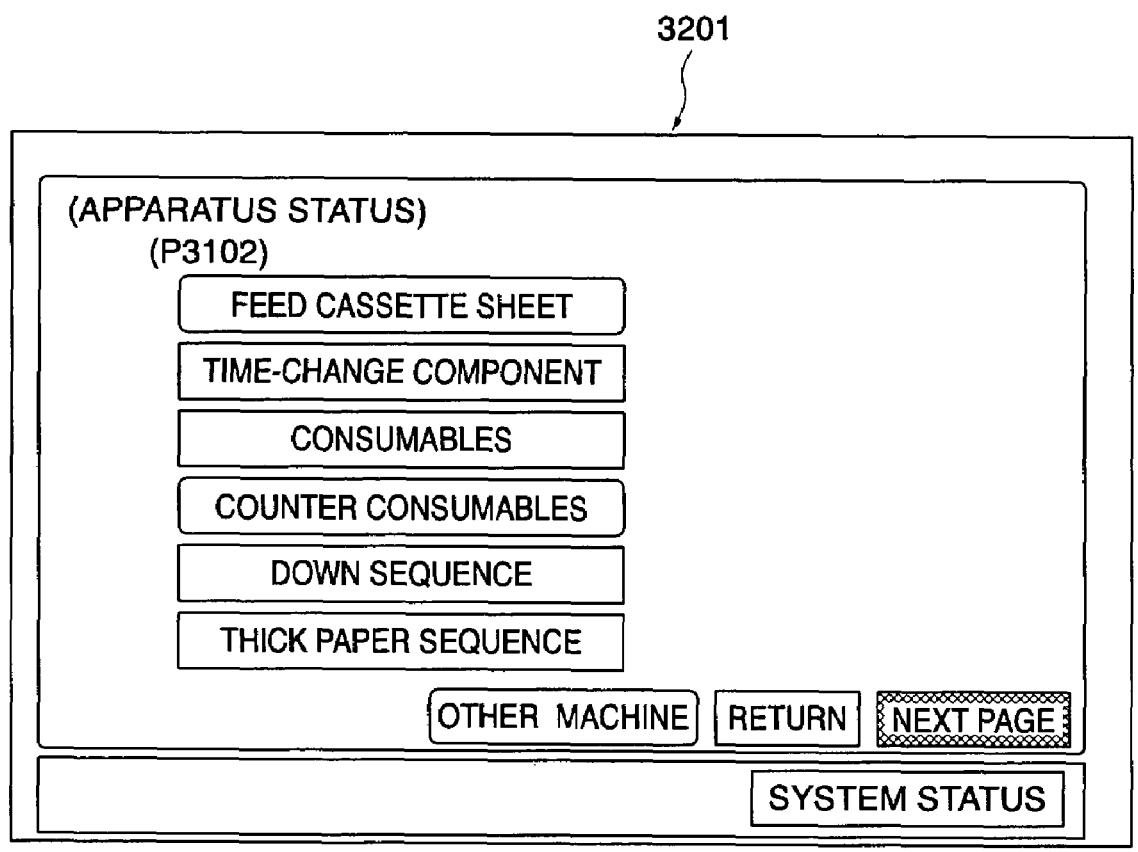
FIG. 31 is a view showing an example of an apparatus status display screen showing a status of the image forming apparatus 3102.

FIG. 30 is a view showing an example of an apparatus status display screen showing a status of the image forming apparatus 3103 appearing in FIG. 20, and FIG. 31 is a view showing an example of an apparatus status display screen showing a status of the image forming apparatus 3102 appearing in FIG. 20. On each of the status display screens in FIGS. 30, 31, there are displayed a sheet feed cassette sheet key ("Feed cassette sheet"), a time-change component key ("Time-change component"), a consumables key ("Consumables"), a counter consumables key ("Counter consumables"), a down sequence key ("Down sequence"), and a thick paper sequence key ("Thick paper sequence). Switching between the screens in FIGS. 30, 31 is performed by depressing respective other machine keys on the screens. Further, when a return key ("Return") is depressed on each of the screens in FIGS. 30, 31, the screen is switched back to the screen in FIG. 23 or 24 at the hierarchically higher level.

Figure 32:
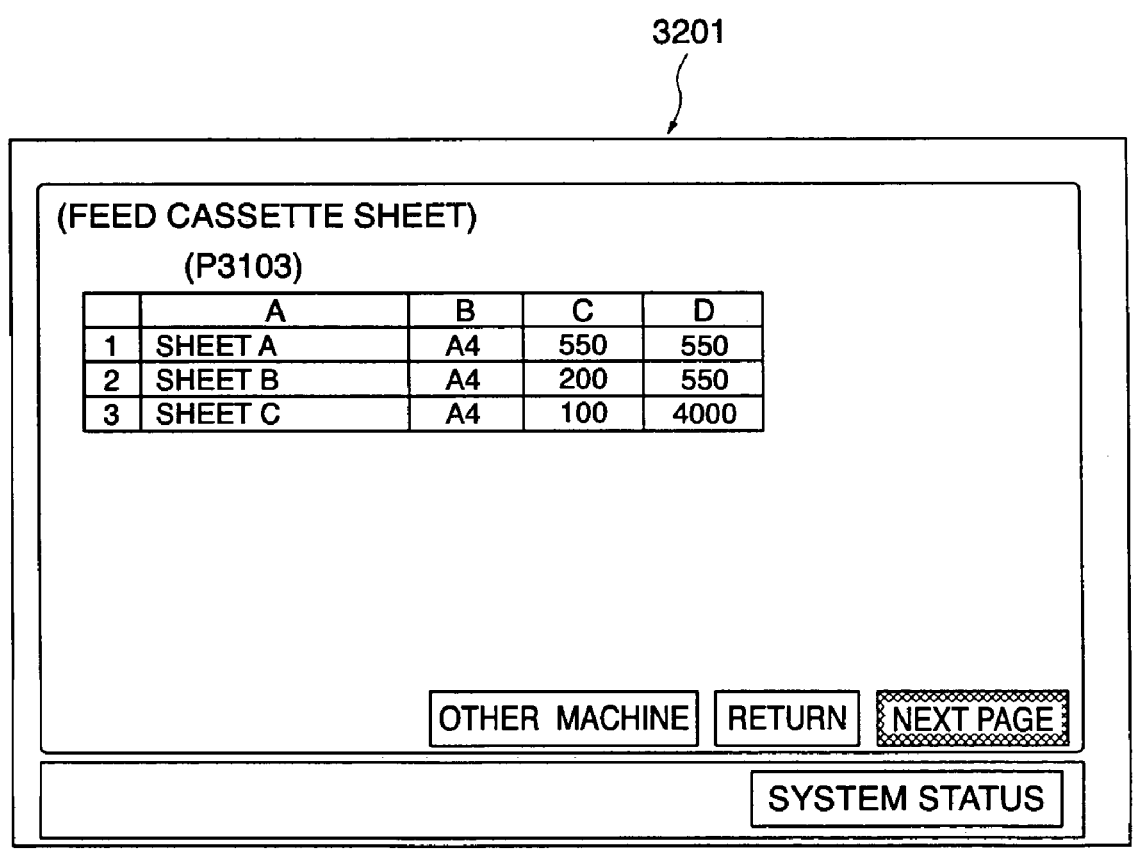
FIG. 32 is a view showing an example of a screen displaying information of cassette-by-cassette settings of sheets set in sheet feed cassettes of the image forming apparatus 3102.

When the sheet feed cassette sheet key is depressed on the screen in FIG. 30, the screen is switched to a screen shown in FIG. 32. Similarly, when the sheet feed cassette sheet key is depressed on the screen in FIG. 31, the screen is switched to a screen shown in FIG. 33.

Figure 33:
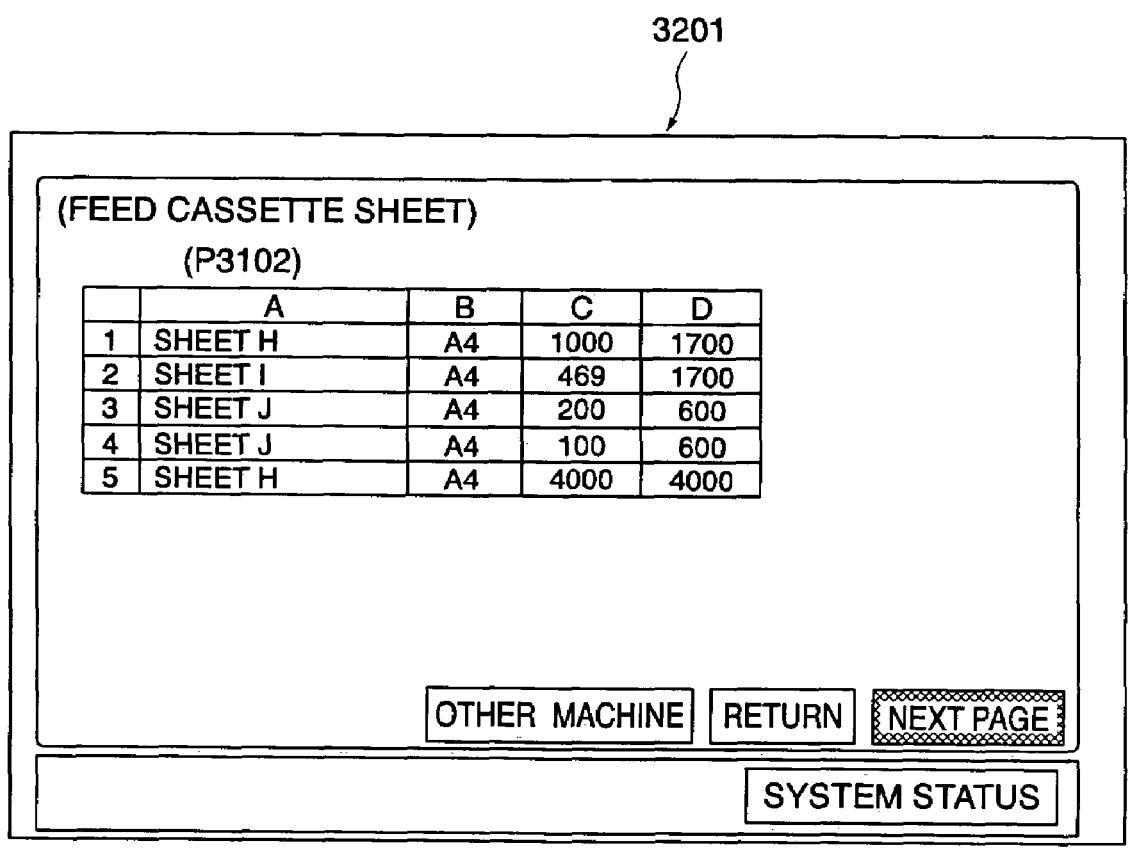
FIG. 33 is a view showing an example of a screen displaying information of cassette-by-cassette settings of sheets set in sheet feed cassettes of the image forming apparatus 3103.

FIG. 32 is a view showing an example of a screen displaying information of cassette-by-cassette settings of sheets set in sheet feed cassettes of the image forming apparatus 3102 appearing in FIG. 20, and FIG. 33 is a view showing an example of a screen displaying information of cassette-by-cassette settings of sheets set in sheet feed cassettes of the image forming apparatus 3103 appearing in FIG. 20. Switching between the screens in FIGS. 32, 33 is performed by depressing other machine keys on the respective screens, similarly to switching between the other screens. Further, when a return key ("Return") is depressed on each of the screens in FIGS. 32, 33, the screen is switched back to the screen in FIG. 30 or 31 at the hierarchically higher level.

On each of the screens in FIGS. 32, 33, a column "A" shows the types of sheets set on the sheet feed cassettes, while a column "B" shows the sizes of the sheets. Columns C and D show the numbers of sheets currently set and the maximum numbers of sheets that can be set on the sheet feed cassettes, respectively. When it is determined from an output of sensor means (not shown) that the maximum number of sheets has been set by sheet replenishment (or replacement), the number of the sheets in the column "C" becomes equal to the maximum number in the column "D".

When the time-change component key is depressed on the screen shown in FIG. 30, the screen is switched to a screen shown in FIG. 34. Similarly, when the time-change component key is depressed on the screen shown in FIG. 31, the screen is switched to a screen shown in FIG. 35. FIG. 34 is a view showing an example of the screen displaying a time-change component status of the image forming apparatus 3103 appearing in FIG. 20, and FIG. 35 is a view showing an example of the screen displaying a time-change component status of the image forming apparatus 3102 in FIG. 20. In each of the screens in FIGS. 34 and 35, registered components are entered in respective rows. A column "A" shows part names. A column "B" shows current component operation count values associated with the respective registered components. A column "C" shows count values at or above which associated components require cleaning. A column "D" shows count values at or above which associated components require replacement. A column "E" shows count values at or above which associated components require adjustment. A column "F" shows service time periods before replacement. A column "G" shows dates on which component replacement was performed (date on which the apparatus was newly installed). The component-by-component operation count value displayed in each row is incremented whenever image formation is performed and cleared to zero when the associated component is replaced by a new one. Switching between the screens in FIGS. 34, 35 is performed by depressing other machine keys on the respective screens. Further, when a return key ("Return") is depressed on each of the screens in FIGS. 34, 35, the screen is switched back to the screen in FIG. 30 or 31 at the hierarchically higher level.

Among the time-change components displayed on the screen in FIG. 34 (i.e. components of the image forming apparatus 3103 in FIG. 61), primary electrostatic charge wires, for example, are provided in primary electrostatic chargers $917a$, $921a$, $925a$, $929a$. The primary electrostatic charge wires are replaced when the current count value (47000 in the illustrated example) reaches the count value (50000) at or above which the wires require replacement. The other components in FIG. 34 are also commonly provided parts, and therefore detailed description thereof is omitted.

Figure 62:
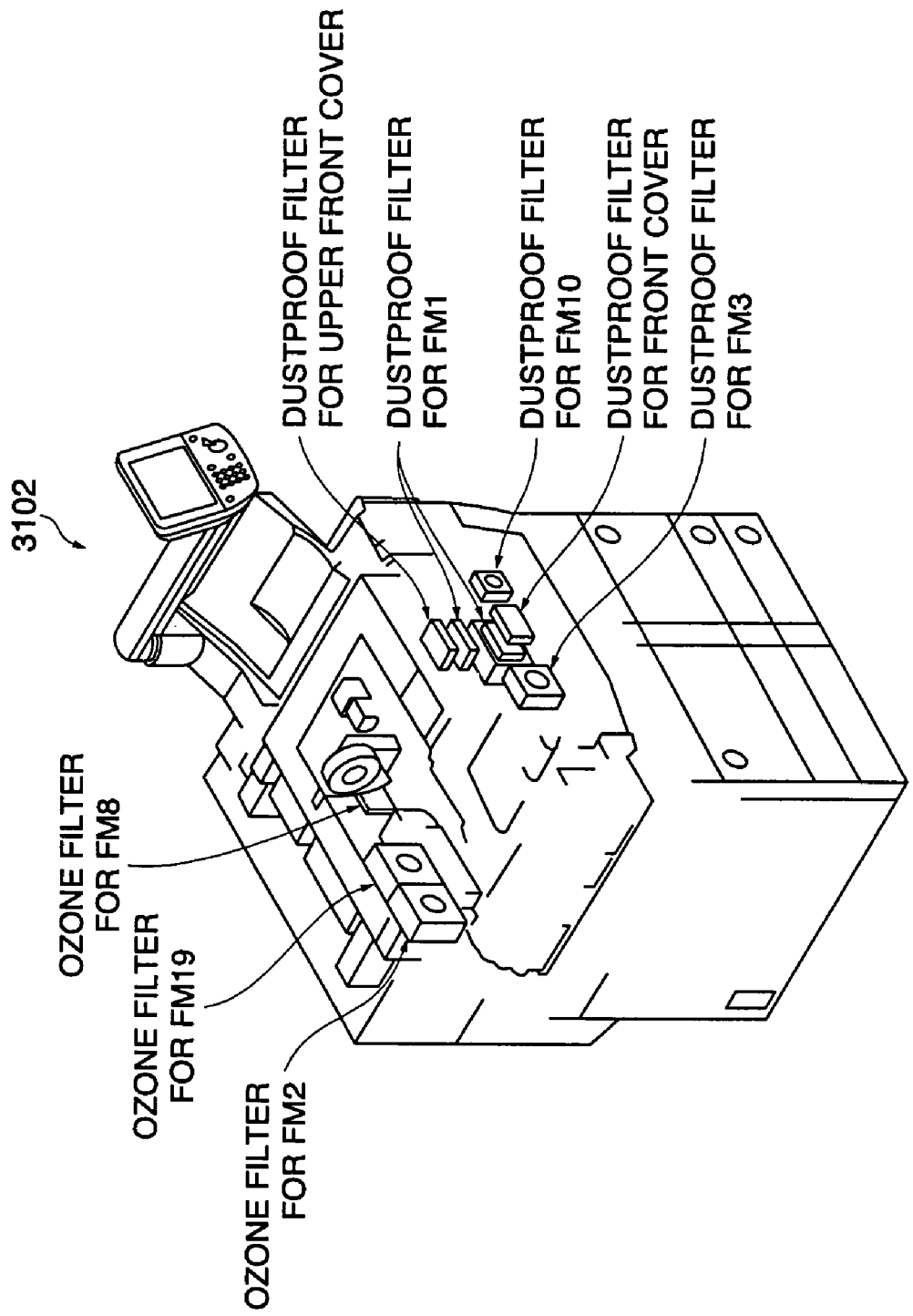
FIG. 62 is a view showing locations of replacement parts used in the image forming apparatus 3102.

Among the time-change components displayed on the screen in FIG. 35 (i.e. components of the image forming apparatus 3102 in FIG. 59), a thermistor and a thermo SW unit, for example, are provided in the fixing device 4040. The thermistor and thermo SW unit are each replaced when the current count value (2100 in the illustrated example) reaches the count value (500000 or 1000000) at or above which they require replacement. Further, an ozone filter represents three kinds of ozone filters disposed at respective locations shown in FIG. 62. The other components in FIG. 35 are also commonly provided parts, and therefore detailed description thereof is omitted.

When the consumables key is depressed on the screen in FIG. 30, the screen is switched to a screen shown in FIG. 36. Similarly, when the consumables key is depressed on the screen in FIG. 31, the screen is switched to a screen shown in FIG. 38.

FIGS. 36 and 37 are views showing examples of a screen displaying a status of consumables of the mage forming apparatus 3103 appearing in FIG. 20, while FIGS. 38 and 39 views showing examples of a screen displaying a status of consumables of the mage forming apparatus 3102 appearing in FIG. 20. On the screen in FIG. 36 or 38, when the number of components registered in respective rows exceeds a predetermined number (i.e. the number of items in the table), a next page key ("Next page") is depressed to shift the screen to a screen shown in FIG. 37 or 39, wherein the other components are displayed. On the other hand, when it is necessary to display components on the previous page on the screen in FIG. 37 or 39, a previous page key ("Previous page") is depressed to switch the screen back to the screen in FIG. 36 or 38. Switching between the screens in FIGS. 36, 37 and the screens in FIGS. 38, 39 is performed by depressing other machine keys on the respective screens. Further, when a return key ("Return") is depressed on each of the screens in FIGS. 36, 37, 38, 39, the screen is switched back to the screen in FIG. 30 or 31 at the hierarchically higher level.

In each of the screens in FIGS. 36, 37, 38, 39, registered components are displayed in respective rows. A column "A" shows part names. A column "B" shows current component operation count values associated with the respective registered components. A column "C" shows count values at or above which associated components require cleaning. A column "D" shows count values at or above which associated components require replacement. A column "E" shows count values at or above which associated components require adjustment. A column "F" shows service time periods before component replacement. A column "G" shows dates on which component replacement was performed (date on which the apparatus was newly installed). The component-by-component operation count value displayed in each row is incremented whenever image formation is performed and cleared to zero when the associated component is replaced by a new one.

Among the consumables displayed on the screens in FIGS. 36 and 37 (i.e. components of the image forming apparatus 3103), a start developer, for example, is replenished to the developing devices 930, 931, 932, 933. Further, the item of "Transfer belt CLNWEB" represents a cleaning web for the transfer belt 938, and the item of "Transfer belt" represents the transfer belt 938. The other components in FIGS. 36, 37 are also commonly provided parts, and therefore detailed description thereof is omitted.

Among the consumables displayed on the screens in FIGS. 38 and 39 (i.e. components of the image forming apparatus 3102), the item of "Developing device", for example, represents a developing cylinder and a set of roller bearings included in the developing device 4030. Further, the item of "Primary electrostatic charger" represents the primary electrostatic charger 4018. The other components shown in FIGS. 38, 39 are also commonly provided parts, and therefore detailed description thereof is omitted.

When the counter consumables key is depressed on the screen in FIG. 30, the screen is switched to a screen in FIG. 40. Similarly, when the counter consumables key is depressed on the screen in FIG. 31, the screen is switched to a screen in FIG. 41. FIG. 40 is a view showing an example of the screen displaying a status of software counter consumables of the mage forming apparatus 3103 appearing in FIG. 20, and FIG. 41 is a view showing an example of the screen displaying a status of software counter consumables of the mage forming apparatus 3102 appearing in FIG. 20.

In each of the screens in FIGS. 40, 41, registered components are displayed in respective rows. A column "A" shows part names. A column "B" shows current component operation count values associated with the respective registered components. A column "C" shows count values at or above which associated components require cleaning. A column "D" shows count values at or above which associated components require replacement. A column "E" shows count values at or above which associated components require adjustment. A column "F" shows service time periods before component replacement. A column "G" shows dates on which component replacement was performed (date on which the apparatus was newly installed). The component-by-component operation count value displayed in each row is incremented whenever image formation is performed provided that the item corresponds to a sheet feed cassette from which sheets are fed for image formation (in the double-sided mode, only the count value in the item of "Double-sided sheet feed roller" is incremented whenever image formation is performed on a second side of each sheet), and cleared to zero when the associated component is replaced by a new one. Switching between the screens in FIGS. 40, 41 is performed by depressing other machine keys on the respective screens. Further, when a return key ("Return") is depressed on each of the screens in FIGS. 40, 41, the screen is switched back to the screen in FIG. 30 or 31 at the hierarchically higher level.

When the down sequence key is depressed on the screen in FIG. 30, the screen is switched to a screen shown in FIG. 42, for configuring a down sequence. Similarly, when the down sequence key is depressed on the screen in FIG. 31, the screen is switched to a screen in FIG. 43, for configuring a down sequence. FIG. 42 is a view showing an example of the screen for configuring a down sequence for the image forming apparatus 3103 appearing in FIG. 20, and FIG. 43 is a view showing an example of the screen for configuring a down sequence for the image forming apparatus 3102 appearing in FIG. 20.

On each of the screens in FIGS. 42 and 43, registered modes are displayed in respective rows. A column "A" shows print mode names. A column "B" shows current fixing temperature limiter values. A column "C" shows ambient temperature values detected when the associated limiter values displayed in the column "B" are set respectively (initial values are those detected at the time of installation of the apparatus). A column "D" shows ambient humidity values detected when the associated limiter values displayed in the column "B" are set respectively (initial values are those detected at the time of installation of the apparatus). A column "E" shows allowable temperature differences from the current ambient temperature, and a column "F" shows allowable humidity differences from the current ambient humidity. The print mode names in the column "A" correspond to the print modes designated in the column "F" in FIG. 28. The current fixing temperature limiter values in the column "B" represent values of the detected temperature of the fixing section at or below which the performance of the apparatus is changed in the lowering direction from that defined in the specifications (i.e. shifted to a down sequence), and a temperature set for restoration of the performance of the specifications. The current limiter values of the temperature of the fixing section in each box of the column "B" represent a product specification temperature value, a 82%-performance temperature value, an image formation-interrupting temperature value, and an image forming operation-restoring temperature value, from the left side, respectively.

When the detected temperature of the fixing section is equal to or higher than a set value of the product specification temperature value, an image forming operation is executed according to product specifications. However, when the detected temperature of the fixing section is lower than the set value of the product specification temperature value and equal to or higher than a set value of the 82%-performance temperature value, the image forming operation is executed in a state where the performance of the image forming apparatus is lowered to 82% of the product specifications. The performance is lowered because if the image forming operation is executed at normal sheet feed intervals at a low fixing temperature, the risk of causing fixing failure is high, and therefore it is necessary to increase the interval of feeding of sheets to thereby prevent fixing failure. Further, when the detected temperature of the fixing section is lower than the set value of the 82%-performance temperature value and equal to or higher than a set value of the image formation-interrupting temperature value, the image forming operation is executed in a state where the performance of the image forming apparatus is lowered to 70% of the product specifications. Furthermore, when the detected temperature of the fixing section is lower than the set value of the image formation-interrupting temperature value, the image forming operation is interrupted. After interruption of the image forming operation, a rise in the temperature of the fixing section is awaited, and when the detected temperature of the fixing section becomes equal to or higher than a set value of the image forming operation-restoring temperature value, the image forming operation is resumed in accordance with the product specifications.

Switching between the screens in FIGS. 42, 43 is performed by depressing other machine keys on the respective screens. Further, when a return key ("Return") is depressed on each of the screens in FIGS. 42, 43, the screen is switched back to the screen in FIG. 30 or 31 at the hierarchically higher level.

When the thick paper sequence key is depressed on the screen in FIG. 30, the screen is switched to a screen in FIG. 44, for configuring the thick paper mode. Similarly, when the thick paper sequence key is depressed on the screen in FIG. 31, the screen is switched to a screen in FIG. 45, for configuring the thick paper mode. FIG. 44 is a view showing an example of the screen for configuring the a thick paper mode for the image forming apparatus 3103 appearing in FIG. 20, and FIG. 45 is view showing an example of the screen for configuring the a thick paper mode for the image forming apparatus 3102 appearing in FIG. 20.

On each of the screens in FIGS. 44 and 45, registered modes are displayed in respective rows. A column "A" shows thick paper mode names. A column "B" shows sheet types currently registered for the thick paper mode. A column "C" shows current fixing temperature limiter values. A column "D" shows ambient temperature values detected when the associated limiter values displayed in the column "C" are set respectively (initial values are those detected at the time of installation of the apparatus). A column "E" shows ambient humidity values detected when the associated limiter values displayed in the column "C" are set respectively (initial values are those detected at the time of installation of the apparatus). A column "F" shows allowable temperature difference from the current ambient temperature, and a column "G" shows allowable humidity difference from the current ambient humidity. The sheet types in the column "B" correspond to the sheet types designated in the column "B" in FIG. 28 and the sheet types set in each of the columns A in FIGS. 32, 33. The current fixing temperature limiter values in the column "C" represent values of the detected temperature of the fixing section at or below which the performance of the apparatus is changed in the lowering direction from that defined in the specifications (i.e. shifted to a thick paper sequence), and a temperature set for restoration of the performance of the specifications. The current limiter values of the temperature of the fixing section in each box of the column "C" represent a product specification temperature value, a 82%-performance temperature value, an image formation-interrupting temperature value, and an image forming operation-restoring temperature value, from the left side, respectively.

When the detected temperature of the fixing section is equal to or higher than a set value of the product specification temperature value, an image forming operation is executed according to product specifications. However, when the detected temperature of the fixing section is lower than the set value of the product specification temperature value and equal to or higher than a set value of the 82%-performance temperature value, the image forming operation is executed in a state where the performance of the image forming apparatus is lowered to 82% of the product specifications. The performance is made lower that that of the product specifications, for the same reason as described above for the down sequence. Further, when the detected temperature of the fixing section is lower than the set value of the 82%-performance temperature value and equal to or higher than a set value of the image formation-interrupting temperature value, the image forming operation is executed in a state where the performance of the image forming apparatus is lowered to 70% of the product specifications. Furthermore, when the detected temperature of the fixing section is lower than the set value of the image formation-interrupting temperature value, the image forming operation is interrupted. After interruption of the image forming operation, a rise in the temperature of the fixing section is awaited, and when the detected temperature of the fixing section becomes equal to or higher than a set value of the image forming operation-restoring temperature value, the image forming operation resumed in accordance with the product specifications.

When it is simultaneously detected that the detected temperature becomes lower than limiter values for both the down sequence and the thick paper sequence, one of the two sequences in which the performance is lowered to a larger degree is preferentially applied. The priority is applied in the order of interruption of image forming operation, 70% performance, 82% performance and product specification. Further, the image forming operation restoring operation is also performed according to one of the two sequences for which the more strict condition is set. For example, assuming that the set temperature value for image forming operation restoring operation after the image formation interruption in the down sequence is 188° C., and the set temperature value for image forming operation restoring operation after the image formation interruption in the thick paper sequence is 183° C., the set temperature value of 188° C. is preferentially applied.

Switching between the screens in FIGS. 44, 45 is performed by depressing other machine keys on the respective screens. Further, when a return key ("Return") is depressed on each of the screens in FIGS. 44, 45, the screen is switched back to the screen in FIG. 30 or 31 at the hierarchically higher level.

Next, a description will be given of the adjustment sequence referred to hereinabove with reference to FIGS. 23 and 24. On the screen shown in FIG. 25, the down sequence adjustment key and the thick paper mode adjustment key are already shaded, which means that neither of the down sequence adjustment and the thick paper mode adjustment is necessary. On the other hand, on the screen shown in FIG. 26, the down sequence adjustment key and the thick paper mode adjustment key are both displayed in black on white, which indicates that both of the adjustments are necessary. From this, the operator can judge that the down sequence adjustment and thick paper mode adjustment need not be executed for the image forming apparatus 3103, and that they need to be executed for the image forming apparatus 3102.

Figure 46:
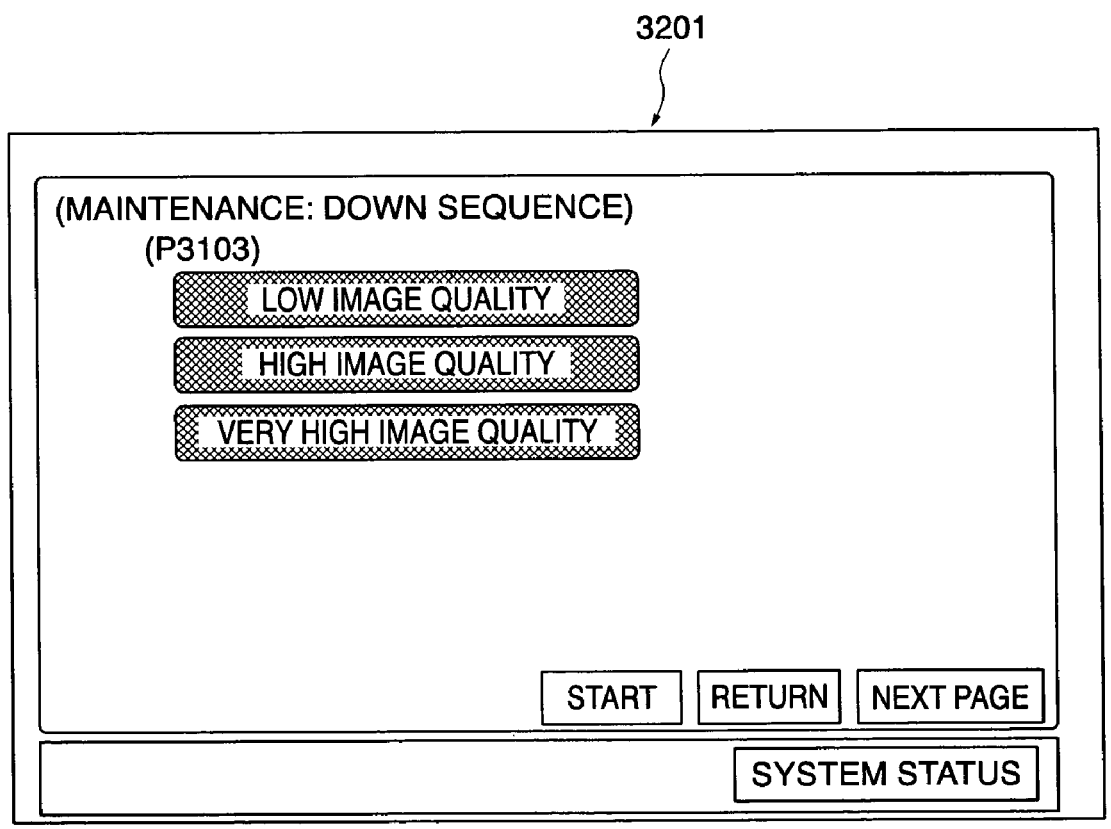
FIG. 46 is a view showing an example of a mode-specific adjustment screen for down sequence adjustment for the image forming apparatus 3103.

When the down sequence adjustment key is depressed on the screen shown in FIG. 25, the screen is switched to a screen shown in FIG. 46. Similarly, when the down sequence adjustment key is depressed on the screen shown in FIG. 26, the screen is switched to a screen shown in FIG. 47. FIG. 46 is a view showing an example of a mode-specific adjustment screen for down sequence adjustment for the image forming apparatus 3103 appearing in FIG. 20, and FIG. 47 is a view showing an example of a mode-specific adjustment screen for down sequence adjustment for the image forming apparatus 3102 appearing in FIG. 20.

On the screen shown in FIG. 46, "Low image quality", "High image quality", and "Very high image quality" correspond to print mode names in the column "A" on the screen shown in FIG. 42. Similarly, on the screen shown in FIG. 47, "Low image quality", "High image quality", and "Very high image quality" correspond to print mode names in the column "A" on the screen shown in FIG. 43.

Figure 47:
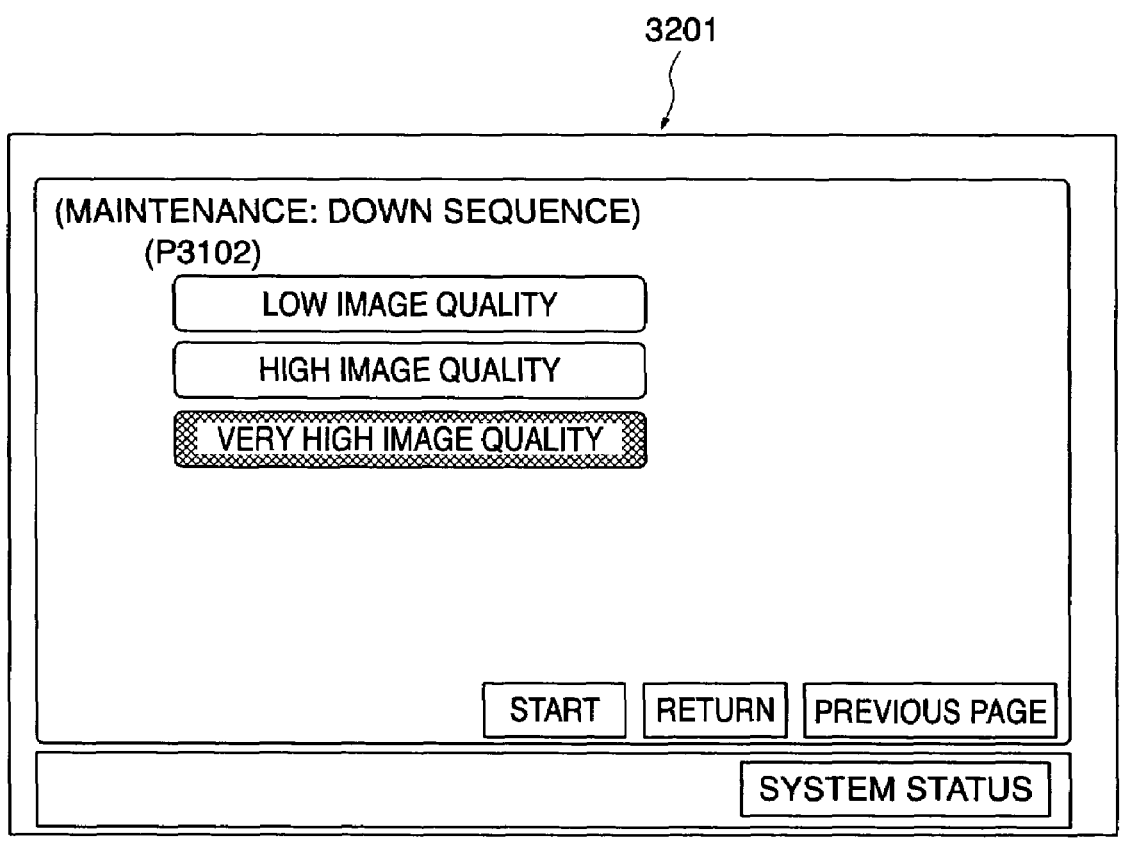
FIG. 47 is a view showing an example of a mode-specific adjustment screen for down sequence adjustment for the image forming apparatus 3102.

On the screens shown in FIGS. 46 and 47, the mode-specific adjustment keys for the down sequence adjustment are displayed in black on white when there holds either of the following conditions, and shaded when there does not hold either of the following conditions:

(1) On the screen shown in FIG. 42 or 43, which is used in a manner associated with an image forming apparatus to which is supplied print job data of jobs registered on the screen shown in FIG. 29, values of the temperature shown in the column "C" associated with print modes designated in the column "A" are not within the allowable temperature differences with respect to the current ambient temperature.

(2) On the screen shown in FIG. 42 or 43, which is used in a manner associated with an image forming apparatus to which is supplied print job data of jobs registered on the screen shown in FIG. 29, values of the humidity shown in the column "D" associated with print modes designated in the column "A" are not within allowable humidity differences with respect to the current ambient humidity.

The states of "Low image quality", "High image quality", and "Very high image quality" being shaded on the screen shown in FIG. 46 correspond to a state in which the print modes designated by the print jobs registered on the screen shown in FIG. 29 are two print modes of "High image quality" and "Very high image quality", and the ambient temperature and humidity displayed on the initial screen of FIG. 22 are within the above-mentioned allowable temperature and humidity differences. Further, the print mode of "Low image quality" is not used here, and since this mode thus does not require adjustment, the key thereof is shaded. All the keys of "Low image quality", "High image quality" and "Very high image quality" are shaded on the screen shown in FIG. 46, so that the down sequence adjustment key on the screen shown in FIG. 25 is shaded.

The states of "Low image quality" and "High image quality" being displayed in black on white on the screen shown in FIG. 47 correspond to a state in which the print modes designated by the print jobs registered on the screen shown in FIG. 29 are two print modes of "Low image quality" and "High image quality", and the ambient temperature displayed on the initial screen of FIG. 22 is not within the above-mentioned allowable temperature. Further, the print mode of "Very high image quality" is not used here, and since this mode thus does not require adjustment, the key thereof is shaded. All the keys of "Low image quality", "High image quality" and "Very high image quality" are not shaded on the screen shown in FIG. 47, so that the down sequence adjustment key on the screen shown in FIG. 26 is displayed in black on white.

When the mode-specific adjustment key (any of the low image quality key, high image quality key, and very high image quality key) is depressed on the down sequence adjustment screen shown in FIG. 46 or 47, the screen is switched to the screen shown in FIG. 42 or 43, respectively, and the configuration is carried out by changing the current limiter value of the fixing temperature in the column "B" associated therewith. The changing of the limiter value of the fixing temperature in the column "B" is carried out using numerical value-inputting means, not shown. When the operator changes the limiter value of the fixing temperature, and depresses a set key ("Set"), the ambient temperature value in the column "C" is replaced by the current ambient temperature, and the ambient humidity value in the column "D" is replaced by the current ambient humidity. Further, when the changing of the current limiter value of the fixing temperature in the column "B" necessary for the print mode is completed on the screen shown in FIG. 43, and the return key is depressed, the screen is switched to the screen shown in FIG. 46 or 47, on which the mode-specific adjustment keys in the down sequence adjustment are shaded.

Figure 48:
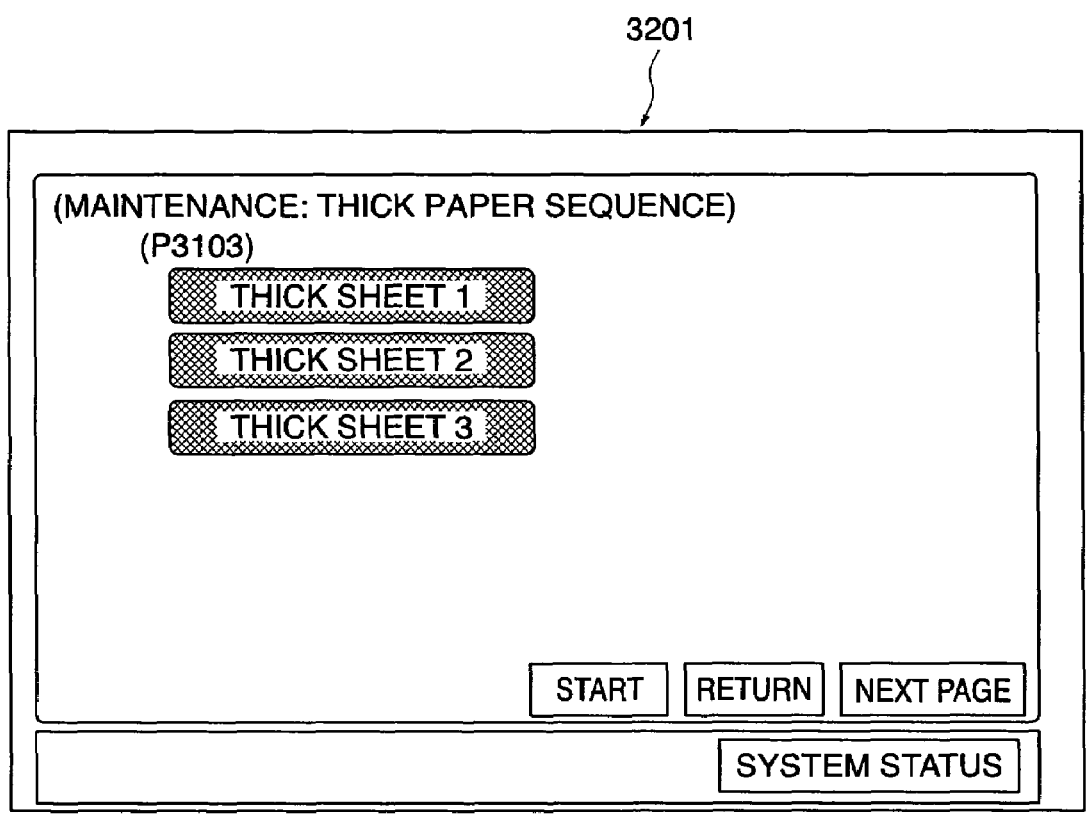
FIG. 48 is a view showing an example of a mode-specific adjustment screen for thick paper mode adjustment for the image forming apparatus 3103.

Next, a description will be given of a case in which the thick paper mode adjustment key is depressed on the screen shown in FIG. 25 or 26. When the thick paper mode adjustment key is depressed on the screen shown in FIG. 25, the screen is switched to the screen shown in FIG. 48. Similarly, when the thick paper mode adjustment key is depressed on the screen shown in FIG. 26, the screen is switched to the screen shown in FIG. 49. FIG. 48 is a view showing an example of a mode-specific adjustment screen for the thick paper mode adjustment for the image forming apparatus 3103 appearing in FIG. 20, and FIG. 49 is a view showing an example of a mode-specific adjustment screen for the thick paper mode adjustment for the image forming apparatus 3102 appearing in FIG. 20.

"Thick paper 1", "Thick paper 2", and "Thick paper 3" on the screen shown in FIG. 48 correspond to the names of the thick paper mode in the column "A" on the screen shown in FIG. 44. Similarly, "Thick paper 1", "Thick paper 2", and "Thick paper 3" on the screen shown in FIG. 49 correspond to the names of the thick paper mode in the column "A" on the screen shown in FIG. 45.

Figure 49:
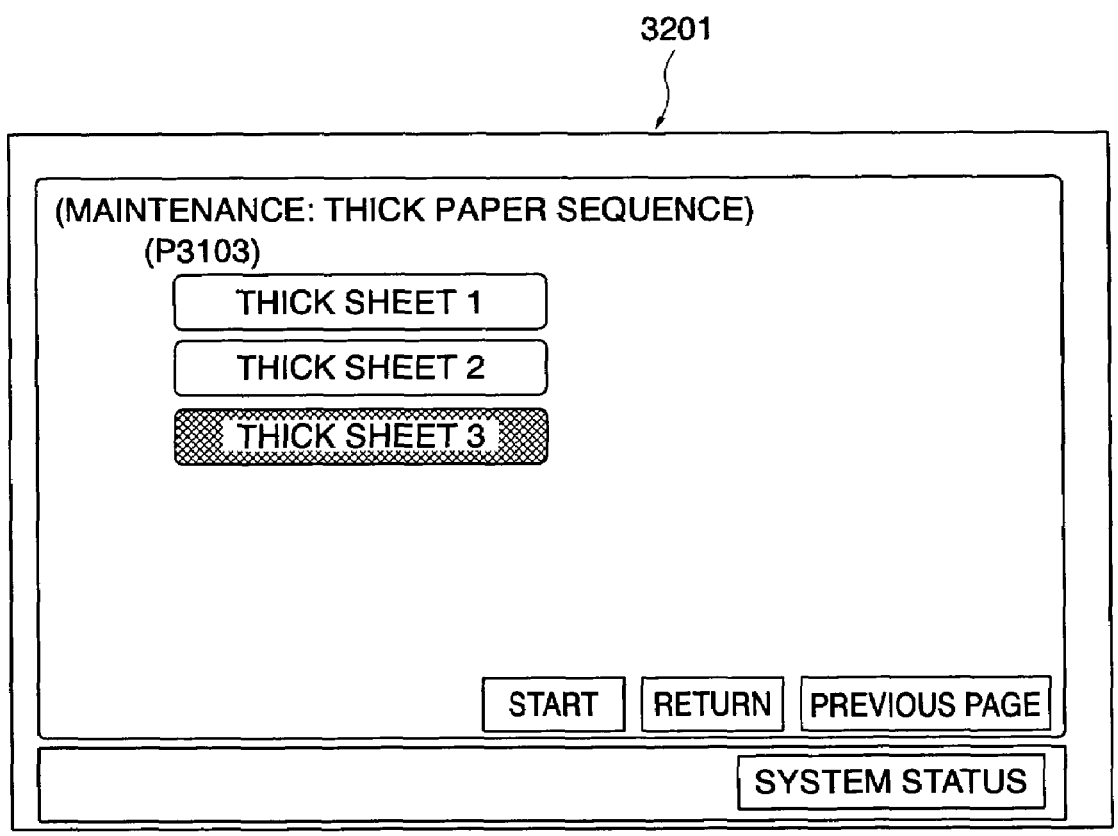
FIG. 49 is a view showing an example of a mode-specific adjustment screen for thick paper mode adjustment for the image forming apparatus 3102.

On the screens of FIGS. 48 and 49, the mode-specific specific adjustment keys for the thick paper mode adjustment are displayed in black on white, when there holds either of the following conditions, and shaded when there does not hold either of the following conditions:

(1) On the screen shown in FIG. 44 or 45, which is used in a manner associated with an image forming apparatus to which is supplied print job data of jobs registered on the screen shown in FIG. 29, values of the temperature shown in the column "D" associated with the a thick paper mode designated in the column "A", including the designation of type sheets, are not within the allowable temperature differences with respect to the current ambient temperature.

(2) On the screen shown in FIG. 44 or 45, which is used in a manner associated with an image forming apparatus to which is supplied print job data of registered as jobs on the screen shown in FIG. 29, values of the humidity shown in the column "E" associated with the a thick paper mode designated in the column "A", including the designation of a type of sheet, are not within the allowable humidity differences with respect to the current ambient humidity.

The states of the keys of "Thick paper 1", "Thick paper 2", and "Thick paper 3" being shaded on the screen shown in FIG. 48 correspond to a state in which the sheet types designated by the print jobs registered on the screen shown in FIG.

29 are the three types of "Sheet A", "Sheet C", and "Sheet D", and the ambient temperature and humidity displayed on the initial screen shown in FIG. 22 are within the allowable temperature and humidity differences associated with the thick paper mode names of "Thick paper 1" and "Thick paper 2" in the column "A" on the associated screen shown in FIG. 44. Further, the thick paper mode of "Thick paper 3" is not used here, and since this mode thus does not require adjustment, the key thereof is shaded. All the keys of "Thick paper 1", "Thick paper 2" and "Thick paper 3" are shaded on the screen shown in FIG. 48, so that the thick paper mode adjustment key on the screen shown in FIG. 25 is shaded.

The states of the keys of "Thick paper 1" and "Thick paper 2" being displayed in black on white on the screen shown in FIG. 49 correspond to a state in which the sheet types designated by the print jobs registered on the screen shown in FIG. 29 are the three types of "Sheet H", "Sheet I", and "Sheet J", and the ambient temperature displayed on the initial screen shown in FIG. 22 is not within the allowable temperature differences associated with the thick paper mode names of "Thick paper 1" and "Thick paper 2" in the column "A" on the associated screen shown in FIG. 45. Further, the thick paper mode of "Thick paper 3" is not used here, and since this mode thus does not require adjustment, the key thereof is shaded. All the keys of "Thick paper 1", "Thick paper 2" and "Thick paper 3" are not shaded on the screen shown in FIG. 49, so that the thick paper mode adjustment key on the screen shown in FIG. 26 is displayed in black on white.

When a mode-specific adjustment key is depressed on the screen shown in FIG. 46 or 47, the screen is switched to the screen shown in FIG. 44 or 45, respectively, and the configuration is carried out by changing the current limiter value of the fixing temperature in the column "C" associated therewith. The changing of the limiter value of the fixing temperature in the column "C" is carried out using the numerical value-inputting means, not shown. When the operator changes the limiter value of the fixing temperature, and depresses a set key ("Set"), the ambient temperature value in the column "D" is replaced by the current ambient temperature and the ambient humidity value in the column "E" is replaced by the current ambient humidity. Further, when the changing of current limiter value of the fixing temperature in the column "B" necessary for the print mode is completed on the screen shown in FIG. 44 or 45, and a return key ("Return") is depressed, the screen is switched to the screen shown in FIG. 48 or 49, on which the operated mode-specific adjustment key in the down sequence adjustment becomes shaded.

Figure 50:
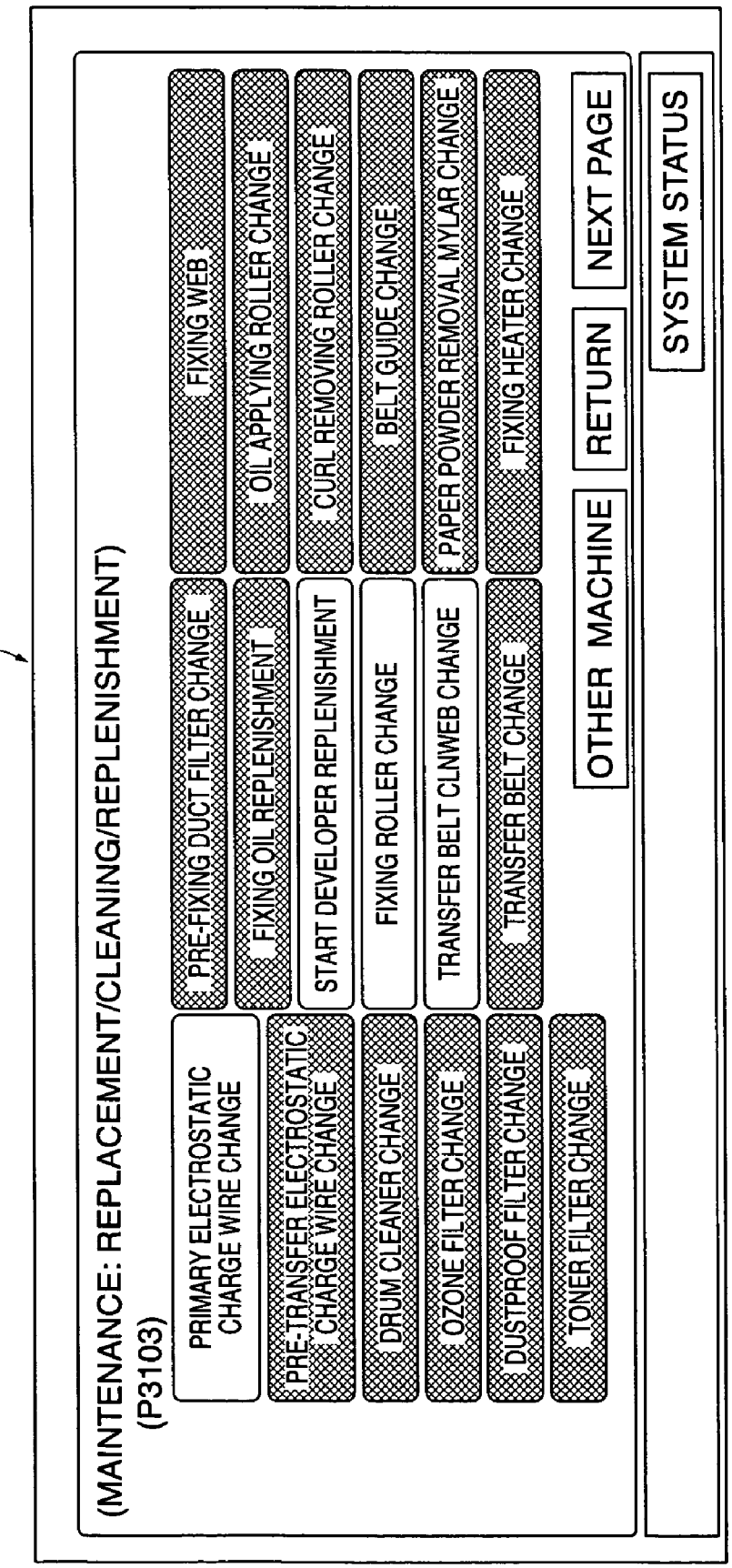
FIG. 50 is a view showing an example of a screen displaying a list of items of replacement/cleaning/replenishment for the image forming apparatus 3103.
Figure 51:
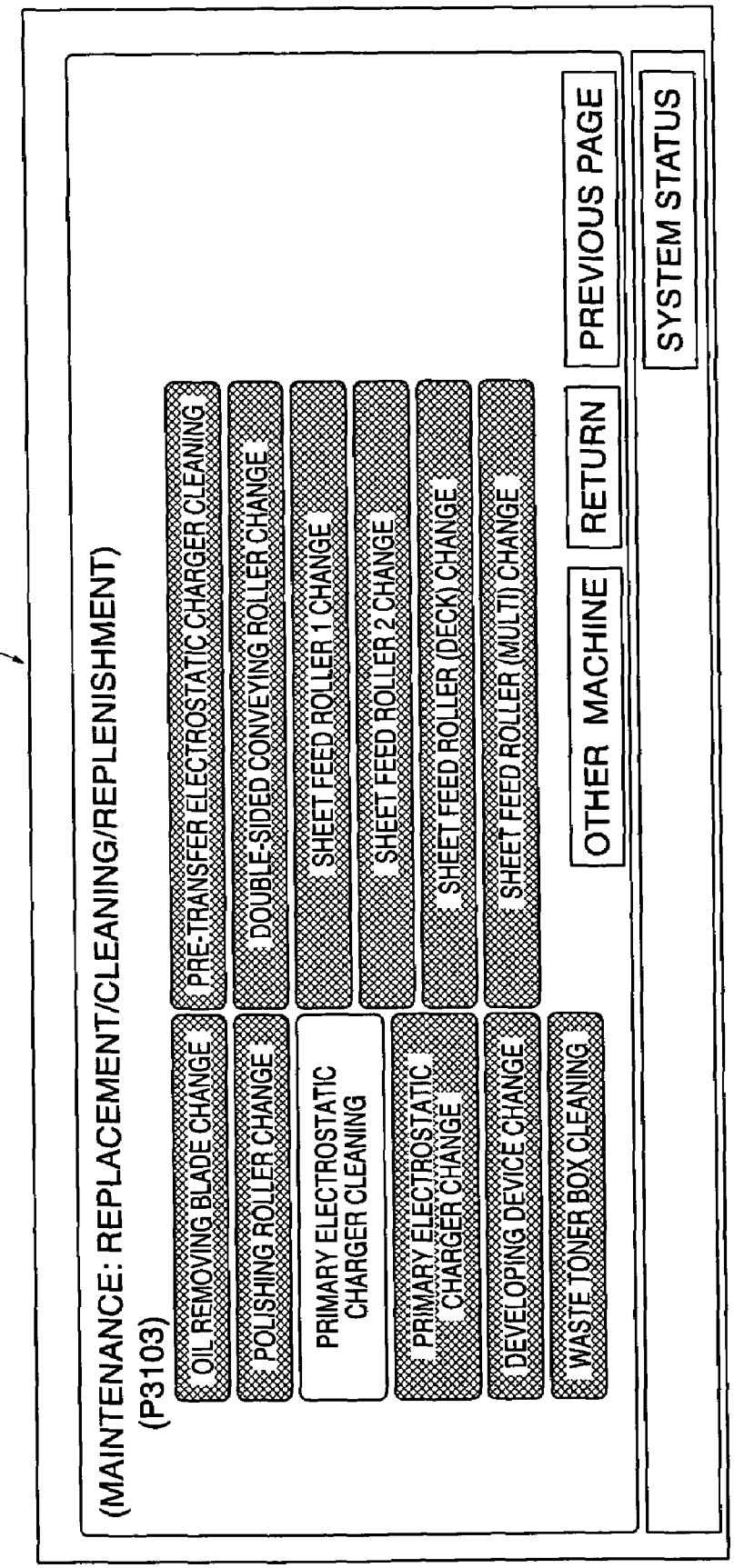
FIG. 51 is a view showing an example of a screen displaying a list of items of replacement/cleaning/replenishment for the image forming apparatus 3103.

Next, a description will be given of operations performed when the replacement/cleaning/replenishment key is depressed. On the screen shown in FIG. 23, when the replacement/cleaning/replenishment key is depressed, the screen is switched to the screen shown in FIG. 50, wherein a list of items of replacement/cleaning/replenishment is displayed. In the list displayed here, items which require replacement/cleaning/replenishment are displayed in black on white, and items which do not require replacement/cleaning/replenishment are shaded. Similarly, on the screen shown in FIG. 24, when the replacement/cleaning/replenishment key is depressed, the screen is switched to the screen shown in FIG. 51, wherein a list of items of replacement/cleaning/replenishment is displayed. FIGS. 50 and 51 are views showing examples of screens displaying a list of items of replacement/cleaning/replenishment for the image forming apparatus 3103 appearing in FIG. 20, and FIGS. 52 and 53 are views showing examples of screens displaying a list of items of replacement/cleaning/replenishment for the image forming apparatus 3102 appearing in FIG. 20.

Figure 52:
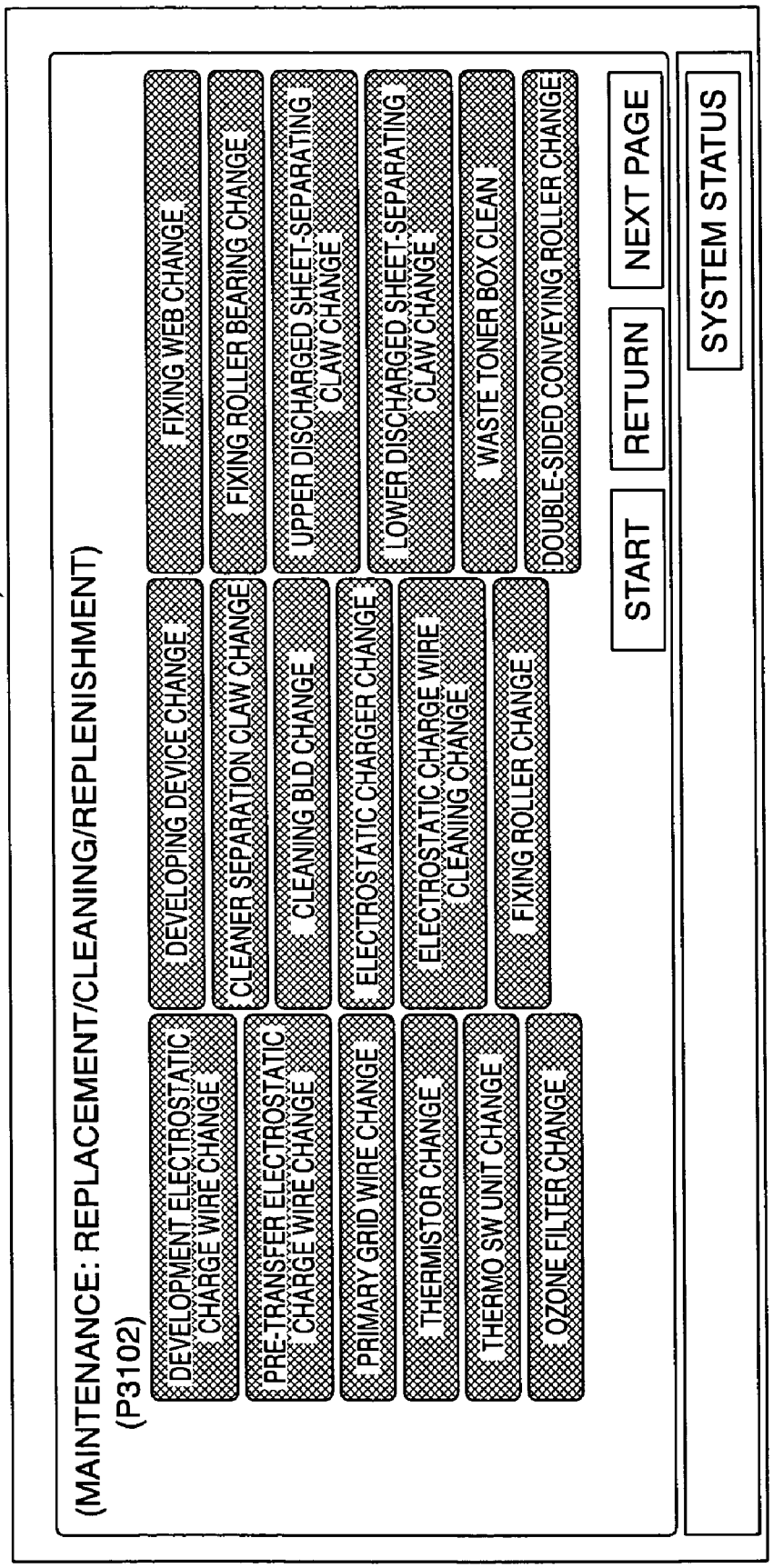
FIG. 52 is a view showing an example of a screen displaying a list of items of replacement/cleaning/replenishment for the image forming apparatus 3102.
Figure 53:
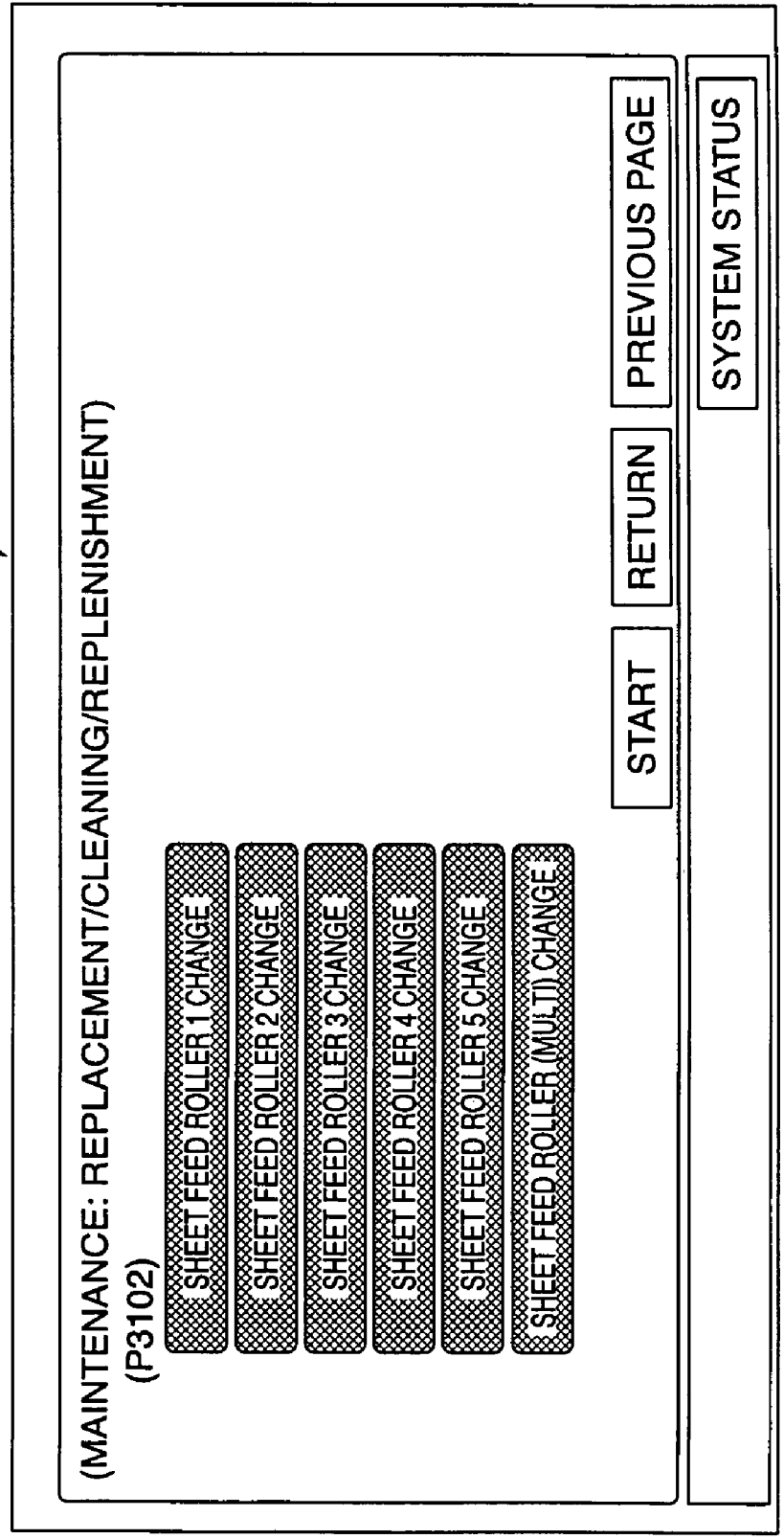
FIG. 53 is a view showing an example of a screen displaying a list of items of replacement/cleaning/replenishment for the image forming apparatus 3102.

When all the items cannot be collectively shown on the screen shown in FIG. 50 or 52, a continued page screen is provided. In the illustrated example, all the items of the list to be displayed cannot be collectively shown on the screen shown in FIG. 50 or 52, so that by depressing a next page key ("Next page"), the screen can be shifted to the screen shown in FIG. 51 or 53, to display the remaining items. Conversely, when the items of the previous page are desired to be displayed when viewing the screen shown in FIG. 51 or 53, a previous page key ("Previous page") is depressed so that the screen returns to the screen shown in FIG. 50 or 52, respectively.

Switching between the screens in FIGS. 50, 51 and FIGS. 52, 53 is performed by depressing other machine keys on the respective screens. Further, when a return key ("Return") is depressed on each of the screens in FIGS. 50, 51, 52, 53, the screen is switched back to the screen in FIG. 23 or 24 at the hierarchically higher level.

Next, a description will be given of a process for determining whether keys (item keys) in the list of replacement/cleaning/replenishment should be displayed in black on white or shaded.

The determination of whether item keys on the screens of FIGS. 50 to 53 should be displayed in black on white or shaded is carried out in the following manner:

Based on the print job data of jobs registered on the screen shown in FIG. 29, the number of times of image formation to be carried out (number of sheets to be printed) by an image forming apparatus to which print job data is supplied for image formation is calculated from the numbers of sheets to be printed in the column "B" and the associated numbers of copies to be printed in the column "C". Then, the calculated number of times of image formation is added to each of the current component operation count values in the column "B" on the screens of FIGS. 34 to 41 (in the case of the screens shown in FIGS. 40 and 41, the calculated number is added to the component operation count value of rollers corresponding to a location from which the sheets are to be supplied, and the component operation count value of double-sided sheet feed rollers for which counting is performed whenever image formation is performed on a second side of each sheet), and it is determined whether or not any of the resulting sums exceeds an associated one of the values in the column "C" at or above which cleaning becomes necessary, the values in the column "D" at or above which replacement becomes necessary, and the values in the column "E" at or above which adjustment becomes necessary. When the columns "C", "D", and "E" have boxes containing no values, these boxes are excluded from the above determination. Items of which the calculated sum exceeds any of the count values designated in the columns "C", "D", and "E" are displayed in black on white, and those of which the same does not exceed any of the count values designated in the columns "C", "D", and "E" are shaded. However, if the number of times of image formation exceeds the current component operation count value of the column "B", it is excluded from the determination. Further, it is additionally determined that when the current date is beyond a date calculated from a service time period of the associated component before replacement, shown in the column "F", with respect to the date on which component replacement was performed, shown in the column "G", item keys relevant to the above case should be displayed in black on white.

In the case of the illustrated example of the screen shown in FIG. 50, the number of times of image formation calculated from data on the screen shown in FIG. 29 is 5600 (the item on the second line in FIG. 28 is not included), and the current component operation count value of the primary electrostatic charge wires on the screen shown in FIG. 34 is 47000. Therefore, the value of the sum concerning the primary electrostatic charge wires is 47000+5600=52600. This value of 52600 exceeds the count value of 50000 at or above which the wires require replacement, and therefore, it is determined that the wires should be replaced.

Of the item keys on the screens of FIGS. 50 to 53, those displayed in black on white are subjected to a process of replacement/cleaning/replenishment according to a service manual (not shown). When this process is completed, and the operator depresses the associated item key displayed in black on white, it is determined that the process is completed, so that the item key becomes shaded. At this time, when a replacement process has been executed, the current component operation count value of the associated component in the column "B" on the screens of FIGS. 34 to 42 is cleared (set to 0), as described hereinabove, and the component replacement date in the column "G" is updated to the current date. When all items on the screens shown in FIGS. 50 to 53 are shaded, the replacement/cleaning/replenishment keys in FIGS. 23 and 24 at the hierarchically upper level are shaded accordingly. In the case of the screen shown in FIG. 24, all items on the screens shown in FIGS. 52 and 53 are shaded, so that the replacement/cleaning/replenishment key on the screen shown in FIG. 24 is shaded.

Figure 54:
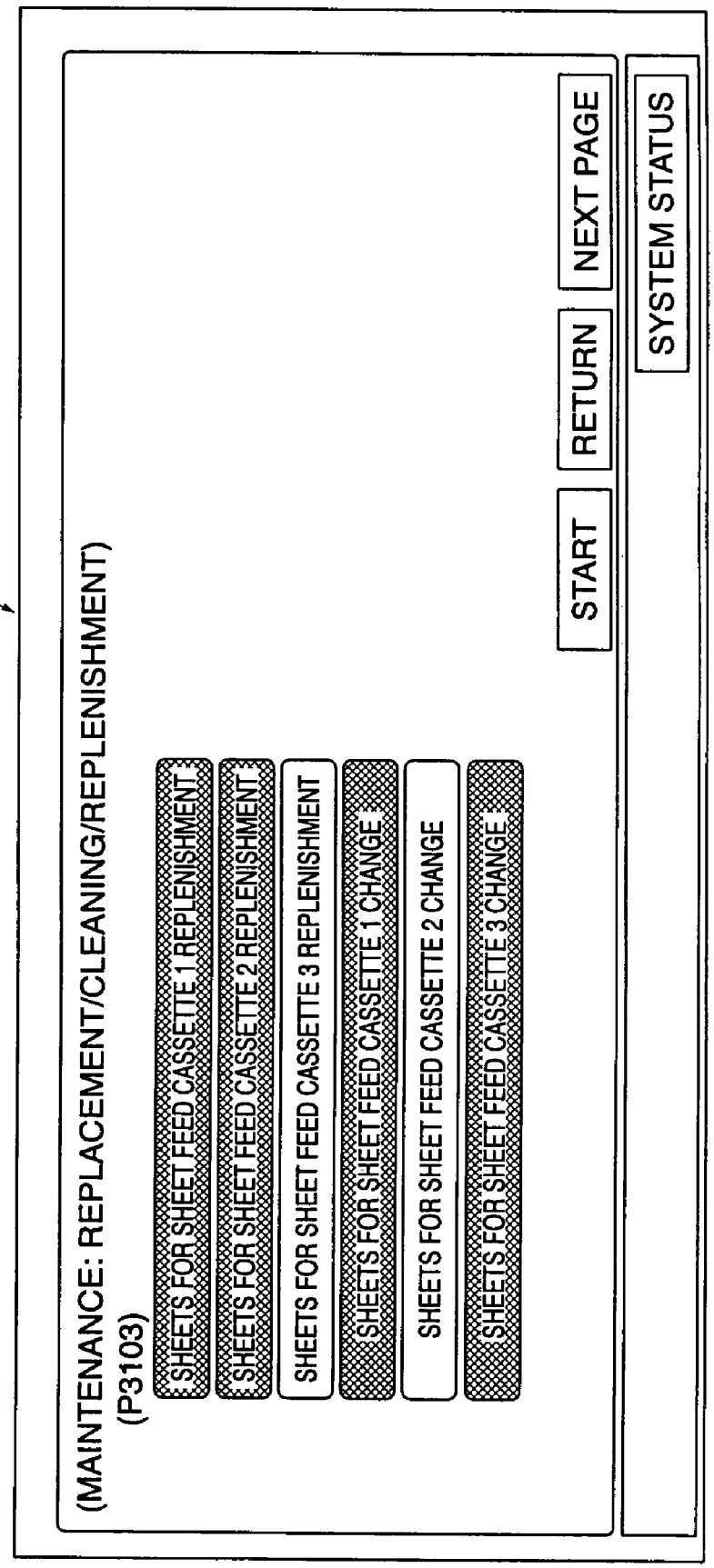
FIG. 54 is a view showing an example of a sheet feed cassette-related process screen for the image forming apparatus 3103.

Next, a description will be given of a case in which the job sequence key is depressed on the screen shown in FIG. 23 or 24. When the job sequence key is depressed on the screen shown in FIG. 23, the screen is switched to a sheet feed cassette-related process screen shown in FIG. 54. On the sheet feed cassette-related process screen, items which require sheet replenishment or replacement are displayed in black on white, and items which do not require sheet replenishment or replacement are shaded. Similarly, when the job sequence key is depressed on the screen shown in FIG. 24, the screen is switched to a sheet feed cassette-related process screen shown in FIG. 55. FIG. 54 is a view showing an example of the sheet feed cassette-related process screen for the image forming apparatus 3103 appearing in FIG. 20, and FIG. 55 is a view showing an example of the sheet feed cassette-related process screen for the image forming apparatus 3102 appearing in FIG. 20.

Figure 55:
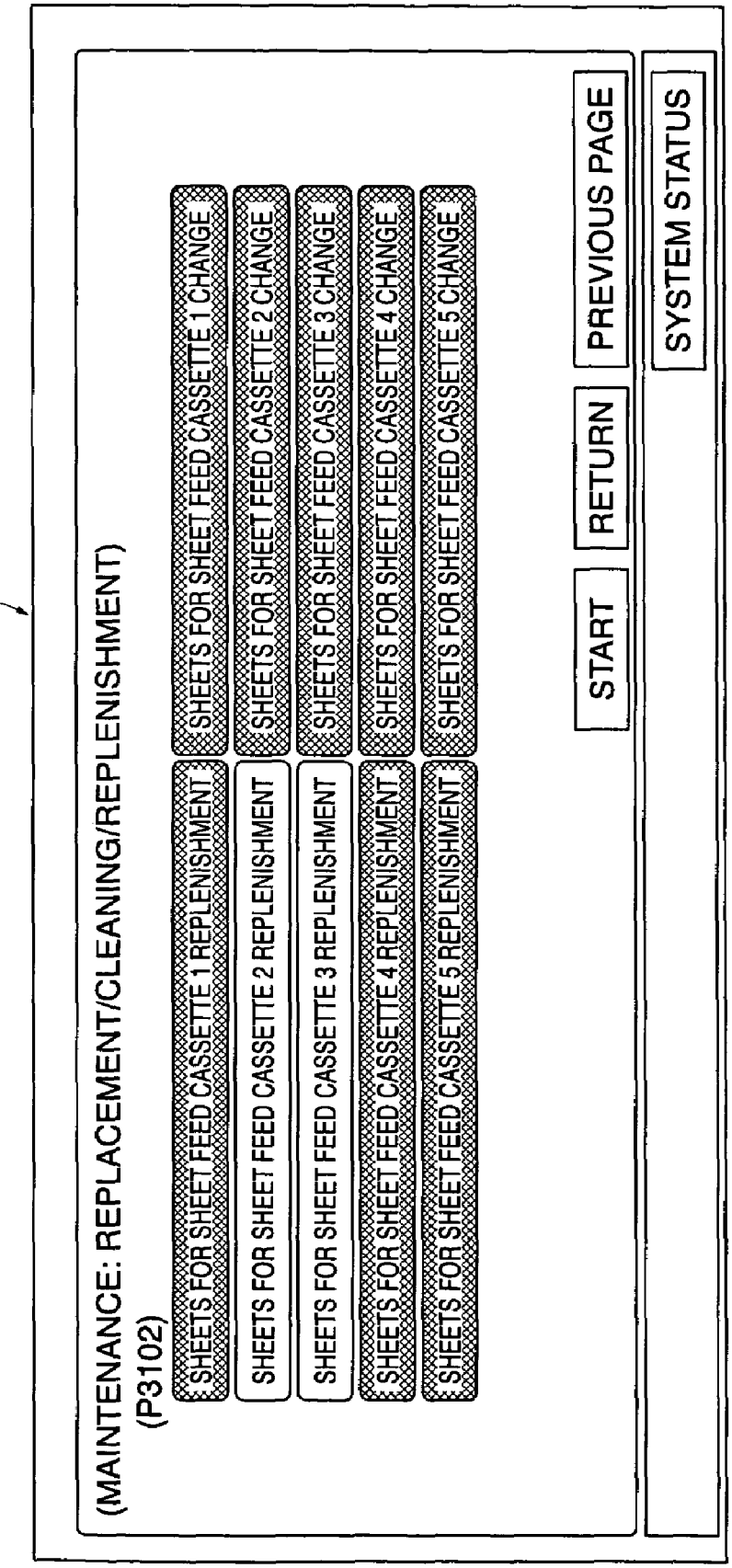
FIG. 55 is a view showing an example of a sheet feed cassette-related process screen for the image forming apparatus 3102.

Switching between the screens in FIGS. 54, 55 is performed by depressing other machine keys on the respective screens. Further, when a return key "Return" is depressed on each of the screens shown in FIGS. 54, 55, the screen is switched to a screen shown in FIG. 23 or 24 at the hierarchically higher level.

Next, a description will be given of a process for determining whether item keys in the sheet feed cassette-related process screen should be displayed in black on white or shaded.

The determination as to whether item keys on the screens in FIGS. 54 and 55 should be displayed in black on white or shaded is carried out in the following manner:

Based on the print job data of jobs registered on the screen shown in FIG. 29, the required number of sheets of a sheet feed cassette of an image forming apparatus to which print job data is supplied for image formation is calculated from the numbers of sheets to be printed in the column "B" and the associated numbers of copies to be printed in the column "C". Then, the calculated required number of sheets of the sheet feed cassette is compared with the currently set number of sheets in the column "C" on the screen in FIG. 32 or 33, and if the latter number is smaller than the former number, the associated item of sheet replenishment to the sheet feed cassette is displayed in black on white. Further, based on the print job data of jobs registered on the screen shown in FIG. 29, when the sheet feed cassettes contain no sheets for image formation by an image forming apparatus to which print job data is supplied, and at the same time there is a sheet feed cassette which is not in use, the item of sheet replacement for the sheet feed cassette not in use is displayed in black on white.

In the illustrated example in FIG. 54, the third sheet feed cassette requires 4000 sheets from the print job data on the screen shown in FIG. 29, and the currently set number of sheets in the column "C" of the screen shown in FIG. 32 is 100. Therefore, it is determined that sheet replenishment is necessary. Further, in the illustrated example in FIG. 54, the second sheet feed cassette contains sheets which are not required by the print job data on the screen in FIG. 29, and at the same time does not contain the sheets D required by the print job data on the screen in FIG. 29. Therefore, it is determined sheet replenishment is necessary for the second sheet feed cassette.

As to item keys of sheet replenishment displayed in black on white on the screen shown in FIG. 54 or 55, after replenishment of sheets has been completed, when the user depresses the associated item key displayed in black on white, it is determined that the replenishment of sheets has been completed, and the item key displayed in black on white becomes shaded. At this time, as described hereinabove, the currently set number of sheets in the column "C" on the associated screen in FIG. 32 or 33 is changed to the maximum number of sheets in the column "D". Further, as to item keys of sheet replacement displayed in black on white on the screens of FIGS. 54 and 55 as well, after replacement of sheets has been completed, when the user depresses the associated item key displayed in black on white, it is determined that the sheet replacing process has been completed, and the associated item key displayed in black on white becomes shaded. At this time, as described hereinabove, the currently set number of sheets in the column "C" on the associated screen in FIG. 32 or 33 is changed to the maximum number of sheets in the column "D".

When all the items on the screens in FIGS. 54 and 55 are shaded, the job sequence keys on the screens in FIGS. 23 and 24 come to be shaded accordingly.

Thus, according to the present embodiment, maintenance items which do not require maintenance are shaded, which makes it possible to notify the operator of the maintenance items which do not require maintenance, thereby reducing downtime caused by the maintenance operation.

It is to be understood that the object of the present invention may also be accomplished by supplying a system or an apparatus with a storage medium in which a program code of software which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the storage medium on which the program code is stored constitutes the present invention.

Examples of the storage medium for supplying the program code include a RAM, a floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, a ROM, and an EEPROM.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing the program code read out from the storage medium into a memory provided in an expansion board inserted into a computer or in an expansion unit connected to the computer and then causing a CPU or the like provided in the expansion board or the expansion unit to perform a part or all of the actual operations based on instructions of the program code.

Furthermore, the present invention may be applied to a system comprised of a plurality of apparatuses or to an apparatus formed by a single apparatus.

Further, a system or an apparatus may be supplied with a program code of software which realizes the functions of either of the above described embodiments by downloading the program code from a database on a network by a communication program, so that the system or the apparatus can have the advantageous effects of the present invention.

The present invention is not limited to the above described embodiments, but can be modified in various manners based on the subject matter of the present invention, which should not be excluded from the scope of the present invention.

What is claimed is:

1. An image forming apparatus comprising:
a job storage device that stores a job input by a user;
an adjustment item-detecting device that detects items of mechanical adjustment for the apparatus from contents of at least one job stored in the job storage device;
a display device that displays an adjustment table describing the items of mechanical adjustment detected by said adjustment item-detecting device;
an adjustment item-selecting device that allows the user to select an item of mechanical adjustment on which adjustment should be executed, from the items of mechanical adjustment described in the adjustment table displayed on said display device; and
an adjustment executing device that executes adjustment on the item of mechanical adjustment selected by the user using said adjustment item-selecting device before the execution of a job is started.

2. An image forming apparatus comprising:
a job storage device that stores a job input by a user;
an adjustment item-detecting device that detects items of adjustment for the apparatus from contents of at least one job stored in the job storage device;
a display device that displays an adjustment table describing the items of adjustment detected by said adjustment item-detecting device;
an adjustment item-selecting device that allows the user to select an item of adjustment on which adjustment should be executed, from the items of adjustment described in the adjustment table displayed on said display device;
an adjustment executing device that executes adjustment on the item of adjustment selected by the user using said adjustment item-selecting device before the execution of a job is started; and
an output device that outputs contents of the adjustment table displayed on said display device according to an instruction of the user.

3. An image forming apparatus comprising:
a job storage device that stores a job input by a user;
an adjustment item-detecting device that detects items of adjustment for the apparatus from contents of at least one job stored in the job storage device;
a display device that displays an adjustment table describing the items of adjustment detected by said adjustment item-detecting device;
an adjustment item-selecting device that allows the user to select an item of adjustment on which adjustment should be executed, from the items of adjustment described in the adjustment table displayed on said display device;
an adjustment executing device that executes adjustment on the item of adjustment selected by the user using said adjustment item-selecting device before the execution of a job is started; and
an adjustment contents-storing device that stores contents of the item of adjustment on which the adjustment is executed by said adjustment executing device.

4. An image forming apparatus comprising:
a job storage device that stores a job input by a user;
an adjustment item-detecting device that detects items of adjustment for the apparatus from contents of at least one job stored in the job storage device;
a display device that displays an adjustment table describing the items of adjustment detected by said adjustment item-detecting device;
an adjustment item-selecting device that allows the user to select an item of adjustment on which adjustment should be executed, from the items of adjustment described in the adjustment table displayed on said display device;
an adjustment executing device that executes adjustment on the item of adjustment selected by the user using said adjustment item-selecting device before the execution of a job is started; and
a post-processing apparatus,
wherein the items of adjustment include an item of adjustment for the post-processing apparatus.

* * * * *